(12) United States Patent
Straka

(10) Patent No.: US 8,881,571 B2
(45) Date of Patent: Nov. 11, 2014

(54) MULTI-TOOL TECHNOLOGY

(75) Inventor: Gordon A. Straka, Afton, MN (US)

(73) Assignee: Wilson Tool International Inc., White Bear Lake, MN (US)

( * ) Notice: Subject to any disclaimer, the term of this patent is extended or adjusted under 35 U.S.C. 154(b) by 0 days.

(21) Appl. No.: 13/413,464

(22) Filed: Mar. 6, 2012

(65) Prior Publication Data

US 2013/0061648 A1 Mar. 14, 2013

Related U.S. Application Data

(63) Continuation of application No. 13/019,022, filed on Feb. 1, 2011, now Pat. No. 8,141,407, and a continuation of application No. 11/696,940, filed on Apr. 5, 2007, now Pat. No. 8,042,374.

(60) Provisional application No. 60/790,033, filed on Apr. 7, 2006.

(51) Int. Cl.
*B21J 13/00* (2006.01)
*B23Q 3/155* (2006.01)
*B21D 28/12* (2006.01)
*B21D 37/18* (2006.01)

(52) U.S. Cl.
CPC ............ *B21D 28/12* (2013.01); *B23Q 3/155* (2013.01); *B21D 28/125* (2013.01); *B21D 37/18* (2013.01)
USPC ............ 72/446; 72/441; 72/482.93; 72/43; 83/549

(58) Field of Classification Search
USPC .............................. 72/41–45, 446
See application file for complete search history.

(56) References Cited

U.S. PATENT DOCUMENTS

| | | |
|---|---|---|
| 3,527,130 A | 9/1970 | Knehans |
| 4,028,918 A | 6/1977 | Kuhn |
| 4,569,267 A | 2/1986 | Klingel |
| 4,658,688 A | 4/1987 | Shah |
| 4,929,276 A | 5/1990 | Chun et al. |
| 4,976,180 A | 12/1990 | Otto |
| 4,977,804 A | 12/1990 | Naito |
| 4,981,058 A * | 1/1991 | Gavrun, III .................. 83/34 |
| 4,986,153 A | 1/1991 | Matrak |
| 5,048,385 A | 9/1991 | Eckert et al. |
| 5,054,347 A | 10/1991 | Johnson |
| 5,081,891 A | 1/1992 | Johnson et al. |
| 5,127,293 A | 7/1992 | Chatham |

(Continued)

FOREIGN PATENT DOCUMENTS

| | | |
|---|---|---|
| EP | 0556876 | 8/1993 |
| EP | 0556877 | 8/1993 |

(Continued)

OTHER PUBLICATIONS

PCT International Search Report mailed Feb. 21, 2008.

(Continued)

*Primary Examiner* — Shelley Self
*Assistant Examiner* — Matthew G Katcoff
(74) *Attorney, Agent, or Firm* — Fredrikson & Byron, P.A.

(57) ABSTRACT

A multi-tool having a plurality of tool-receipt openings adapted to receive respective tools. The multi-tool can be used on turret presses, single-station presses, other industrial presses, or other fabrication equipment.

10 Claims, 42 Drawing Sheets

(56) References Cited

U.S. PATENT DOCUMENTS

| | | |
|---|---|---|
| 5,131,303 A | 7/1992 | Wilson |
| 5,211,095 A | 5/1993 | Chun |
| 5,271,303 A | 12/1993 | Chatham |
| 5,318,496 A | 6/1994 | Takahashi |
| 5,618,028 A | 4/1997 | Hepworth |
| 5,839,341 A | 11/1998 | Johnson |
| 5,848,563 A | 12/1998 | Saito |
| 5,906,539 A | 5/1999 | Tabel |
| 5,934,165 A | 8/1999 | Chatham |
| 5,993,090 A | 11/1999 | Straka |
| 6,074,330 A | 6/2000 | Ostini |
| 6,276,247 B1 | 8/2001 | Helda |
| 6,279,445 B1 | 8/2001 | Rosene |
| 6,327,884 B1 | 12/2001 | Wills |
| 6,334,381 B1 | 1/2002 | Chatham |
| 6,675,688 B2 | 1/2004 | Ostini |
| 7,032,812 B2 | 4/2006 | Ostini |
| 7,168,356 B2 | 1/2007 | Rosene |
| 2004/0011178 A1 | 1/2004 | Iwamoto et al. |
| 2008/0092711 A1 | 4/2008 | Thielges |

FOREIGN PATENT DOCUMENTS

| | | |
|---|---|---|
| EP | 0674956 | 10/1995 |
| EP | 1334782 | 8/2003 |
| EP | 1338354 | 8/2003 |
| JP | 09108749 | 4/1997 |
| WO | 9306954 | 4/1993 |

OTHER PUBLICATIONS

English-language abstract JP 09108749 (Amada Co Ltd).

* cited by examiner

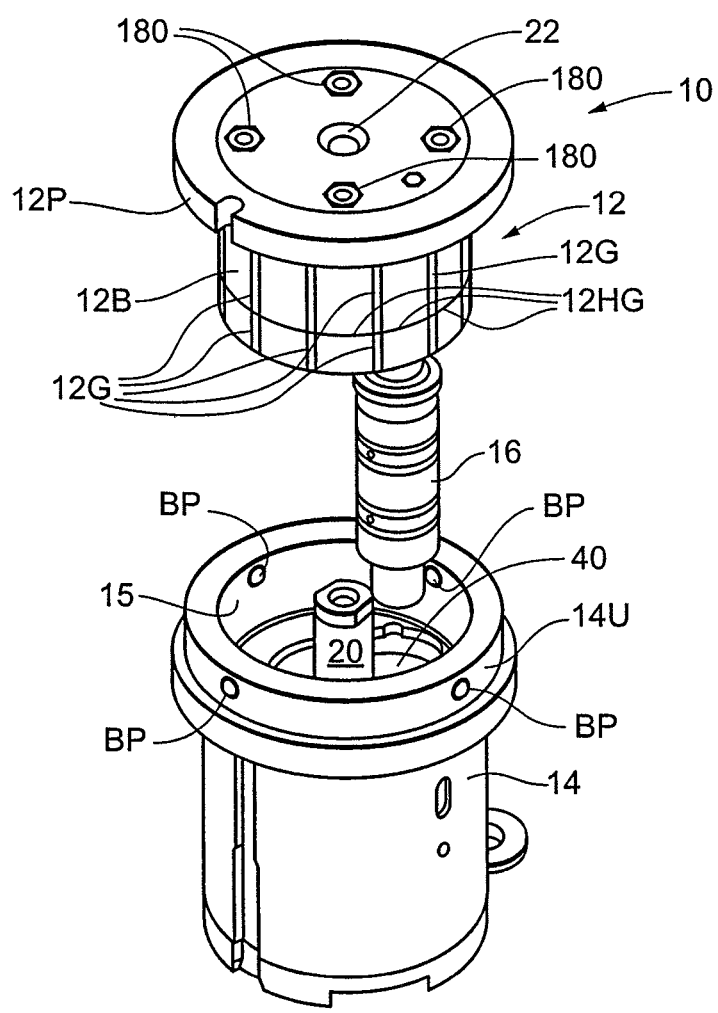

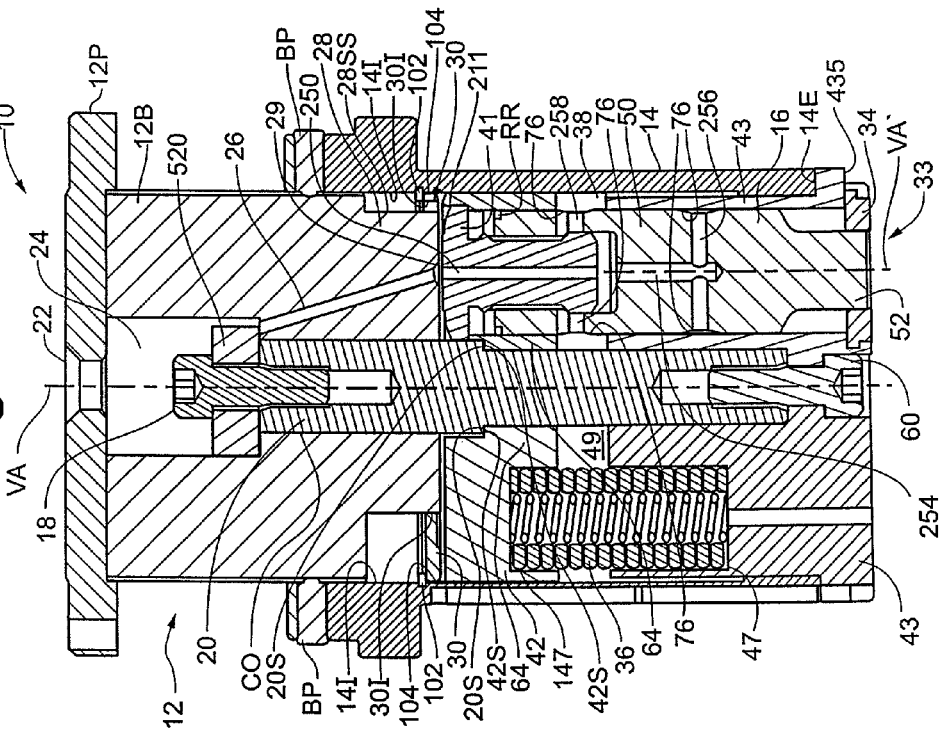
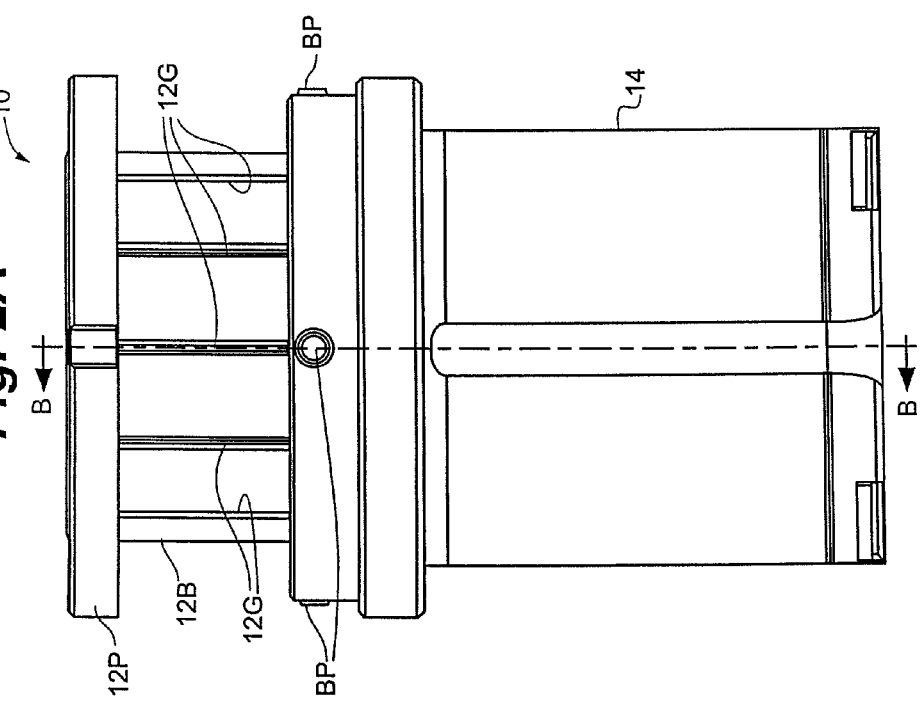

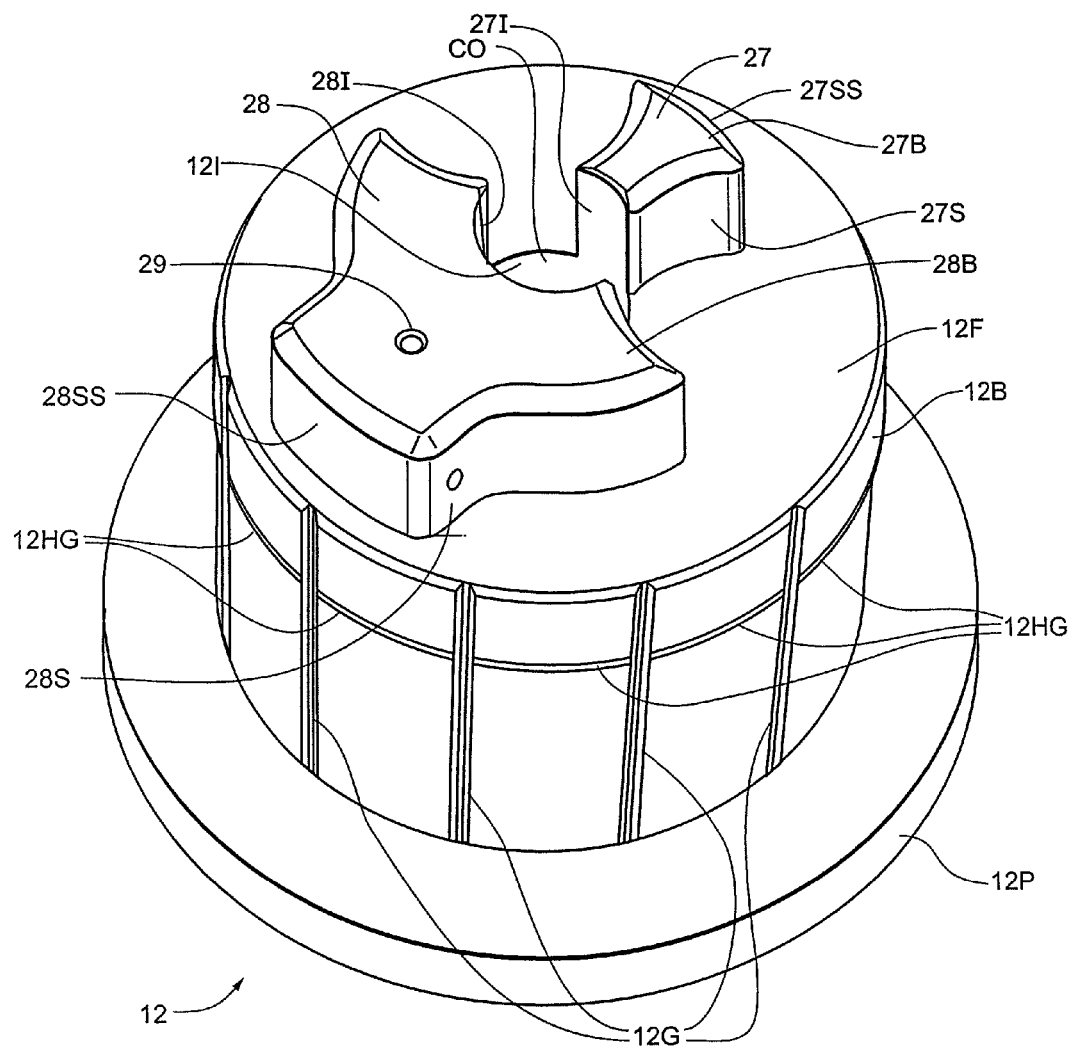

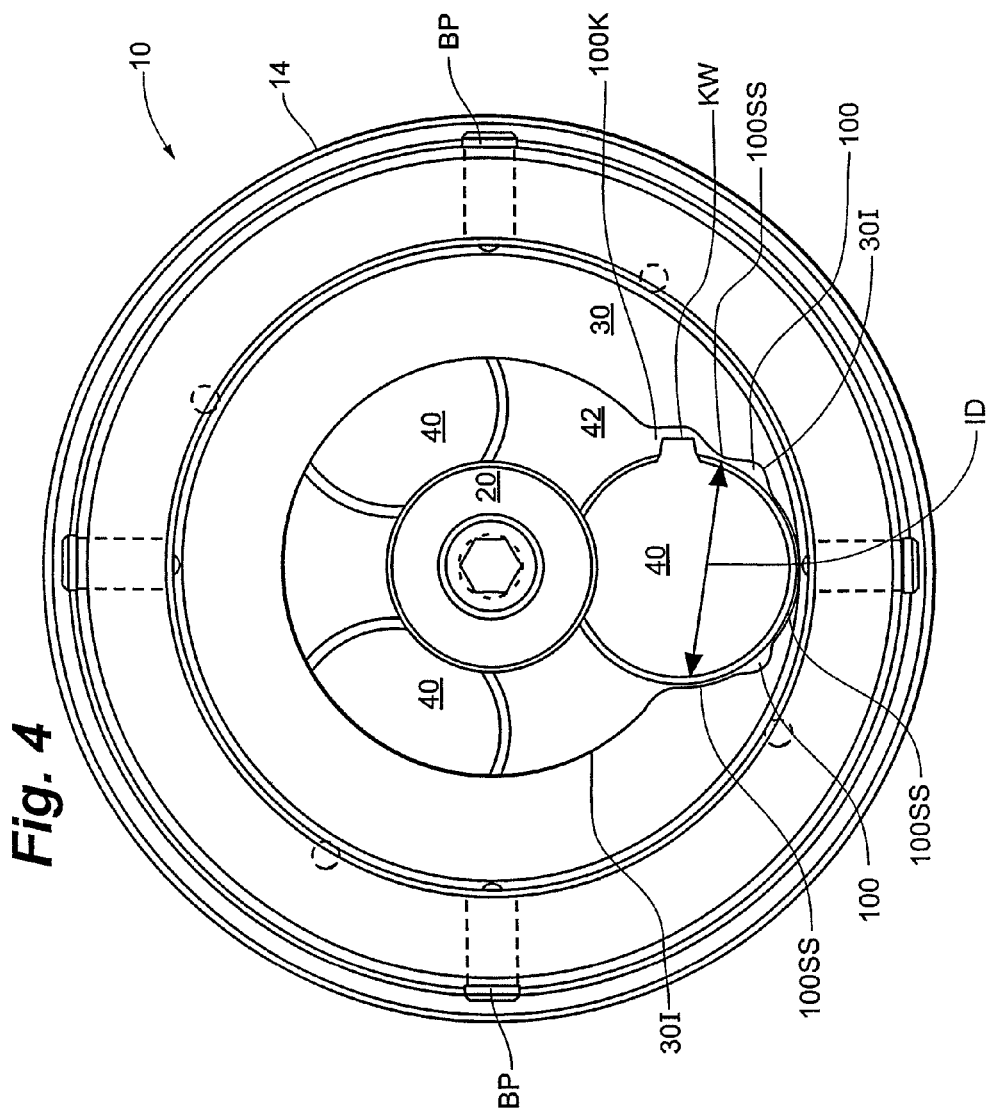

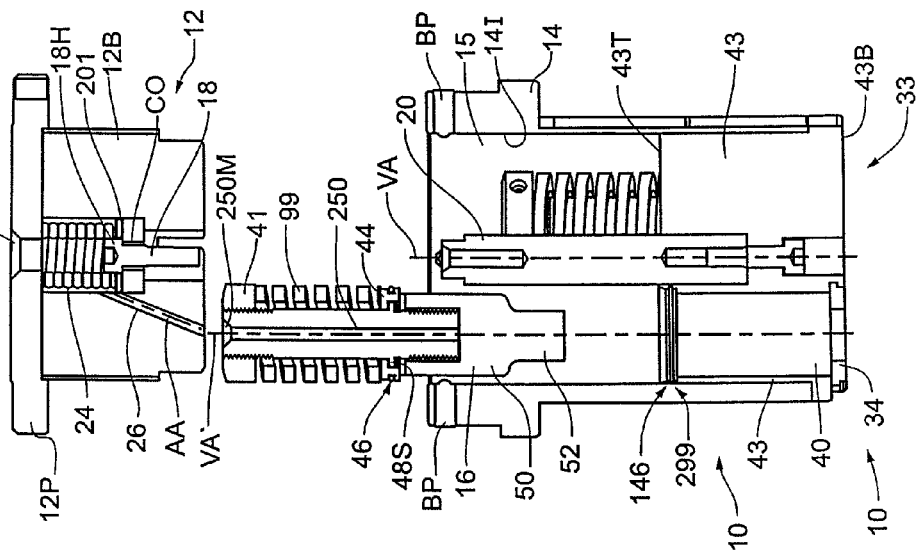
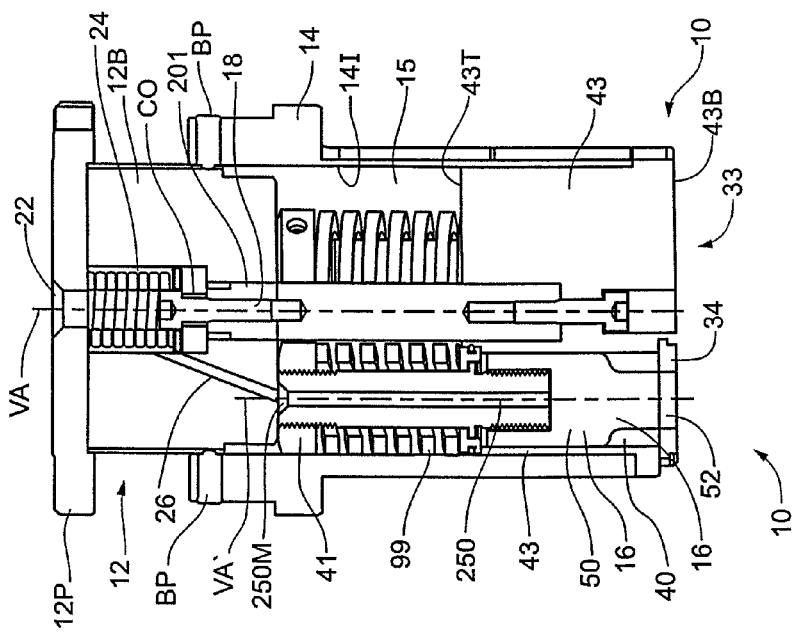
Fig. 7A
Fig. 7B

MULTI-TOOL TECHNOLOGY

CROSS REFERENCE TO RELATED APPLICATIONS

The present application is a continuation of application Ser. No. 13/019,022 filed Feb. 1, 2011, which is a continuation of application Ser. No. 11/696,940 filed Apr. 5, 2007 which in turn claims priority to U.S. Provisional Patent Application No. 60/790,033 filed Apr. 7, 2006, the disclosures of which are incorporated herein by reference.

FIELD

The invention relates generally to tools for industrial presses or other fabrication equipment. More particularly, the invention relates to multi-tools for turret presses, single-station presses, other industrial presses, or other fabrication equipment.

BACKGROUND

Sheet metal and other workpieces can be fabricated into a wide range of useful products. The fabrication (i.e., manufacturing) process commonly requires various bends and/or holes to be formed in the workpieces. The equipment types used in fabricating sheet metal and other workpieces include turret presses and other industrial presses (such as single-station presses), Trumpf style machine tools and other rail type systems, press brakes, sheet feed systems, coil feed systems, and many other types of fabrication equipment adapted for punching or pressing sheet materials.

The present invention provides multi-tools that can be used with many types of fabrication equipment. Turret presses are one type of machine tool on which multi-tools have been used. Following is a brief background discussing multi-tools in the context of a turret press. The various multi-tool embodiments of the present invention, however, can be used with any type of fabrication equipment, such as single-station presses or other presses not having turrets.

Turret presses have found wide use in forming sheet metal and the like. These presses commonly have an upper turret that holds a series of punches at locations spaced circumferentially about its periphery, and a lower turret that holds a series of dies at locations spaced circumferentially about its periphery. Commonly, the turrets can be rotated about a vertical axis to bring a desired punch and die set into vertical alignment at a work station. By appropriately rotating the upper and lower turrets, an operator can bring a number of different punch and die sets sequentially into alignment at the work station in the process of performing a series of different pressing operations.

Multi-tools for turret presses and other presses allow a plurality of different tools to be available at a single tool-mount location on the press. Thus, in place of a tool with only one punch, there can be provided a multi-tool carrying a number of different punches. With such a multi-tool, any one of a plurality of punches carried by the multi-tool can be selected and moved to an operable position. Then, when a ram of the punch press acts on (e.g., strikes) the multi-tool, only the selected (or "activated") punch is forced into engagement with the workpiece. Such multi-tools can carry punches, forming tools, dies, combinations of punches and forming tools, combinations of punches and dies, etc.

Existing multi-tools provide a number of advantages over using a conventional single tool at each tool-mount location. However, there is a great deal of room for further advances in multi-tool technology.

DRAWINGS

FIG. 1 shows a partially exploded perspective view of a multi-tool in accordance with certain embodiments of the invention;

FIG. 2A shows a side profile view of a multi-tool in accordance with certain embodiments of the invention;

FIG. 2B shows a cutaway side profile view of the multi-tool shown in FIG. 2A;

FIG. 2D shows a perspective view of a driver assembly for a multi-tool in accordance with certain embodiments of the invention;

FIG. 4 shows a top profile view of a guide housing for a multi-tool, without any tools mounted therein, in accordance with certain embodiments of the invention;

FIG. 7A shows a side cutaway view of a multi-tool, with a tool mounted therein, in accordance with certain embodiments of the invention;

FIG. 7B shows a partially exploded side cutaway view of the multi-tool of FIG. 7A;

SUMMARY

Figure 2C:
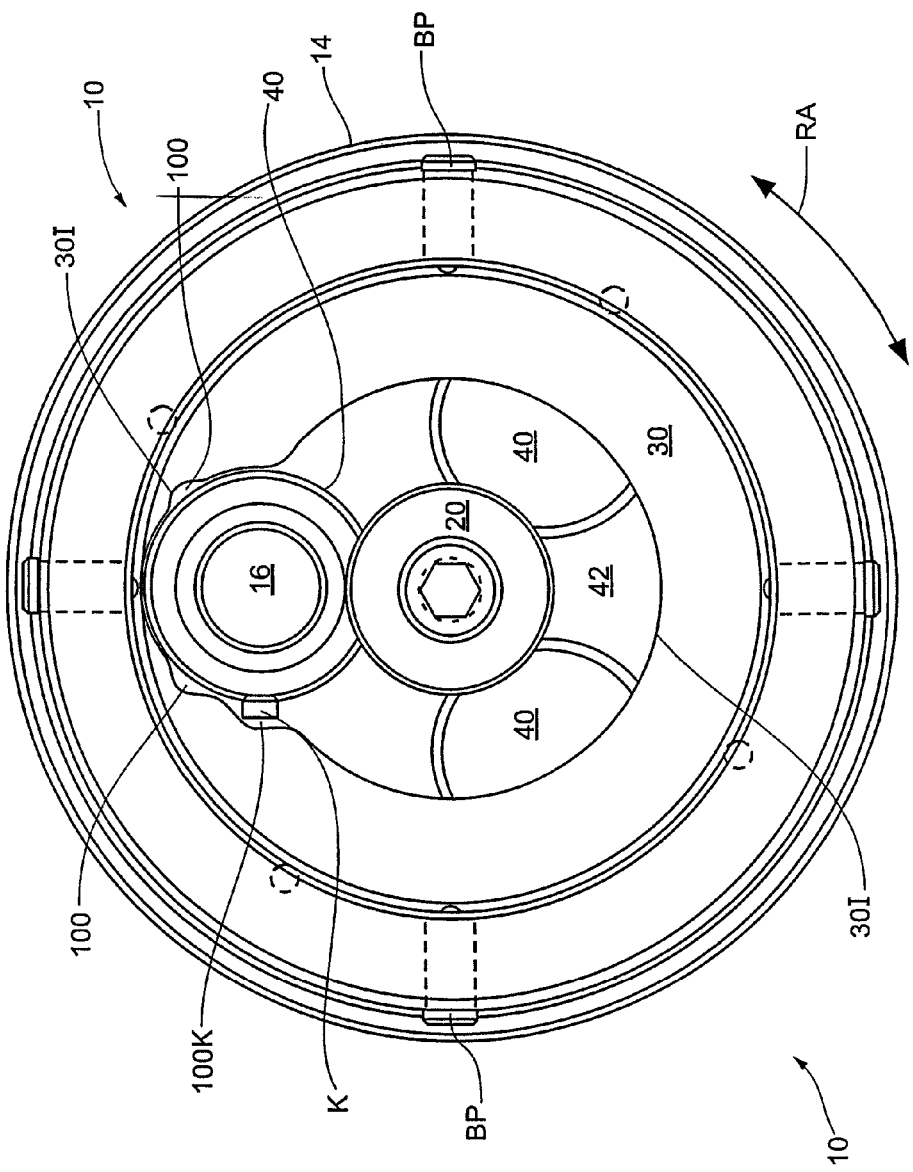
FIG. 2C shows a top profile view of a guide housing for a multi-tool, with a tool mounted therein, in accordance with certain embodiments of the invention.

In certain embodiments, the invention provides a multi-tool having a plurality of tool-receipt openings adapted to receive respective tools. The multi-tool includes a guide housing, which preferably has an end from which a tip of an activated tool can be extended during a pressing operation. In the present embodiments, the multi-tool includes a driver assembly that can be selectively attached to and removed from the guide housing. The present multi-tool includes a skid plate having a tool-access opening that can be selectively aligned with a desired one (optionally with any one) of the tool-receipt openings, e.g., by performing a relative rotation of the skid plate and the tool-receipt openings. When the tool-access opening is aligned with the desired tool-receipt opening, a desired tool can be loaded into or unloaded from the desired tool-receipt opening by passing the desired tool through the tool-access opening. In some of the present embodiments, the skid plate is rotatable (e.g., relative to the guide housing).

Some embodiments of the invention provide a method of unloading tools from a multi-tool. In the present embodiments, the multi-tool has a plurality of tool-receipt openings in which respective tools are received. In the present method, the multi-tool includes a driver assembly secured removably to a guide housing. The present multi-tool includes a skid plate having a tool-access opening that can be selectively aligned with a desired one (optionally with any one) of the tool-receipt openings by performing a relative rotation of the skid plate and the tool-receipt openings. When the tool-access opening is aligned with a desired one of the tool-receipt openings, a desired tool in the desired tool-receipt opening can be unloaded from the desired tool-receipt opening by passing the desired tool through the tool-access opening. In the present embodiments, the skid plate is rotatable, and the noted relative rotation involves rotating the skid plate. The method comprises removing the driver assembly from the guide housing, performing a relative rotation of the skid plate and the tool-receipt openings to selectively align the tool-access opening with the desired tool-receipt opening, and removing the desired tool from the desired tool-receipt opening by passing the desired tool through the tool-access opening.

In some embodiments, the invention provides a multi-tool having a plurality of tool-receipt openings adapted to receive respective tools. The multi-tool includes a guide housing, preferably one having an end from which a tip of an activated tool can be extended during a pressing operation. In the present embodiments, the multi-tool includes a driver assembly having a striker, and a relative rotation of the striker and the tool-receipt openings can be performed such that the striker is selectively aligned with a desired one (optionally any one) of the tool-receipt openings. In the present embodiments, the multi-tool includes a direct lubrication passage having an outlet adapted to deliver lubricant directly to a location adjacent to the desired tool-receipt opening.

Certain embodiments of the invention provide a multi-tool having a plurality of tool-receipt openings in which respective tools are received. The multi-tool includes a guide housing, preferably one having an end from which a tip of an activated one of the tools can be extended during a pressing operation. In the present embodiments, the multi-tool includes a driver assembly having a striker, and a relative rotation of the driver assembly and the guide housing can be performed so as to selectively align the striker with different ones (optionally with any one or more) of the tools. In the present embodiments, the striker is aligned with an activated tool, the activated tool has an internal lube passage, and the driver assembly has a direct lubrication passage with an outlet that is adapted to deliver lubricant directly to a location adjacent to an inlet of the internal lube passage of the activated tool.

In certain embodiments, the invention provides a multi-tool having a plurality of tool-receipt openings adapted to receive respective tools. The multi-tool includes a guide housing, preferably one having an end from which a tip of an activated tool can be extended during pressing operations. In the present embodiments, the multi-tool includes a driver assembly that can be selectively attached to and removed from the guide housing. The present multi-tool includes a skid plate having a tool-retention structure adapted for securing a non-activated tool (optionally for securing a plurality, or all, of the non-activated tools) in a restrained position such that the non-activated tool is prevented during pressing operations from coming into contact with a workpiece.

Some embodiments of the invention provide a multi-tool having a plurality of tool-receipt openings in which respective self-stripping tool assemblies are mounted. In the present embodiments, each self-stripping tool assembly has an upper portion with a stripping spring and a lower portion with a tip. Here, the multi-tool includes a driver assembly and a guide housing, the driver assembly can be selectively attached to and removed from the guide housing, and when the driver assembly is removed from the guide housing, an interior cavity bounded by the guide housing is exposed. In the present embodiments, the multi-tool includes a punch guide tip bounding the tool-receipt openings and surrounding the lower portions of the self-stripping tool assemblies, and the upper portions of the self-stripping tool assemblies are disposed in the cavity.

In certain embodiments, there is provided a punch press in combination with a form-up multi-tool. Here, the punch press has upper and lower tables, the form-up multi-tool is mounted on the lower table, and the punch press has a workpiece position located between the upper and lower tables. In the present embodiments, the form-up multi-tool carries a plurality of individual forming tools and has a head bounding a plurality of openings in which respective ones of the forming tools are disposed. Preferably, the form-up multi-tool has an adjustment mechanism that can be oriented so as to selectively place an activated one (or a plurality of activated ones) of the forming tools in an activated configuration. The activated configuration is characterized by the activated forming tool being rigidly secured in an upright position. Preferably, the head and non-activated ones of the forming tools have a limited range of freedom to move vertically downwardly relative to the activated forming tool. The adjustment mechanism, in some of the present embodiments, comprises a rotatable plate defining a series of openings adapted for being aligned respectively with the non-activated forming tools. When provided, the rotatable plate can advantageously have a rigid surface adapted for being engaged by a bottom end of the activated forming tool. Optionally, the head and the non-activated forming tools are adapted to move vertically downwardly (e.g., during a forming operation) within the noted limited range relative to the rotatable plate of the adjustment mechanism. This relative vertical movement can involve the non-activated tools passing downwardly through respective ones of the openings defined by the rotatable plate, and during this relative vertical movement the activated forming tool preferably is prevented from moving downwardly by the rigid surface of the rotatable plate. In some of the present embodiments, there is a first number of the forming tools, there is a second number of the openings defined by the rotatable plate of the adjustment mechanism, and the second number is at least one less than the first number. Optionally, the rotatable plate of the adjustment mechanism is rotatable relative to the head (or at least a top face/wall thereof) and/or relative to the forming tools of the multi-tool.

Some embodiments of the invention provide a multi-tool having a plurality of tool-receipt openings adapted to receive respective tools. The multi-tool comprises a guide housing, preferably one having an end from which a tip of an activated tool can be extended during a pressing operation. In the present embodiments, the multi-tool includes a driver assembly having a striker, and a relative rotation of the guide housing and the driver assembly can be performed such that the striker is selectively aligned with a desired one of the tool-receipt openings. In the present embodiments, at least one surface of the multi-tool is provided with a surface enhancement selected from the group consisting of a surface hardening enhancement and a surface lubricity enhancement.

In certain embodiments, the invention provides a method of unloading a multi-tool. In the present embodiments, the multi-tool has a plurality of tool-receipt openings in which respective tools are received. In the present method, the multi-tool includes a driver assembly secured removably to a guide housing, and the driver assembly has therein formed a tool-access passage. Further, the present multi-tool includes a skid plate having a tool-access opening that can be selectively aligned with a desired one (optionally with any one) of the tool-receipt openings, e.g., by rotating the skid plate. Preferably, when the skid plate's tool-access opening is aligned with a desired one of the tool-receipt openings, the driver assembly's tool-access passage can be aligned with the tool-access opening and the desired tool-receipt opening, such that a desired tool in the desired tool-receipt opening can be unloaded from the desired tool-receipt opening by passing the desired tool through the tool-access opening and out of the multi-tool through the driver assembly's tool-access passage. In the present embodiments, the method comprises, without removing the driver assembly from the guide housing, performing a relative rotation of the skid plate and the tool-receipt openings to selectively align the skid plate's tool-access opening with the desired tool-receipt opening, and, previously or subsequently, aligning the driver assembly's tool-access passage with the skid plate's tool-access opening, and removing the desired tool from the desired tool-receipt opening by passing the desired tool through the skid plate's tool-access opening and through the driver assembly's tool-access passage.

In some embodiments, the invention provides a multi-tool having a plurality of tool-receipt openings adapted to receive respective tools. The present multi-tool includes a driver assembly, a guide housing, and a skid plate. The skid plate has a tool-access opening that can be selectively aligned with a desired one (optionally with any one) of the tool-receipt openings. The present driver assembly has a tool-access passage. In the present embodiments, when the skid plate's tool-access opening is aligned with the desired tool-receipt opening, the driver assembly's tool-access passage can be aligned with both the tool-access opening and the desired tool-receipt opening such that a desired tool (sized to be operatively received in the desired tool-receipt opening) can be loaded into the desired tool-receipt opening by passing the desired tool into the driver assembly's tool-access passage and through the skid plate's tool-access opening.

DESCRIPTION OF VARIOUS EMBODIMENTS

The following discussion is presented to enable a person skilled in the art to make and use embodiments of the invention. Various modifications to the illustrated embodiments will be apparent to those skilled in the art given the present teaching as a guide, and the principles taught herein can be applied to accommodate other applications and/or to achieve other embodiments. Thus, embodiments of the invention are not limited to the preferred embodiments shown, but rather are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention. The following material is intended to familiarize the reader with the general nature, and various features, of embodiments of the invention.

Tool-Access Skid Plate

Some embodiments of the invention provide a multi-tool 10 having a tool-access skid plate 30. In these embodiments, the tool-access skid plate 30 can be incorporated into many different types of multi-tools. Generally, the multi-tool 10 will be adapted to carry a plurality of tools 16. Thus, the multi-tool 10 preferably has a plurality of tool-receipt openings 40 adapted to receive respective tools 16. The individual tools can be punching tools (i.e., punches), forming tools, threading tools (e.g., drop-in insert threading tools, such as those adapted to tap or thread internal or external surfaces), dies, or various combinations of different types of tools. The multi-tool can, for example, carry all punches, all forming tools, all dies, some punches and some forming tools, some punches and some dies, etc. In some cases, the tools 16 will be punches, and the tool-receipt openings 40 will be punch-receipt openings.

In the embodiment of FIG. 2C, the multi-tool 10 is shown with three tool-receipt openings 40. This, however, is by no means required, as there can be virtually any number of these openings. Moreover, the multi-tool 10 in some embodiments can be a multi-track multi-tool, where the multi-tool is adapted to carry multiple tracks of individual tools. Exemplary details of such multi-track multi-tools are provided later in this disclosure.

FIG. 2C shows a top view of an exemplary multi-tool 10 having a tool-access skid plate 30. Here, the multi-tool 10 has a driver assembly 12 (see FIGS. 1, 2A, 2B, and 2D) and a guide housing 14, and the driver assembly can be selectively attached to and removed from the guide housing. In FIG. 2C, the driver assembly 12 has been removed from the guide housing 14. As a result, an interior cavity 15 bounded by the illustrated guide housing 14 is exposed. In the illustrated embodiment, the skid plate 30 is located between this interior cavity 15 and the tool-receipt openings 40. Other embodiments, though, may not have the cavity.

Preferably, the skid plate 30 in the present embodiments can be put into at least one configuration in which it provides a tool-access opening 100 through which an individual tool 16 can be passed into or out of a selected tool-mount opening 40 of the multi-tool 10. With the skid plate 30 maintained in such a configuration, it preferably prevents at least one other tool-receipt opening 40 (in some cases a plurality, such as all, of the other openings 40) of the multi-tool 10 from being loaded or unloaded. This functionality can be achieved in different ways. For example, the skid plate 30 can have an opening 100 that moves to a desired position as the skid plate rotates. Alternatively, the skid plate can have one or more openings with moveable doors, flanges, etc. that can be selectively opened or closed. Other variants can be used as well.

Figure 6:
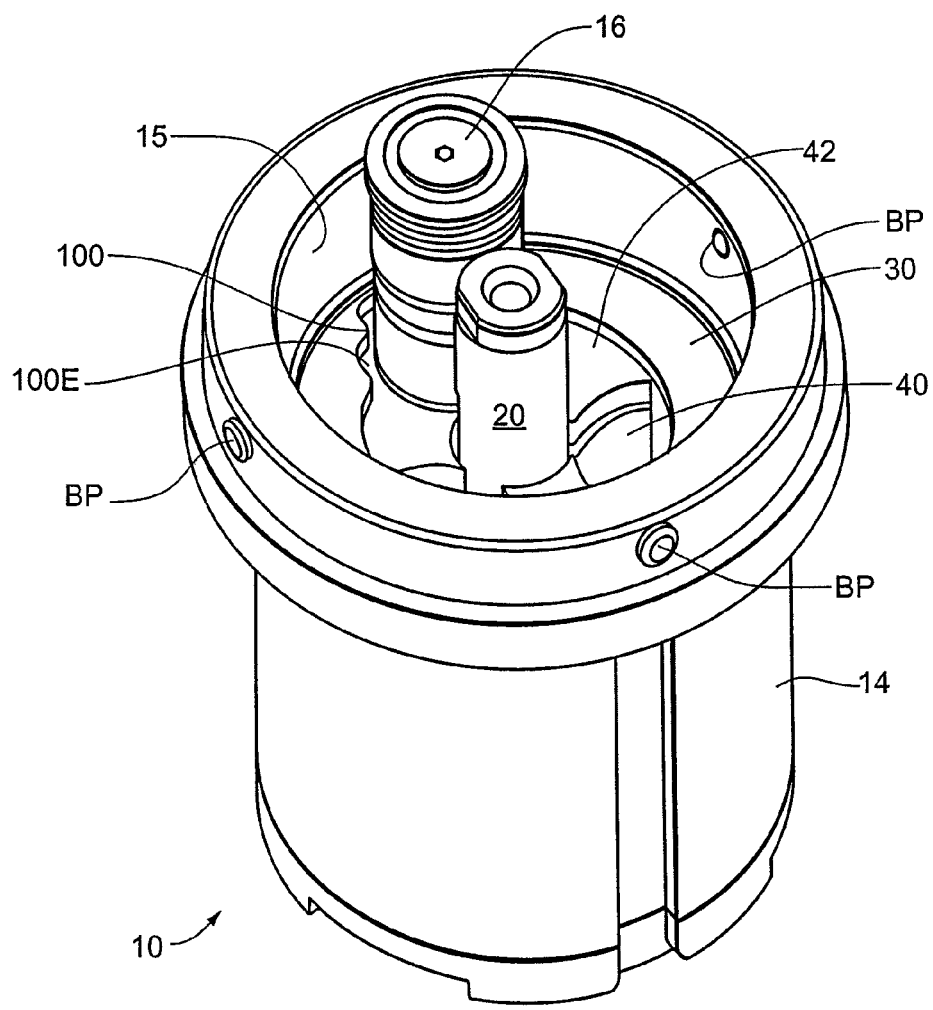
FIG. 6 shows a perspective view of a guide housing for a multi-tool in accordance with certain embodiments of the invention.

As is perhaps best seen in FIGS. 1, 2C, and 6, the tool-access skid plate 30 facilitates easy removal of a desired tool (optionally a desired punch) 16 from the multi-tool 10. The illustrated skid plate 30 has a tool-access opening 100 that can be selectively aligned with a desired one (optionally with any desired one) of the tool-receipt openings 40. Here, the skid plate 30 can be moved (e.g., rotated) relative to the guide housing (and/or relative to the tool-receipt openings) in such a way that the tool-access opening 100 can be selectively aligned with (e.g., moved to a position where it is directly over) a desired one (optionally any one) of the tool-receipt openings 40. In use, the skid plate can be moved relative to the guide housing/tool-receipt openings, the guide housing/tool-receipt openings can be moved relative to the skid plate, or both. Thus, the skid plate 30 preferably is mounted rotatably on the multi-tool (optionally or the guide housing). While this is not required in all embodiments, it will commonly be preferred. Thus, by causing relative rotation of the illustrated skid plate 30 and the tool-receipt openings 40, the tool-access opening 100 can be selectively aligned with a desired one of the tool-receipt openings 40. In some embodiments, by rotating the skid plate 30 about a central vertical axis VA of the multi-tool, the skid plate's tool-access opening 100 can be selectively aligned with any one of the tool-receipt openings 40.

Figure 37:
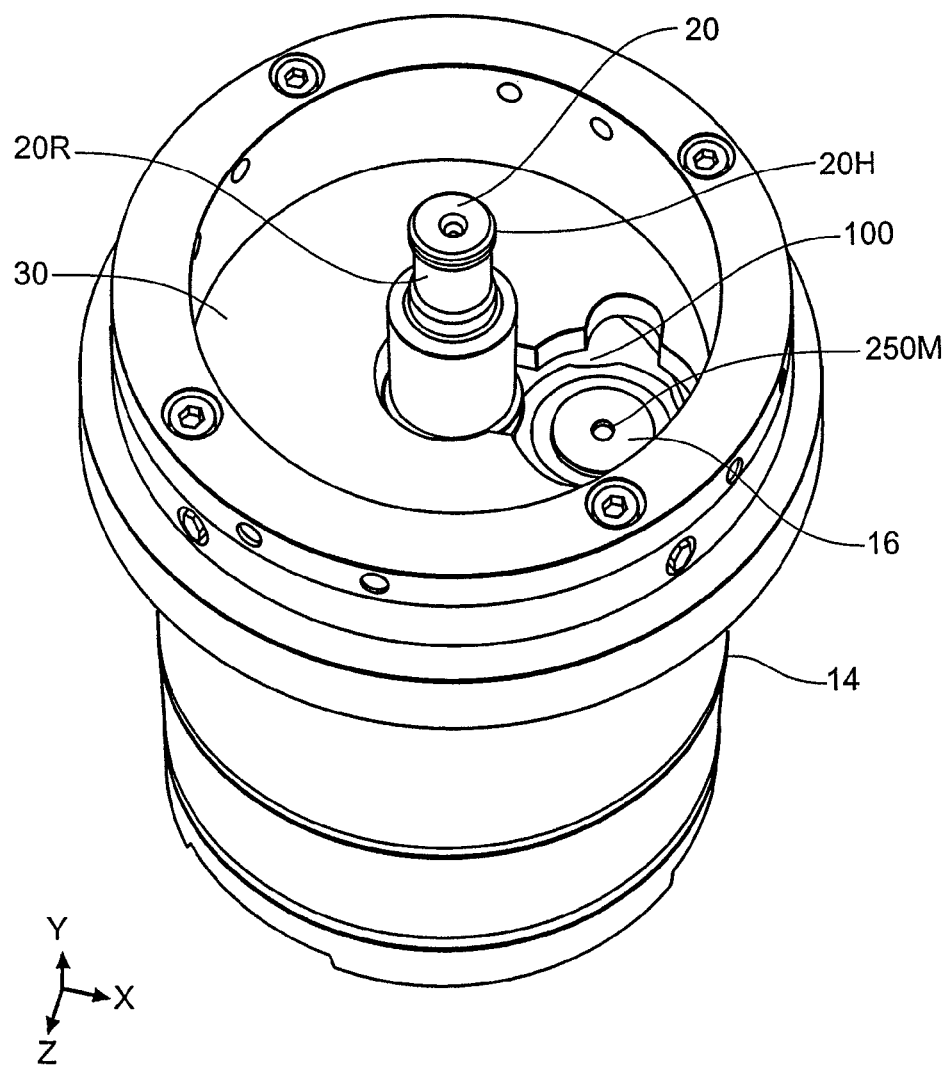
FIG. 37 is a perspective view of a guide housing having a center post in accordance with certain embodiments of the invention.
Figure 38:
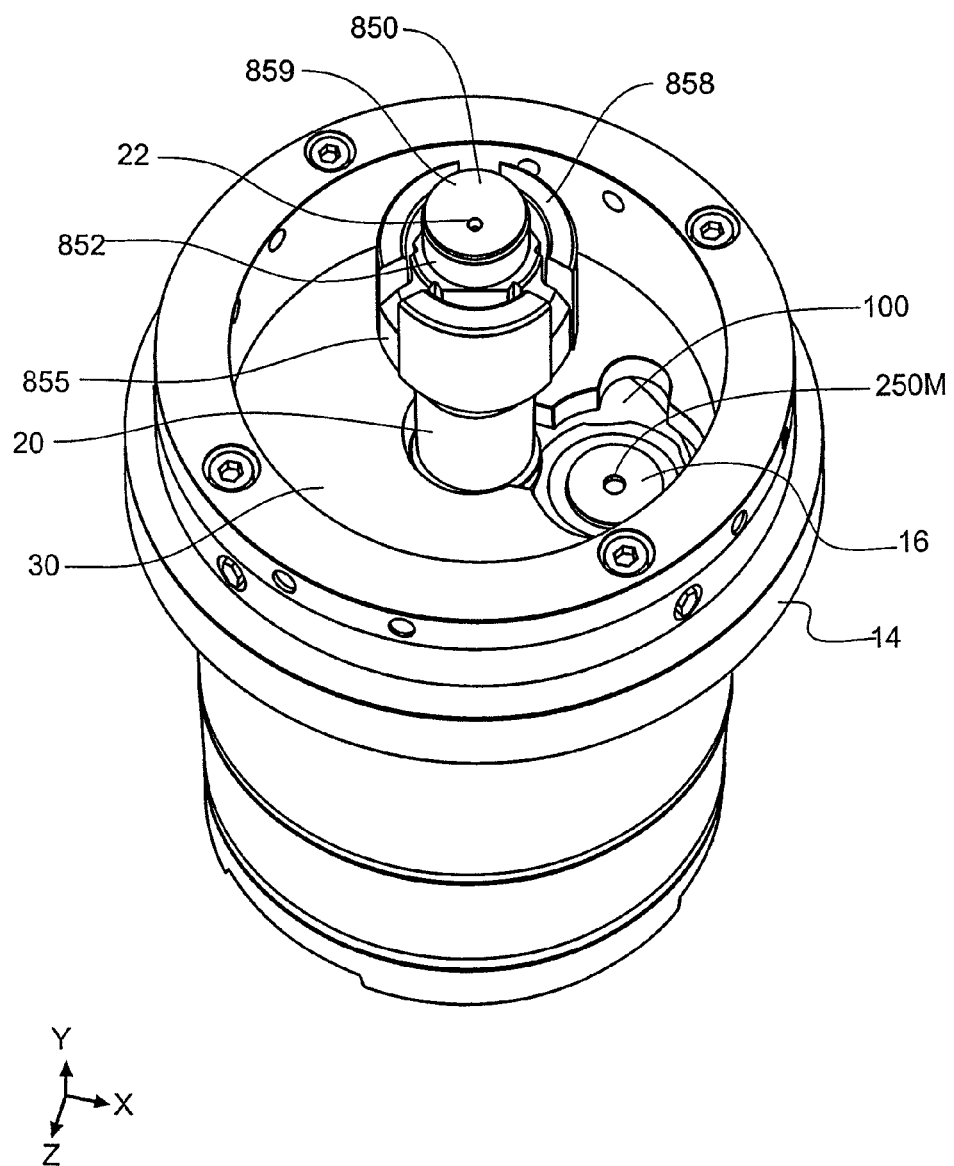
FIG. 38 is a perspective view of the guide housing of FIG. 37 with the center post having thereon locked the push-button assembly of FIG. 36.

When the tool-access opening 100 of the present skid plate 30 is aligned with an activated tool, the skid plate preferably defines a wall that prevents one or more (optionally all) of the non-activated tools in the multi-tool from escaping the tool-receipt openings 40 in which they are mounted (even when the driver assembly is removed from the guide housing). Referring to FIGS. 37 and 38, for example, it can be seen that the skid plate 30 confines (or encloses) all the tools other than the activated one within respective tool-receipt openings 40. Thus, when the driver assembly 12 is operably coupled with the guide housing 14 and skid plate 30, the illustrated skid plate provides a rotatable wall (preferably a rigid one) between all the non-activated tools and the driver assembly 12. These details, however, are not required for all embodiments.

The skid plate 30 can optionally have a generally annular (e.g., ring-shaped) and/or disc-shaped configuration. However, other configurations can be used. In certain embodiments, the skid plate 30 has an outer edge 104 that forms a circle (or a semi-circle). While this will commonly be preferred, it is not necessary. For example, the outer edge 104 of the skid plate 30 can alternatively form any of a variety of different polygonal shapes (a decagon, hexagon, etc., or a variety of irregular shapes).

In FIG. 2C, it can be appreciated that the skid plate 30 bounds and/or defines the tool-access opening 100. As noted above, this opening 100 facilitates loading tools into, and removing tools from, the multi-tool 10. In some embodiments, an operator has only to remove the driver assembly 12 from the guide housing 14 (which in some cases can be done by a tool-free operation, as described later in this disclosure)

before being able to load or unload tools. In other embodiments, such as that shown in FIG. 24, an operator can load or unload tools without removing the driver assembly 12 from the guide housing 14. In both embodiment types, it is not necessary to remove the skid plate from (or fully disassemble) the multi-tool before loading or unloading tools.

Figure 16:
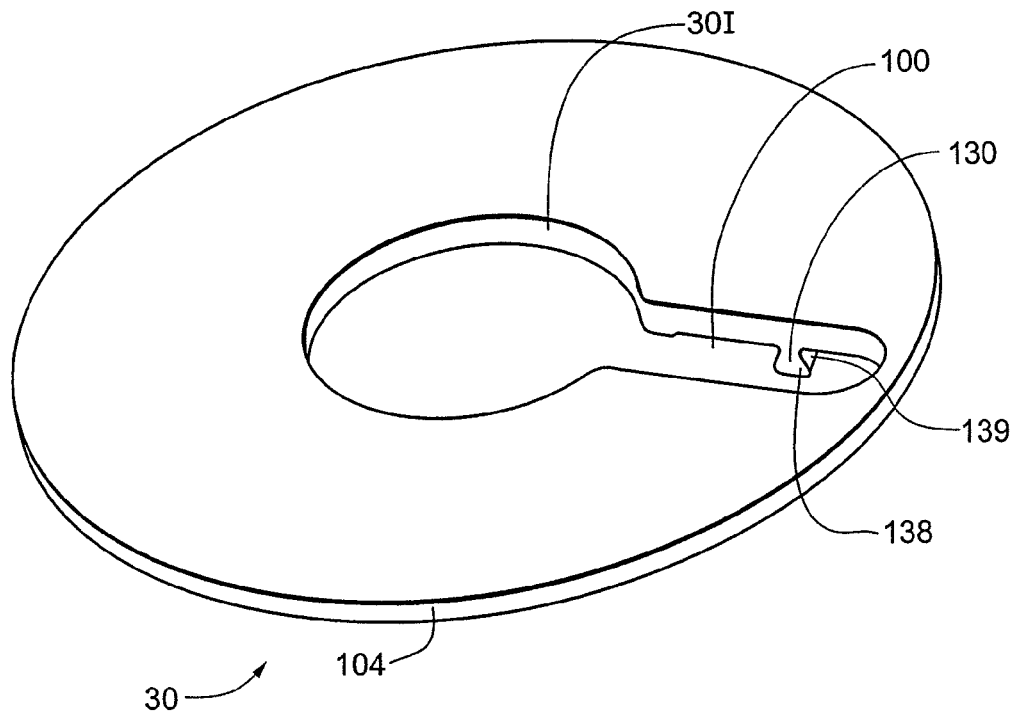
FIG. 16 shows a perspective view of a skid plate for a multi-tool in accordance with certain embodiments of the invention.
Figure 17:
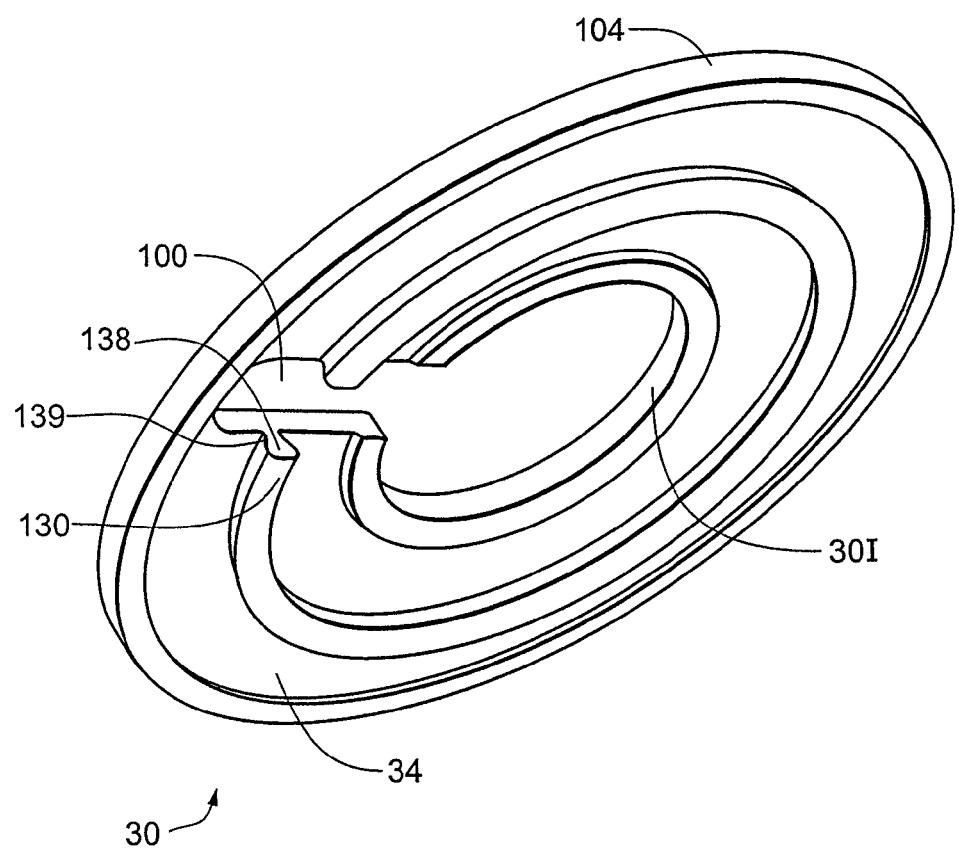
FIG. 17 shows a perspective view of a skid plate for a multi-tool in accordance with certain embodiments of the invention.
Figure 18:
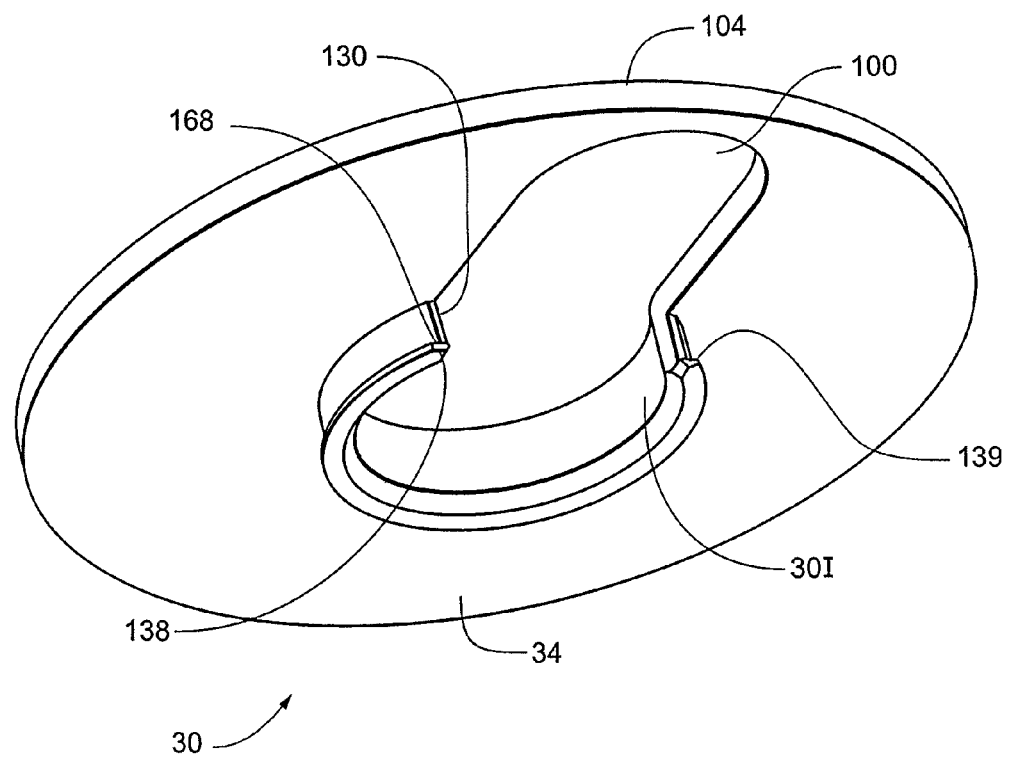
FIG. 18 shows a perspective view of a skid plate for a multi-tool in accordance with certain embodiments of the invention.

The opening 100 can have a wide variety of configurations/shapes. For example, the opening 100 can be generally semi-circular, generally square, generally rectangular, generally triangular, generally oblong, and/or elongated in a radial direction. FIGS. 16-18 exemplify certain embodiments wherein the opening 100 has an elongated configuration with a major dimension extending radially. Additionally or alternatively, the opening 100 can have an inside portion 100A (optionally having a generally circular configuration) through which tools can be loaded and unloaded for an inside track of the multi-tool, and an outside portion 100B (optionally having a generally circular configuration) through which tools can be loaded and unloaded for an outside track of the multi-tool. The multi-tool 10 may have one track, two tracks, or more, and the tool-access opening 100 may (as just one example) have one generally circular portion for each track.

When aligned with a desired one of the tool-receipt openings 40, the tool-access opening 100 provides a large enough passage that a desired tool 16 (e.g., a tool sized to be operably mounted in the desired tool-receipt opening) can be passed through the opening 100 and loaded into, or unloaded from, the desired tool-receipt opening 40.

The illustrated skid plate 30 has only one tool-access opening 100. However, this is not required. For example, the skid plate can alternatively have two or more tool-access openings.

In some of the present embodiments, the tool-access opening 100 is bounded by an inner edge 30I of the skid plate 30. In FIG. 2C, the illustrated opening 100 has a generally semi-circular overall configuration, although this is by no means required (e.g., it can alternatively have a generally square, rectangular, triangular, or oval configuration).

In certain embodiments, the tool-access opening has an interior dimension that is generally the same as a corresponding interior dimension of one or more (optionally each) of the tool-receipt openings. For example, in FIG. 4, the illustrated tool-access opening 100 has an interior dimension ID extending between two generally-confronting semi-circle sections 100SS defined by the inner edge 30I of the skid plate 30. This dimension can be generally the same, substantially the same, or the same as a corresponding interior dimension of an upper section (e.g., an upper section adapted to receive a head of a tool) of each tool-receipt opening 40. In FIG. 2B, the inner edge 30I of the skid plate 30 is (in one or more locations bounding the indexed tool-access opening 40) at least generally flush with an inner surface 211 of the wall bounding an upper section of that tool-access opening. In other embodiments, though, the tool-access opening 100 has significantly larger interior dimensions than the tool-receipt openings 40.

The tool-access opening 100 can be a cut-out made in the plate 30. The skid plate can be machined, for example, by taking a piece of round stock, putting the piece on a lathe, forming internal bores, forming any external bores, and then finishing each side. Many other methods can be used as well. For example, the skid plate 30 can be formed (e.g., cast) in the shape of a ring, and the tool-access opening 100 can then be cut out of the skid plate 30. Alternatively, the skid plate can be cast in such a way that it initially has both an annular shape and the tool-access opening 100. When a casting process is used, non-metal injection molding or metal injection molding may both be viable options.

In some embodiments, the skid plate 30 has a width (i.e., the distance between its inner edge 30I and its outer edge 104) that is smallest adjacent the tool-access opening 100. For example, the illustrated skid plate 30 has a width that is substantially the same at all locations about the perimeter (e.g., circumference) of the skid plate except at the tool-access opening 100 (where the width is smaller). In the illustrated embodiments, the tool-access opening 100 does not span the entire width of the skid plate 30. That is, the opening 100 does not extend entirely between the inner 30I and outer 104 edges of the skid plate 30. It is contemplated, though, that other embodiments can provide a skid plate wherein the tool-access opening is bounded between two confronting ends of the skid plate, e.g., such that the plate has a somewhat horseshoe-shaped configuration with the tool-access opening being defined between the two ends of the horseshoe. In still other embodiments, the tool-access opening is not open to the skid plate's central opening, unlike the illustrated embodiments.

The tool-access opening 100 can optionally have at least one key-passage portion 100K. When provided, the key-passage portion 100K preferably is configured to provide clearance for a key K on a tool 16 to be passed through the opening 100. This is perhaps best appreciated with reference to FIG. 4. Here, the key-passage portion 100K can be aligned with a keyway KW (which can optionally have a generally square or rectangular shape) that opens into a tool-receipt opening 40. In the embodiment of FIG. 4, the keyway KW is defined by a punch carrier (or "upper guide") 42 of the multi-tool 10 (the punch carrier optionally be mounted resiliently within the guide housing of the multi-tool). Additionally or alternatively, the punch guide tip can define a keyway.

In some embodiments, the inner edge 30I of the skid plate 30 has at least one semi-circle section 100SS (and perhaps more preferably a plurality of semi-circle sections) bounding the tool-access opening 100. When provided, the semi-circle section(s) can advantageously have a curvature (e.g., radius) that matches the curvature of a corresponding interior wall area of a tool-receipt opening 40. Here, the term "matches" can mean at least generally the same as, at least substantially the same as, and/or the same as. In FIG. 4, the semi-circle sections 100SS on opposite ends of the arrow (which shows inner dimension ID) have curvatures matching the respective curvatures of the adjacent (e.g., upper) interior wall areas of the indexed tool-receipt opening 40.

In FIG. 2B, each tool-receipt opening 40 has an upper region with a larger diameter than a lower region of the opening 40. The upper region is adapted to receive the head of a tool—in particular, a tool having a head with a larger dimension (e.g., diameter) than the rest of the tool (as exemplified by the tool 16 in FIG. 2B). This configuration, however, is not required in all embodiments.

In embodiments like that shown in FIG. 4, the inner edge 30I of the skid plate 30 has at least one irregular section bounding the tool-access opening 100. When provided, the irregular section does not have a regular semi-circle shape. For example, the irregular section can have a generally V-shaped configuration, a generally U-shaped configuration, a generally rectangular configuration, a generally square configuration, etc. The term "regular semi-circle shape" means the shape of a semi-circle having a radius that does not change substantially at different locations on the semi-circle. The portion of the inner edge 30I bounding the tool-access opening 100 can optionally have both an irregular section and a semi-circle section 100SS. In some cases, at least one irregular section is located between two semi-circle sections 100SS. For example, FIG. 4 shows an embodiment where irregular sections and semi-circle sections 100SS are arranged alternately in sequence. These features, however, are optional and need not be provided in other embodiments.

Referring to FIG. 2C, when it is desired to unload a tool, the skid plate 30 can simply be rotated (in either direction depicted by the arrow RA) until the tool-access opening 100 is aligned with a desired one of the tool-receipt openings 40. In FIG. 2C, only one individual tool 16 is in the multi-tool. To remove this tool 16 from the multi-tool, an operator can slide the skid plate 30 so it rotates in the noted manner until the tool-access opening 100 is aligned with the tool-receipt opening 40 that carries the illustrated tool 16. At this point, the aligned openings 100, 40 provide adequate clearance for the tool 16 to be removed from the multi-tool 10. To actually remove the tool 16, an operator can urge the tool 16 away from the bottom end 33 of the guide housing 14 (by using a magnetic pick-up or another clamping device, by tipping the multi-tool 10 upside down so gravity causes the tool 16 to slide out of the opening 40, by pushing the tip of the tool 16 into the multi-tool 10 and then grabbing the head of the tool 16 and pulling it out of the multi-tool, etc.).

Referring to FIG. 4, when it is desired to load a tool into the multi-tool, the skid plate 30 can be rotated until the tool-access opening 100 is aligned with a desired one of the tool-receipt openings 40. At this point, the aligned openings 100, 40 provide enough clearance for a desired tool to be passed through the tool-access opening 100 and into the desired tool-receipt opening 40. To actually load the tool, an operator can advance the tool in a tip-first manner into the desired tool-receipt opening (e.g., by advancing the tool's tip in a direction seen in FIG. 4 as going downwardly into the page).

When the multi-tool 10 is fully assembled (e.g., when the driver assembly 12 is attached to the guide housing 14), rotating the driver assembly 12 to a desired position preferably causes the skid plate 30 to rotate to a corresponding position. Thus, the skid plate 30 preferably rotates in response to the driver assembly 12 being rotated relative to the guide housing 14 (or vice versa). For example, when the illustrated driver assembly 12 is rotated, the striker 28 (e.g., a side surface 28S thereof) bears forcibly against the inner edge 30I of the skid plate 30, causing the skid plate to rotate together with the driver assembly. This conjoint rotation of the driver assembly 12 and skid plate 30 brings the striker 28, and the tool-access opening 100, into alignment with a selected tool. At this point, when the ram of a press strikes (or otherwise delivers pressing force to) the top of the multi-tool's driver assembly 12, the pressing force is delivered from the multi-tool's striker 28 directly to the activated tool 16, the tip of which then strikes a workpiece. (The term "tip" is used herein to refer to the workpiece-deforming surface(s) of a punch, forming tool, die, etc. regardless of its specific configuration.) Thus, pressing force is applied only to the activated tool(s) 16, rather than to all the tools 16 in the multi-tool 10. Here again, it is to be appreciated that the multi-tool 10 can optionally be adapted to simultaneously activate more than one of the tools 16 it carries.

In FIG. 2B, the skid plate 30 is disposed between a punch carrier 42 of the multi-tool 10 and a lip 102 extending inwardly from the guide housing 14 (e.g., extending inwardly from an inner wall 141 of the guide housing). Here, the lip 102 is defined by a spiral retaining ring, although this is by no means required. The lip 102 is far enough from the punch carrier 42 to allow the skid plate 30 to rotate freely in the space between the lip and the punch carrier. However, the lip 102 is close enough to the punch carrier 42 to prevent undue play of the skid plate 30 during pressing operations. Preferably, the skid plate 30 is adapted to rotate slidably relative to both the lip 102 and the punch carrier 42. The punch carrier 42 shown in FIG. 2B is mounted resiliently within the guide housing 14, although this is not required.

FIG. 2B exemplifies embodiments wherein a punch carrier 42 and a punch guide tip 43 are provided within the guide housing 14 such that one or a plurality of stripping springs 36 are located between the punch carrier and the punch guide tip. Here, the punch carrier 42 is moveable (relative to the guide housing) toward the lower guide (which is not moveable relative to the guide housing) against the bias of the stripping spring(s) 36, and heads 41 of all the tools 16 in the multi-tool 10 are supported by the punch carrier 42. Further, when the punch carrier 42 is in a default position (e.g., when the stripper springs 36 are not being compressed by a stroke of the ram), the illustrated skid plate 30 has a bottom surface adjacent to, at substantially the same position as, or even touching the top surfaces of the non-activated tools' heads 41. These details, however, are not required.

The outer edge 104 of the illustrated skid plate 30 is adjacent to, and is adapted to rotate slidably relative to, an inner wall 141 of the guide housing 14 (this can optionally be the case for any skid plate 30 of the present disclosure). In other embodiments, the skid plate is adapted to rotate about an inner shaft (or "retaining post" or "center post") 20 of the multi-tool (e.g., the inner edge 301 of the skid plate can have an interior diameter that is about equal to, or slightly larger than, an exterior diameter of an inner shaft 20 of the multi-tool, such that the inner edge 301 of the skid plate slides rotatably around the inner shaft 30 (in these embodiments, the outer edge 104 of the skid plate can optionally be spaced inwardly of the inner wall 141 of the guide housing).

In the embodiments of FIGS. 26-29 and 31, the skid plate 30 has a flange 30F extending around the exterior perimeter of the skid plate. When this skid plate 30F is mounted rotatably on the guide housing 14, the flange 30F is received in a channel on (e.g., defined by) the inside of the guide housing 14, as is perhaps best seen in FIG. 29. The skid plate 30, however, can be mounted on the guide housing 14 in various other ways. Preferably, the skid plate 30 is mounted such that it has freedom to rotate within, and relative to, the guide housing.

In some embodiments, a plurality of non-activated tools are received in respective non-selected ones of the tool-receipt openings 40, and the skid plate 30 prevents those (optionally all of the) non-activated tools from escaping (e.g., during pressing operations) the non-selected tool-receipt openings in which they are received.

In some of the present embodiments, the tool-access opening 100 is sized so that it can only be aligned (i.e., operably aligned) with one tool-receipt opening 40 at any given time. In embodiments of this nature, the configuration of the tool-access opening 100 is such that it cannot simultaneously be aligned with two or more of the tool-receipt openings 40 (at least not in such a way as would enable multiple tools 16 to be simultaneously passed through the tool-access opening 100 and into, or out of, such two or more tool-receipt openings). In other embodiments, though, the opening 100 is configured to allow two or more individual tools 16 to be simultaneously loaded or unloaded through the opening 100.

Certain embodiments involve a multi-track multi-tool, which may have a first plurality of tool-receipt openings spaced apart about an inside diameter, and a second plurality of tool-receipt openings spaced apart about an outside diameter. In these embodiments, it is desirable if the tool-access opening can be aligned with any one of the inside or outside tool-receipt openings. In some cases, the inside and outside tool-receipt openings are staggered so the tool-access opening when aligned, for example, with a selected inside tool-receipt opening is not aligned with any outside tool-receipt opening. In embodiments of this nature, the tool-receipt opening will commonly be adapted for being selectively aligned with only one tool-receipt opening at a time.

The skid plate can optionally comprise, or consist essentially of, a hardened material. For example, pre-hardened or through-hardened steel can be used to increase the life and durability of the skid plate. Thus, in one exemplary embodiment, the skid plate is formed of through-hardened steel.

One particular embodiment provides a skid plate 30 comprising, or consisting essentially of, a composite material. The composite material, for example, can be a non-metallic material selected from the group consisting of ceramic, porcelyn, carbon fiber, or another non-metallic material having a high strength-to-weight ratio. The present embodiment can extend to any multi-tool having a skid plate of this nature, whether or not it has a tool-access opening, tool-retention structure, etc.

In one exemplary embodiment, the skid plate 30 is formed of steel, has a thickness of between about 2 mm and about 5 mm, and has a circumference of between about 90 mm and about 105 mm. These dimensions, however, are provided simply as examples—they are not limiting. Rather, the skid plate 30 can have most any dimensions depending on the desired multi-tool size and configuration.

In the embodiment of FIG. 1, the multi-tool 10 is shown as having a generally cylindrical configuration. However, this is not required for any multi-tool embodiment of the present disclosure. For example, sheet feed, strip feed, or press brake applications may find particular benefit in embodiments where the multi-tool 10 is other than generally cylindrical. Shapes of this nature may also be beneficial for a variety of turret press applications, single-station press applications, etc.

In one embodiment, the multi-tool 10 has a generally cubic shape. The housing, for example, can be a box-like housing. In another embodiment, it has a generally triangular horizontal cross section. In still other embodiments, the multi-tool has an irregular configuration. Moreover, a variety of configurations involving various polygonal horizontal cross sections can be used.

Further, the tool-receipt openings 40 need not be generally circular in cross section. Here again, this is the case for any multi-tool embodiment of the present disclosure. The tool-receipt openings 40, for example, can have a cross section that is square, rectangular, triangular, oval-shaped, etc. In embodiments of this nature, the individual tools 16 preferably have corresponding non-round configurations, as this would provide a keying function for the tools 16.

Figure 24:
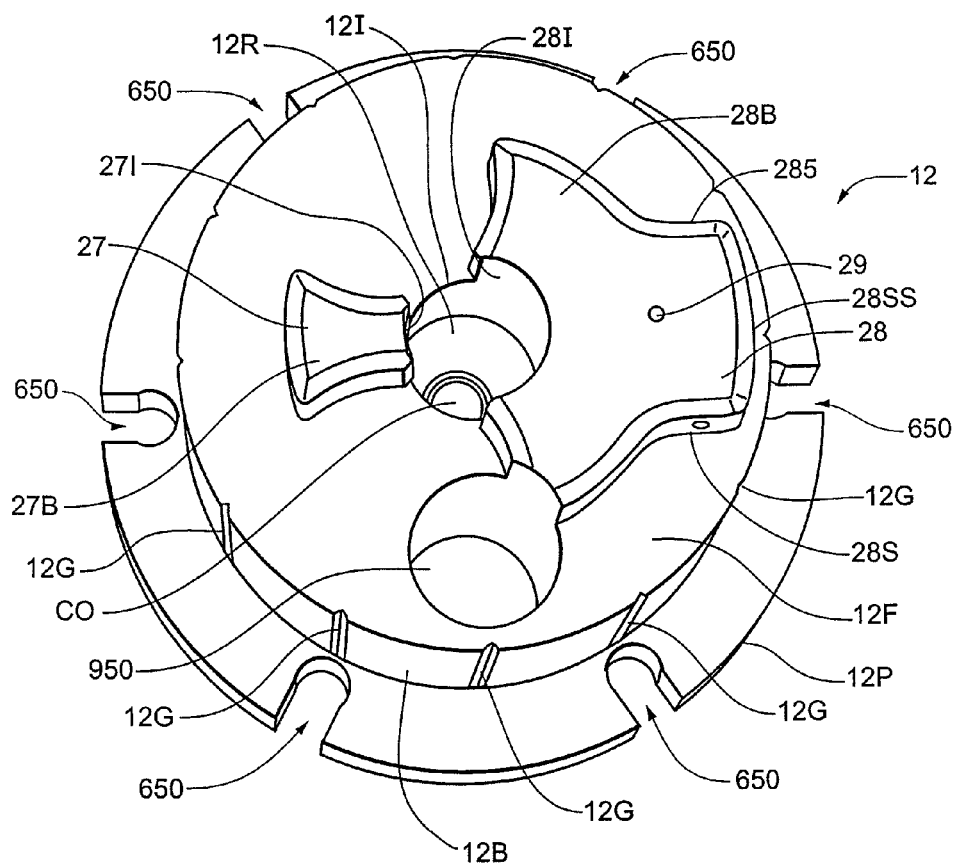
FIG. 24 shows a perspective view of a driver assembly for a multi-tool in accordance with certain embodiments of the invention.

In the embodiments exemplified by FIG. 24, the driver assembly 12 has a tool-access passage 950 that allows individual tools to be loaded into, or unloaded from, the multi-tool without having to remove the driver assembly from the multi-tool's guide housing. When the tool-access passage 950 is aligned with both a skid plate tool-access opening 100 and a desired one of the tool-receipt openings 40, the aligned tool-access opening 100 and passage 950 provide a large enough passageway for a desired tool 16 to be passed therethrough and loaded into, or unloaded from, the desired tool-receipt opening. In FIG. 24, the illustrated tool-access passage 950 extends entirely between top and bottom walls of the driver assembly 12. Here, the passage 950 opens through the top plate 12P and through the body portion 12B of the driver assembly 12. The illustrated tool-access passage 950 has a generally circular interior configuration, although this is by no means required.

Direct Lubrication System

In conventional multi-tools, the individual tools within the multi-tool commonly are lubricated by simply allowing oil to flow through an opening in the top of the multi-tool and down into the interior of the multi-tool, which results in the oil flowing downwardly through spaces between the individual tools and interior surfaces of the multi-tool, thereby lubricating those areas where oil naturally flows.

In the present embodiments, a direct lubrication system is provided for a multi-tool. The direct lubrication system can be incorporated into many different types of multi-tools. One exemplary embodiment is shown in FIG. 2B. The multi-tool 10 has a plurality of tool-receipt openings 40 adapted to receive respective tools 16. The multi-tool 10 includes a driver assembly 12 and a guide housing 14. The guide housing 14 preferably has an end (e.g., a working end, which in some cases is a bottom end) from which a tip of an activated tool (optionally an activated punch) can be extended during a pressing operation. In the embodiment of FIG. 2B, the driver assembly 12 and the guide housing 14 can be rotated relative to each other such that a striker 28 of the driver assembly can be selectively aligned with a desired one (optionally with any one) of the tool-receipt openings 40.

The multi-tool 10 can be of the fixed, indexable, or auto-indexable varieties (as is the case with all embodiments of this disclosure). In some embodiments, it may only be necessary (or possible) to rotate part of the driver assembly relative to the guide housing. For example, a central or inside portion of the driver assembly 12 may be rotatable relative to the guide housing 14, while the top lid (or only an outer perimeter portion of the top lid) may remain stationary relative to the guide housing. Moreover, other embodiments can provide for the striker to be aligned other than through rotation (e.g., by moving the striker radially). More generally, variations can be made in the structural design of the multi-tool, such as in components not forming the direct lubrication system itself.

In the present embodiments, the multi-tool has a direct lubrication system adapted for delivering lubricant (e.g., oil in liquid and/or mist form) directly to a selected (i.e., "activated" or "active") tool. In these embodiments, lubricant is delivered directly (optionally in a selective manner) to the active tool(s). Thus, during operation, the only direct lubricant flow to any of the individual tools in the multi-tool can optionally be to the/each activated tool. The multi-tool 10 in the present embodiments preferably has a direct lubrication passage 26 with an outlet 29 adapted to deliver lubricant directly to (optionally selectively to) a location adjacent to a selected one of the tool-receipt openings 40 (e.g., adjacent to a selected one of the individual tools in the multi-tool). The direct lubrication passage 26, for example, can be an elongated interior line (e.g., bore) extending through the driver assembly 12. In some cases, at least part of the line extends at an oblique angle relative to a vertical axis VA of the multi-tool. Reference is made to the embodiment of FIG. 2B. In other cases, the line has one or more lengths, each being parallel or perpendicular to the vertical axis VA. Reference is made to the embodiment of FIG. 26. Preferably, at least part of the direct lubrication passage 26 extends through (e.g., is defined by) the striker 28. In alternate embodiments, though, the lubrication passage opens through an outlet in driver assembly surface 12F (such an outlet may be in surface 12F, adjacent to the striker).

In the exemplary embodiment of FIG. 2B, during operation, lubricant is delivered through an opening 22 in (e.g., defined by) a top plate 12P of the driver assembly 12, and then into a lube reservoir 24 inside (e.g., surrounded by and/or defined by) the driver assembly 12. From there, lubricant travels through a direct lubrication passage 26 extending through (e.g., surrounded by and/or defined at least in part by) the driver assembly, eventually exiting from a lubrication outlet 29 defined by the striker 28. Thus, the internal lube reservoir 24 preferably is in fluid communication with the direct lubrication passage 26. When the illustrated multi-tool 10 is fully assembled and operatively mounted, for example, on an upper table of a press, the lubrication outlet 29 opens downwardly, although this need not always be the case. For example, the outlet can alternatively open through a side surface 28S, 28SS of the striker 28. In one embodiment of this nature, an outlet is located so as to open through a side surface 28SS that faces (and preferably is spaced apart from) an interior wall 141 of the guide housing 14 (when the multi-tool is fully assembled).

In FIG. 2B, the striker 28 and a selected tool 16 are aligned for delivery of a pressing force from the striker 28 to the selected tool 16. Here, the striker 28 is adapted to deliver pressing force directly to the selected tool 16 (e.g., by bearing directly against the head 41 of the tool). When the striker 28 and the selected tool 16 are aligned in this manner, the direct lubrication passage 26 preferably is oriented so that it has an outlet 29 adjacent to (e.g., opening directly toward) the selected tool 16. In this position, the outlet 29 preferably is closer to the selected tool than to any of the non-selected tools. For example, a vertical axis VA' (shown in FIG. 2B) passing through the outlet 29 preferably also passes through the selected tool 16.

Figure 26:
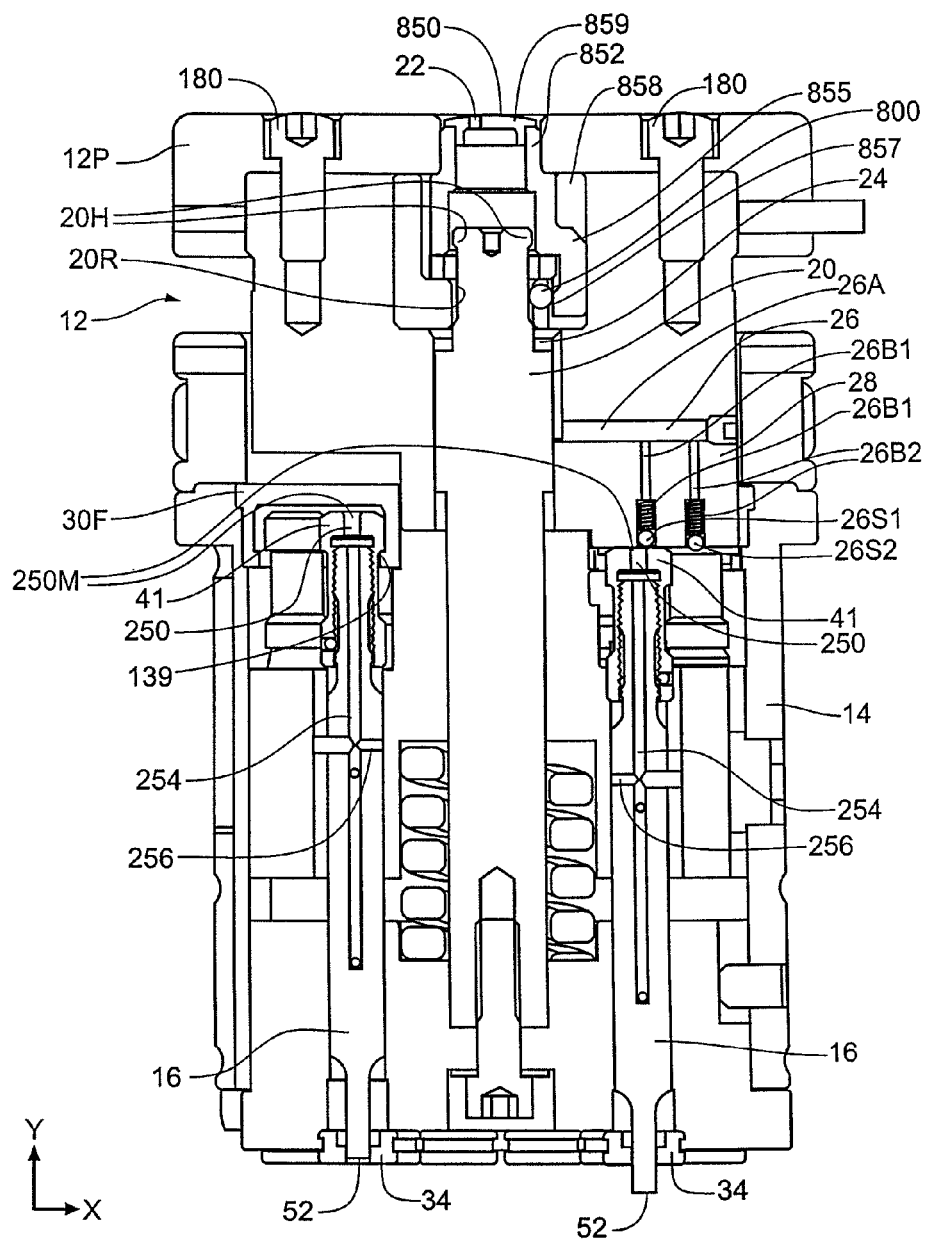
FIG. 26 is a side cutaway view of a multi-tool, with one activated tool and one non-activated tool being detailed, in accordance with certain embodiments of the invention.

In some cases, lubricant simply flows out of the direct lubrication passage 26, onto a head of the selected tool 16, and down around the sides of that tool. In other cases, the selected tool has an internal lube passage 250 that receives lubricant from the direct lubrication passage 26 and provides further distribution of the lubricant. The direct lubrication passage 26 can be configured, for example, such that it has an outlet 29 that is directly aligned with (e.g., directly above) an inlet 250M of an activated tool's internal lube passage 250. For example, the axis VA' can optionally pass through the inlet 250M of such a lube passage 250. In these and certain other embodiments, the lubricant flows from the lubrication passage 26 of the driver assembly into (e.g., directly into) the tool's lube passage 250. Reference is made to FIGS. 2B, 7A, and 26 as examples. In some embodiments of this nature (reference is made to FIG. 5), the lubricant travels along (e.g., down) the tool's lube passage 250 and into a lube reservoir 252 and/or through one or more distribution channels 254, 256, 258 inside the tool. In FIG. 2B, channels 258 are shown as being horizontal. They can alternatively extend downwardly at various angles. The same is true of channels 256. In embodiments where the tool has an internal lube passage 250, the lubricant eventually exits the tool via one or more outlets of the internal passage 250 and/or via one or more outlets of other internal channels 254, 256, 258. In embodiments like that of FIG. 5, the tool 16 can optionally have at least one external lubrication channel 76 on the tool's exterior. Such lubrication channels 76, when provided, are outwardly open channels defined by an exterior wall of the tool. In embodiments of this nature, the lubricant works its way around the lubrication channels 76 on the tool's exterior. As the activated tool 16 moves back and forth (e.g., up and down) during the pressing process, lubricant is distributed about the opening 40 in which the activated tool is carried. A system of this nature provides direct and thorough delivery of lubricant to the activated tool. When the driver assembly is rotated again relative to the guide housing (to activate a different tool), the direct (and optionally selective) lubrication process begins for the newly activated tool.

Thus, certain embodiments provide a multi-tool having a direct lubrication passage that is adapted for flowing lubricant selectively to one or more activated tools within the multi-tool. During operation of such a lubrication passage, lubricant from the passage may optionally be flowing only out of a lubrication outlet 29 that is adjacent to (e.g., directly above) an activated tool 16. If desired, a plurality of lubrication outlets can be provided directly above a single tool, such that those outlets together deliver lubricant directly (optionally selectively) to the activated tool.

In certain embodiments, the striker has a lubrication outlet 29 equipped with an O-ring or another sealing device, e.g., such that operatively positioning the sealing device between the striker 28 and the head 16 of an indexed tool 16 results in the sealing device creating a continuous sealed (or substantially sealed) passage through which lubricant can flow in passing from the driver into the activated tool 16. A sealing device of this nature may help assure that all, or substantially all, of the lubricant that flows out of the lubrication outlet 29 is delivered directly into the lubrication inlet 250M of the activated tool.

Some direct lubrication embodiments provide a multi-tool (or just a driver assembly 12 for a multi-tool) wherein the direct lubrication system (e.g., a direct lubrication passage thereof) is equipped with one or more seals each having an open configuration and a closed configuration. Preferably, when such a seal is in the closed configuration, lubricant is prevented from flowing out of the driver assembly (or at least out of a lubrication outlet 29 associated with that seal). For example, the driver assembly (e.g., a direct lubrication passage thereof) can have one or more lubrication outlets 29 equipped with such seals. In these cases, when each seal is closed, lubricant preferably is prevented (entirely or substantially) from passing through the outlet(s) 29. In alternate embodiments, a seal is used that does not stop lubricant from flowing through the outlet(s) 29, but restricts flow to a desired level.

One group of embodiments provides a driver assembly 12 including a striker 28 and a lubrication outlet 29 with a seal that opens in response to the striker contacting (and/or moving into a force-delivery alignment with) a selected tool 16 (optionally a head 41 thereof). In these embodiments, the seal may have a closed configuration that is the default configuration for the seal, such that when the striker is not in contact with (e.g., is spaced from) the head of the selected tool 16, the seal is retained in the closed configuration. In certain embodiments, the seal can be actuated (e.g., selectively opened or closed) by non-mechanical means, such as an electric actuator, a pneumatic actuator, a hydraulic actuator, a magnetic actuator, etc.

FIGS. 25-30 exemplify embodiments involving a driver assembly 12 with a lubrication outlet 29 equipped with a seal. Here, the seal is a ball seal. In FIG. 26, the ball 26S1, 26S2 is disposed in an end region 26B1, 26B2 of the lubrication passage 26. The illustrated ball 26S1, 26S2 is spring biased toward a closed configuration, in which the ball seals the lubrication outlet 29. When the illustrated ball is in its closed configuration, part of the ball projects beyond the striker surface 28B adapted to deliver pressing force to a selected tool 16. Thus, when the striker 28 contacts the selected tool, the ball 26S1, 26S2 is forced further inside the end region 26B1, 26B2 of the lubrication passage 26, thereby opening the lubrication outlet 29 so that lubricant can flow to the selected tool.

In the exemplary embodiments of FIGS. 25-30, the driver assembly 12 has two lubrication outlets 29. This particular driver assembly 12 is for a multi-tool 10 adapted to hold multiple tracks of tools (including an inside track and an outside track). The inside track of tools is arranged about a smaller diameter of the multi-tool than is the outside track. Thus, the driver assembly 12 includes one lubrication outlet 29 adapted for delivering lubricant directly to any selected one of the tools of the inside track, and another lubrication outlet 29 adapted for delivering lubricant directly to any selected one of the tools of the outside track. In FIG. 26, for example, the inside lubrication outlet 29 (the one closest to the center post and/or central axis of the multi-tool) is aligned with a selected tool of the multi-tool's inside track. Thus, ball 26S1 is in an open position, while ball 26S2 is in a closed position.

The multi-tool 10 can alternatively have a single track of tools 16. Thus, the driver assembly 12 may have a single lubrication outlet 29. Reference is made, for example, to FIGS. 2B, 7A, 7B, 13, 19, and 22. In general, the multi-tool 10 in any embodiment of this disclosure can have a single track of tool-receipt openings, or multiple tracks of these openings.

When the driver assembly is provided with a sealable lubrication outlet 29, the seal on the outlet can take many different forms. For example, the ball in the noted embodiments can be replaced with a plug of many different configurations. The plug may have a protrusion that contacts the activated tool, causing the plug to move so as to open its lubrication outlet. Or, the plug may be selectively opened by other means (a camming actuator, motor, etc.) at such time as it is desired to open its lubrication outlet 29. Moreover, the spring 26SP on a ball seal 26S1, 26S2 (or other plug) can be omitted, if so desired.

Figure 30A:
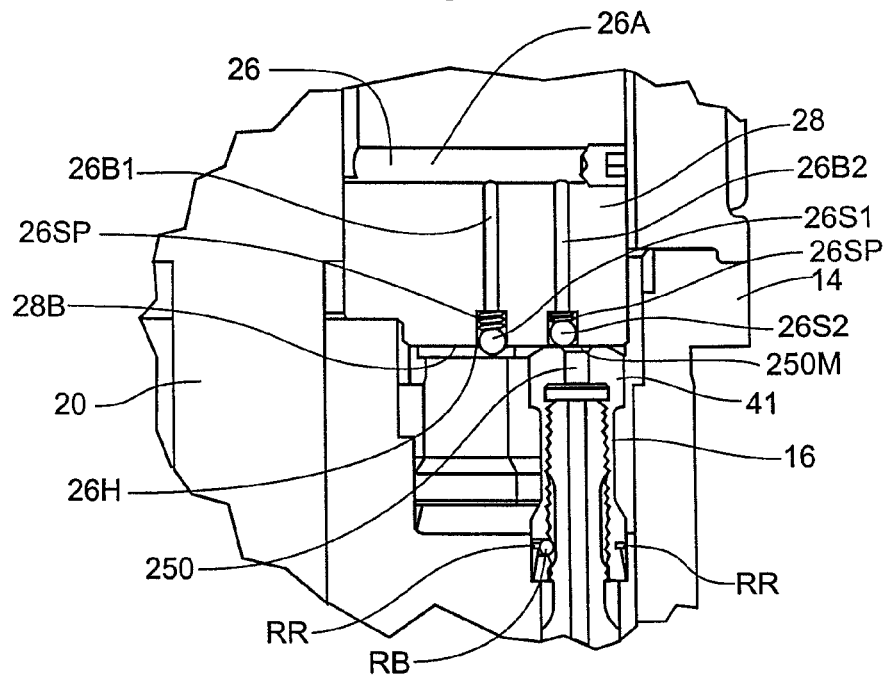
FIG. 30A is a broken-away detail view showing engagement of a striker (or "hammer") of a driver assembly and an activated tool in accordance with one embodiment of the invention.

In FIG. 26, the ball seat is formed by peening the wall surrounding the outlet 29, so that an inwardly extending lip around the outlet 29 keeps the ball from falling out. Alternatively, the ball and optional spring 26SP can be provided in the form of a small housing 26H mounted in the end region of the bore 26B1, 26B2. Reference is made to FIG. 30A.

By providing a driver assembly 12 with a sealable lubrication outlet 29, the lubrication delivery system can provide metered oil flow. This also allows the multi-tool to employ pressurized lubrication flow (as described below), and it conserves lubricant.

In certain embodiments, a multi-tool with a direct lubrication system is provided in combination with a press machine having a built-in ram air/oil lubrication system. The air/oil lubrication system can be a conventional system adapted for delivering a pressurized stream of air and oil (e.g., oil mist) into an opening 22 in the multi-tool 10, through a direct lubrication channel 26 of the driver assembly 12, and into an inlet 250M of an activated tool's internal lube passage 250.

In some of the present embodiments, the multi-tool has a vertical axis VA and the direct lubrication passage 26 extends along an axis AA (FIG. 7B) that is offset from the vertical axis VA by an oblique angle. In certain embodiments of this nature, the oblique angle is between about 10 degrees and about 60 degrees, and perhaps more preferably between about 15 degrees and about 55 degrees, such as about 20-40 degrees. In some cases, the entire length of the direct lubrication passage 26 extends at such an angle. In other cases, only a certain portion (optionally at least half of the full length) of the direct lubrication passage 26 extends at such an angle. In one group of embodiments, the direct lubrication passage 26 extends (e.g., only, or in combination with one or more angled extensions) in a series of horizontal and vertical directions. For example, FIGS. 22, 23, 26, 27, 30A, and 30B illustrate direct lubrication passages 26 wherein a first section extends horizontally (and/or parallel to the striker's load-delivery surface) away from a reservoir 24 in a central area of the driver assembly 12, and a second section (or each of a plurality of second sections) extends vertically (and/or perpendicular to the striker's load-delivery surface) from the first section to a lubrication outlet 29.

Thus, in the present embodiments, the driver assembly 12 preferably defines a direct lubrication passage 26 having an outlet 29 adapted to deliver lubricant directly to a location adjacent to a desired one (optionally any selected one of a plurality) of the tool-receipt openings 40. In some cases, the direct lubrication passage 26 is adapted for delivering lubricant selectively to (e.g., exclusively to, or substantially exclusively to) that location during pressing operations. Moreover, the driver assembly 12 can optionally be configured such that, when lubricant is being delivered to a location adjacent to a desired one of the tool-receipt openings 40, the driver assembly restricts (and optionally prevents substantially all) lubricant flow to non-selected ones of the tool-receipt openings. In the embodiment of FIG. 7B, for example, the central opening CO (defined by the illustrated driver assembly 12) can optionally be equipped with a fastening assembly that restricts, or even prevents substantially all, oil flow through the opening CO. For example, the fastening assembly can comprise a fastener (e.g., bolt) 18 and/or a sealing member (e.g., washer) 201 adapted to restrict, or even prevent substantially all, oil flow through the central opening CO. In some embodiments, though, oil is allowed to pass not only through the direct lubrication passage 26, but also through the central opening CO. For example, the fastener 18 and/or sealing member 201 can be configured to leave one or more passages through which oil can flow. In embodiments of this nature, oil can simultaneously be delivered directly to the activated tool (through the direct lubrication passage) and indirectly to non-activated tools in the multi-tool 16.

Figure 25:
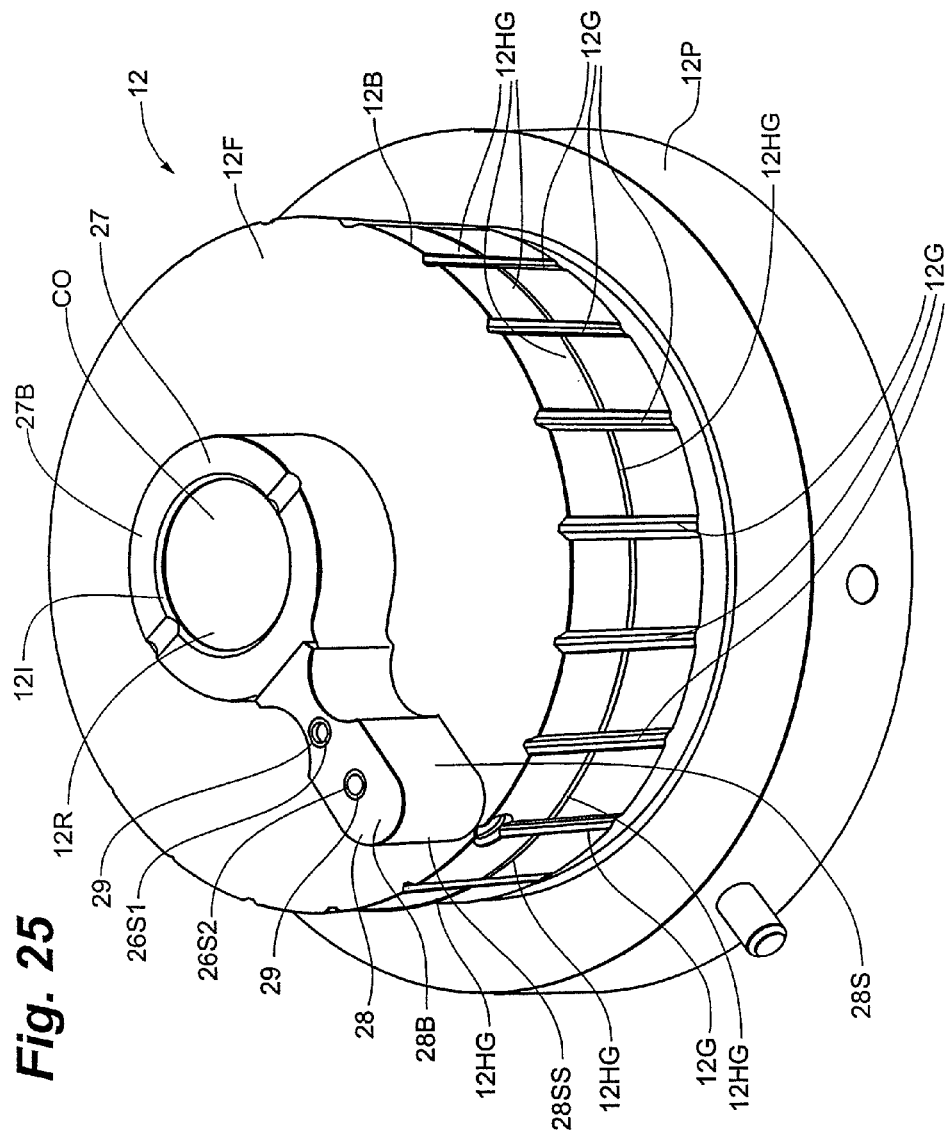
FIG. 25 is a perspective view of a driver assembly in accordance with certain embodiments of the invention.

FIG. 2D exemplifies embodiments wherein the driver assembly 12 has a top plate 12P and a body portion 12B. Here, the top plate 12P has a generally disk-shaped configuration, the body portion 12B has a generally cylindrical configuration, and the top plate has a larger diameter than the body portion. Another embodiment of this nature is shown in FIG. 25. The driver assembly 12 in any embodiment of this disclosure can optionally have such a configuration. These details, however, are strictly optional. For example, sheet feed, strip feed, or press brake applications may find particular benefit in embodiments where other configurations are used. Other configurations may also be beneficial for a variety of turret press applications, single-station press applications, etc. For example, the top plate 12P need not be disk-shaped. Instead, it can be square, rectangular, oblong, etc. Similarly, the body portion 12B need not be cylindrical. Instead, it can be generally cube shaped, etc.

In the present embodiments (which may provide a multi-tool, or a driver assembly 12 for a multi-tool), the body portion 12B of the driver assembly 12 can optionally have an exterior side with a series of grooves. The grooves can be of any type illustrated in this disclosure and/or described below in the "Rotation Groove Technology" section.

The body portion 12B of the illustrated driver assembly 12 has (e.g., defines) a bottom face 12F from which the striker 28 projects. The illustrated bottom face 12F is planar, although this is not required. FIG. 2D is representative of embodiments wherein the direct lubrication passage 26 extends through the body portion 12B of the driver assembly 12 and through the striker 28 before opening through a bottom surface 28B of the striker.

The striker's bottom surface 28B (or "load-delivery surface") preferably is adapted to deliver pressing force to an activated tool 16 (e.g., to a head 41 thereof). In certain embodiments, the striker 28 is configured such that its load-delivery surface 28B can contact any desired one of a plurality of tools 16 (optionally any one of the tools) in the multi-tool 10 without contacting any other tool 16 in the multi-tool. Different striker configurations of this nature are shown, for example, in FIGS. 2D, 24, and 25.

In one group of embodiments, the body portion 12B of the driver assembly 12 bounds a central opening CO into which a retaining post (or "center post") 20 can be extended as part of an assembly for fastening the driver assembly to the guide housing 14. In FIG. 2D, the striker 28 is located on one side of the central opening CO, and a shoulder 27 (optionally projecting from the bottom face 12F of the body portion 12B) is located on another side of the central opening. Here, the shoulder 27 is diametrically aligned with an outlet 29 of the direct lubrication passage 26. That is, an axis passing through the outlet 29 and across a full diameter of the central opening CO also passes through the shoulder 27. In FIG. 25, the shoulder 27 completely surrounds the central opening CO. Other variants will be apparent given the present disclosure as a guide.

As noted above, the striker 28 in the present embodiments preferably has (e.g., defines) a lubrication outlet 29. The bottom surface 28B of the striker 28 may be flush with the bottom surface 27B of the shoulder 27 (both surfaces 27B, 28B may be planar). Alternatively, the striker's bottom surface 28B may be further from surface 12F than is the shoulder's bottom surface 27B, as shown in FIG. 25.

With reference to FIG. 2D, it can be appreciated that the illustrated striker 28 has a side surface 28SS facing away from the central opening CO. Likewise, the illustrated shoulder 27 has a side surface 27SS facing away from the central opening CO. Here, side surface 28SS has a first radius, side surface 27SS has a second radius, and the first radius is greater than the second radius. Further, the illustrated striker 28 has an inner side surface 28I adjacent to the central opening CO. Likewise, the illustrated shoulder 27 has an inner side surface 27I adjacent to the central opening CO. In the embodiment of FIG. 2D, these two inner surfaces 27I, 28I are confronting surfaces having the same radius (which is the radius of the central opening CO). These features, however, are optional and need not be provided in other embodiments.

Here again, the tool-receipt openings 40 need not be generally circular in cross section. This is the case for any multi-tool embodiment of the present disclosure. The tool-receipt openings 40, for example, can have a cross section that is square, rectangular, triangular, oval-shaped, etc. In embodiments of this nature, the individual tools 16 preferably have corresponding non-round configurations, as this would provide a keying function for the tools.

Tool-Retention Skid Plate

Certain embodiments of the invention provide a multi-tool 10 having a skid plate 30 with a tool-retention structure 130. In these embodiments, the tool-retention structure 130 can be incorporated into many different types of multi-tools. Preferably, the multi-tool 10 will be adapted to carry a plurality of tools (optionally punches) 16. For example, the multi-tool 10 preferably has a plurality of tool-receipt openings 40 adapted to receive respective tools 16. In some cases, the tools 16 will be punches, and the tool-receipt openings 40 will be punch-receipt openings. Generally, though, the individual tools in the multi-tool can be dies, forming tools, punches, some dies and some punches, some punches and some forming tools, etc.

Figure 8:
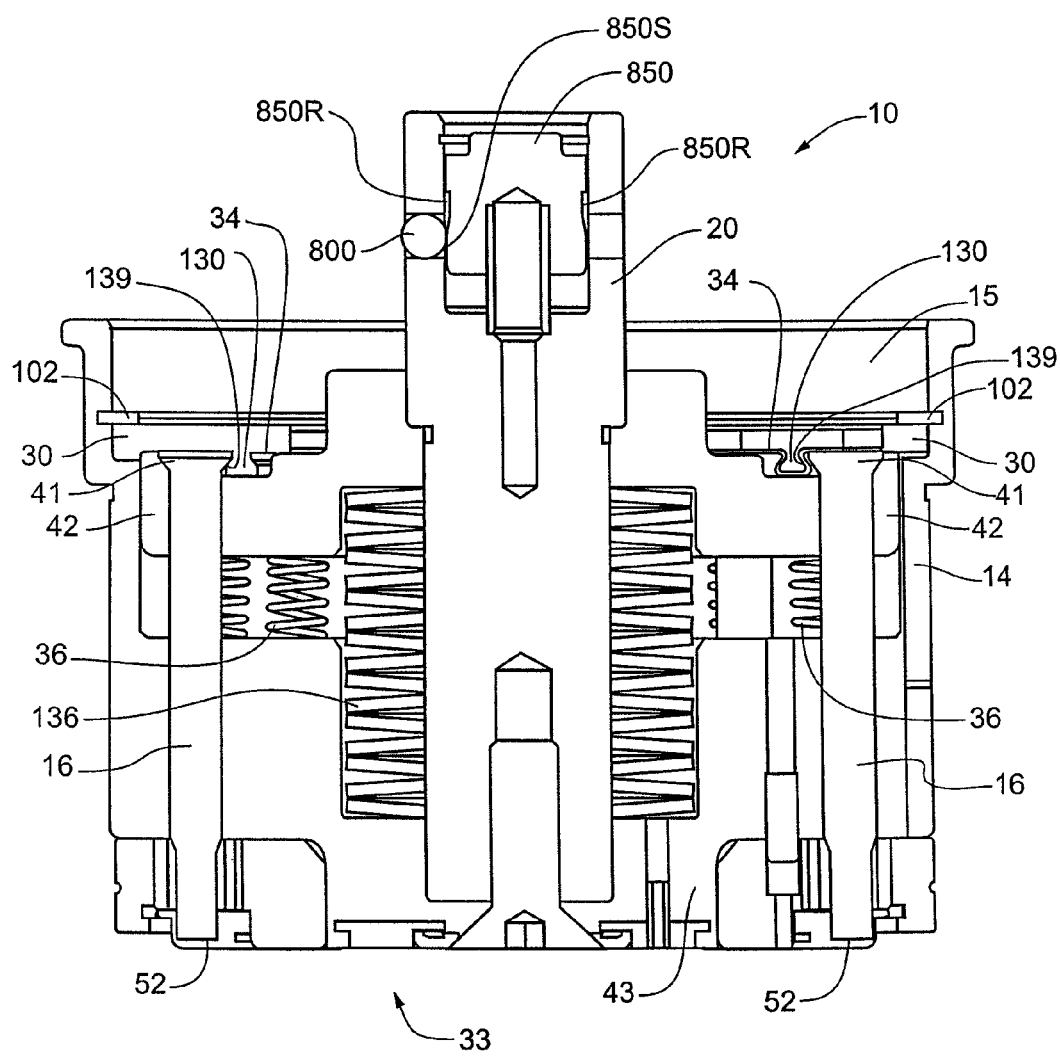
FIG. 8 shows a side cutaway view of a multi-tool, with tools mounted therein, and a skid plate in a first orientation, in accordance with certain embodiments of the invention.

FIG. 8 shows a side cutaway view of a guide housing 14 having a skid plate 30 with an exemplary tool-retention structure 130. Here, the guide housing 14 has a working end (optionally, a bottom end) 33 from which a tip (which can be any workpiece-deforming surface or surfaces) of an activated tool can be extended during pressing operations. Preferably, a driver assembly 12 can be removably attached to the guide housing 14. When the driver assembly is removed from the illustrated guide housing, an interior cavity 15 bounded by the guide housing 14 is exposed. The tool-retention skid plate 30 is located between this cavity 15 and the tool-receipt openings 40. In other embodiments, there may be no cavity 15 of this nature. The skid plate 30 has a tool-retention structure 130 adapted for securing a non-activated tool (optionally a plurality of non-activated tools, perhaps all the non-activated tools) in a restrained position such that the (or each) non-activated tool is prevented during pressing operations from coming into contact with the workpiece.

Figure 29:
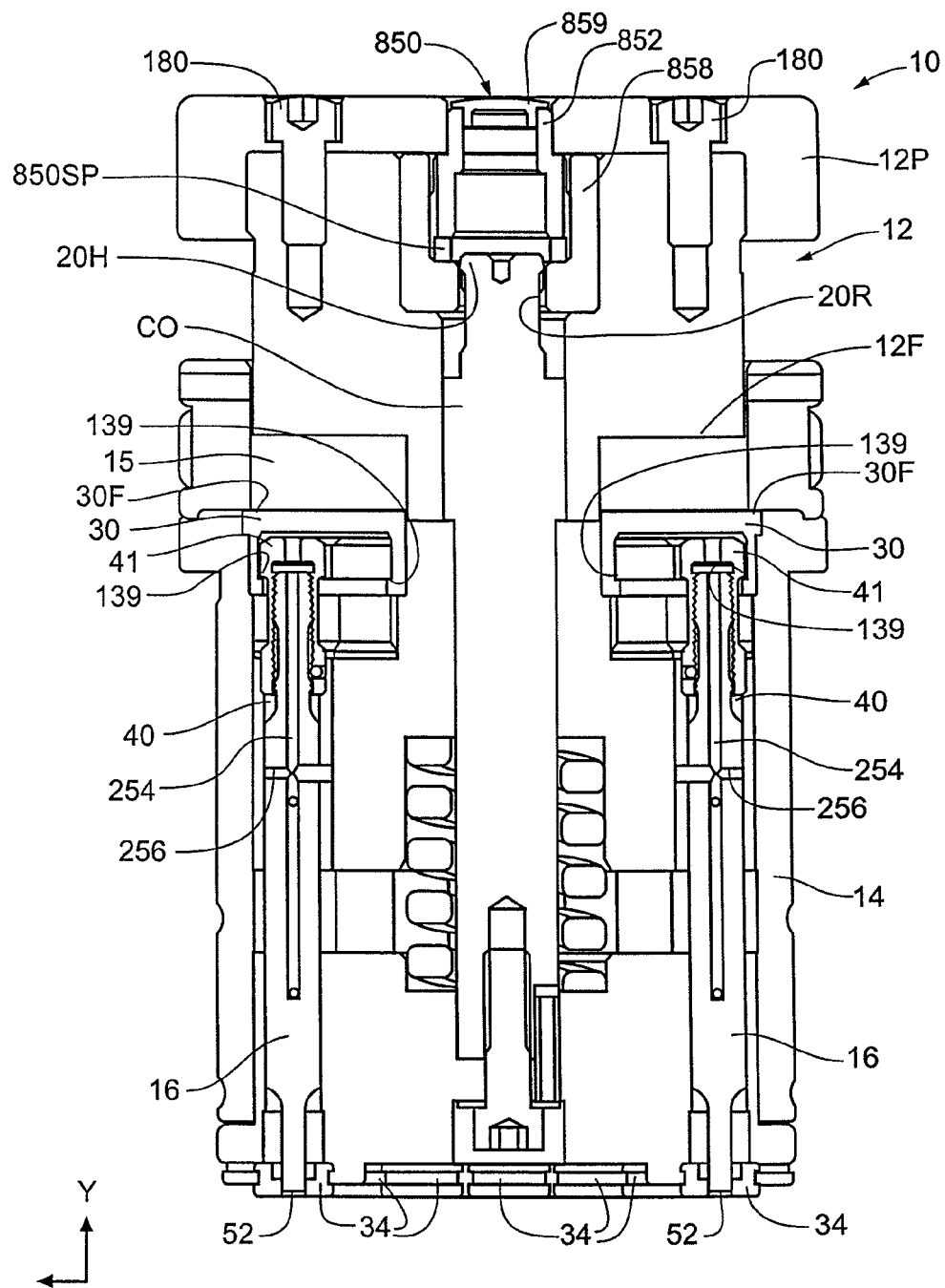
FIG. 29 is another side cutaway view of the multi-tool of FIG. 28.

The tool-retention structure 130 can optionally be adapted to hold a non-activated tool so as to prevent all or substantially all vertical movement of the non-activated tool relative to the skid plate (even when pressing operations are being conducted with an activated tool in the same multi-tool). Reference is made to FIG. 8. In other cases, when the tool-retention structure 130 is engaged with a non-activated tool, that tool is prevented from moving (e.g., downwardly) into contact with the workpiece, but has some freedom to move vertically within the confines of the skid plate's tool-retention structure 130. Reference is made to FIG. 29. In illustrated embodiments, the tool-retention structure 130 is adapted to retain the head of the (or each) non-activated tool adjacent to the skid plate 30 (e.g., adjacent to a bottom surface 34 of the skid plate). This, however, is not strictly required.

In some cases, the skid plate 30 in the present embodiments is adapted to prevent all non-activated tools 16 in the multi-tool 10 from coming into contact with the workpiece during pressing operations. By keeping non-activated tools off the workpiece, the present multi-tool allows manufacturers to produce higher quality products. For example, the non-activated tools are prevented from scratching or otherwise marring the workpiece.

Thus, some embodiments provide a multi-tool having a skid plate 30 adapted to retain all but a selected subset (in many cases, all but one) of a plurality of tools 16 carried by the multi-tool, e.g., such that the tips of the non-selected tools are all prevented from contacting the workpiece during pressing operations. In embodiments of this nature, the tips of the non-selected tools may fall due to gravity and strike the workpiece during pressing operations but for the skid plate's tool-retention structure.

In some of the present embodiments, the tool-retention structure 130 of the skid plate 30 has a contact surface 139 (optionally a rigid surface) that is adapted to engage a non-activated tool (optionally a head 41 thereof) so as to prevent that tool from moving (e.g., downwardly) into contact with the workpiece during pressing operations. The contact surface 139, for example, can be defined by a projection of (e.g., a downward projection of) the skid plate 30. When the skid plate is operatively assembly on the multi-tool, this projection can extend toward a working end 33 (optionally a bottom end) of the guide housing 14 from a surface 34 (optionally a bottom surface) of the skid plate 30. In the embodiments of FIGS. 8, 10, 15-17, and 24, the contact surface 139 is defined by a shoulder that projects (e.g., downwardly) from a surface 34 of the skid plate 30 and is adapted to engage the head of a non-activated tool. This shoulder can optionally be an integral extension of the skid plate. In the embodiments of FIGS. 11, 12, 18, 26-29, and 31, the contact surface 139 is defined by a rib that extends (e.g., downwardly) from a surface 34 of the skid plate 30. Here, the tool-retention structure 130 comprises a rib with a lip 138 (which in some embodiments extends toward a non-activated tool) defining the tool-contact surface 139 (which can optionally be an upwardly-facing surface). This tool-contact surface 139 is adapted to engage a surface 168 (optionally a downwardly-facing surface) of the head 41 of a non-activated tool.

Figure 9:
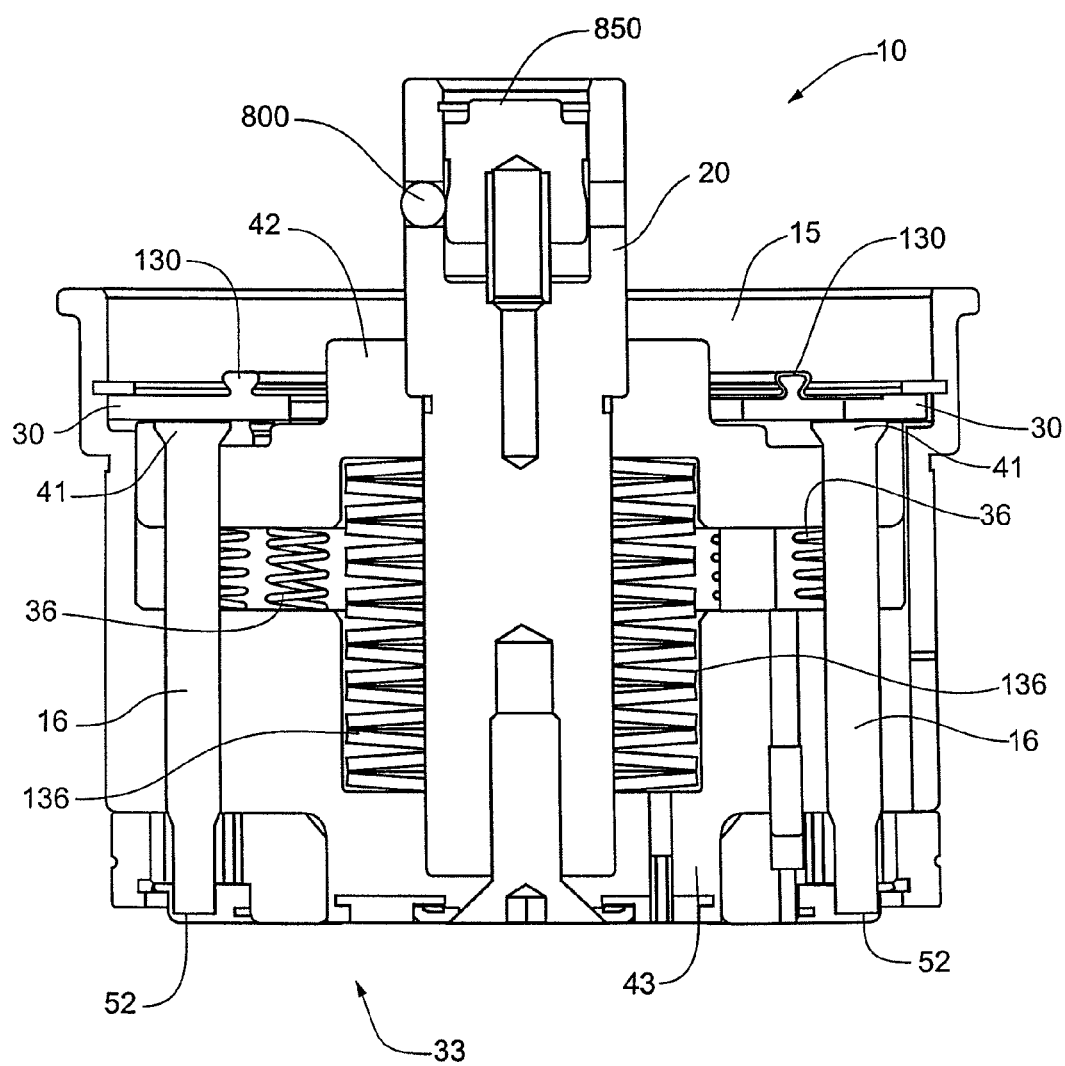
FIG. 9 shows a side cutaway view of the multi-tool of FIG. 8, with the skid plate in a second orientation, in accordance with certain embodiments of the invention.
Figure 10:
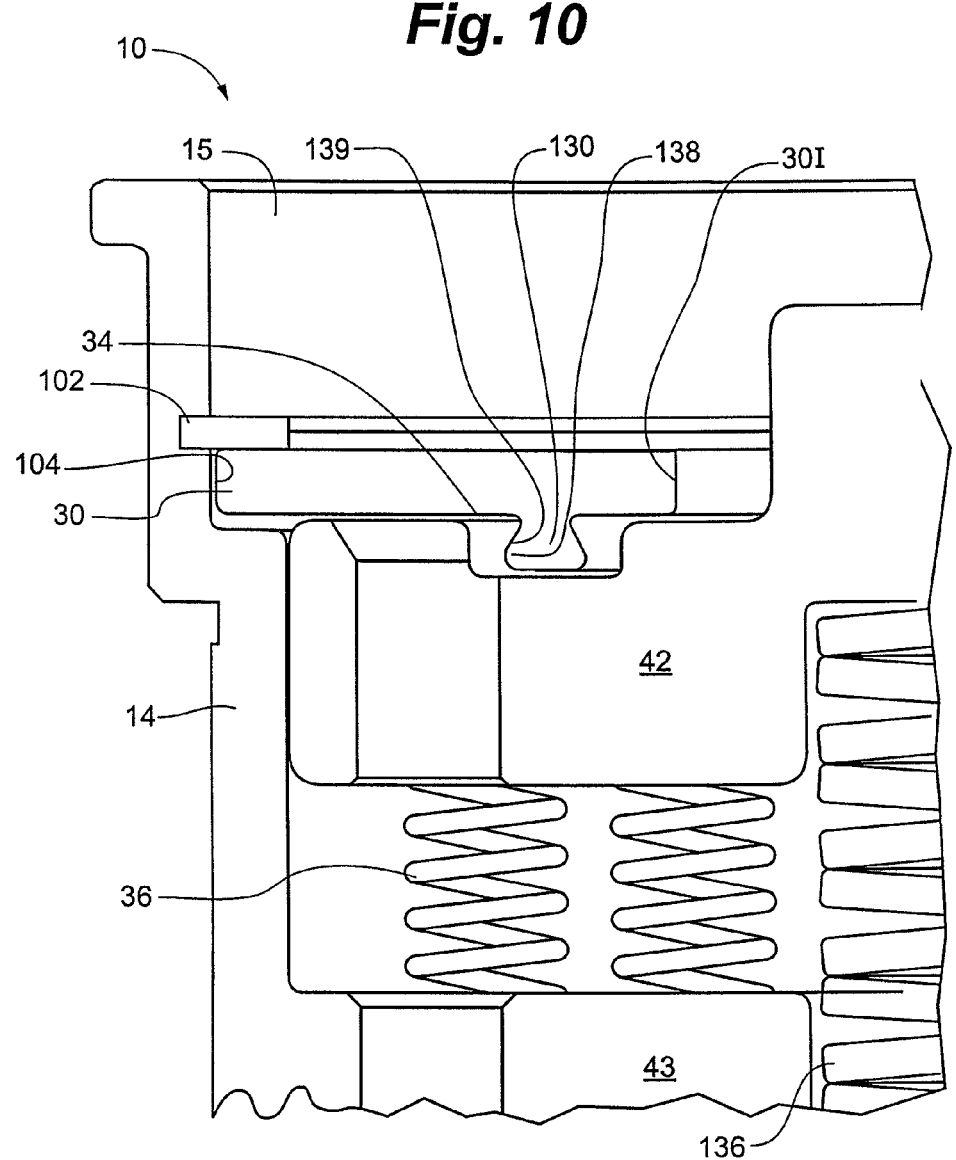
FIG. 10 shows a partially broken-away, side cutaway, detail view of an area adjacent to a tool-receipt opening of the multi-tool of FIG. 8, the tool-receipt opening being shown with no tool.
Figure 11:
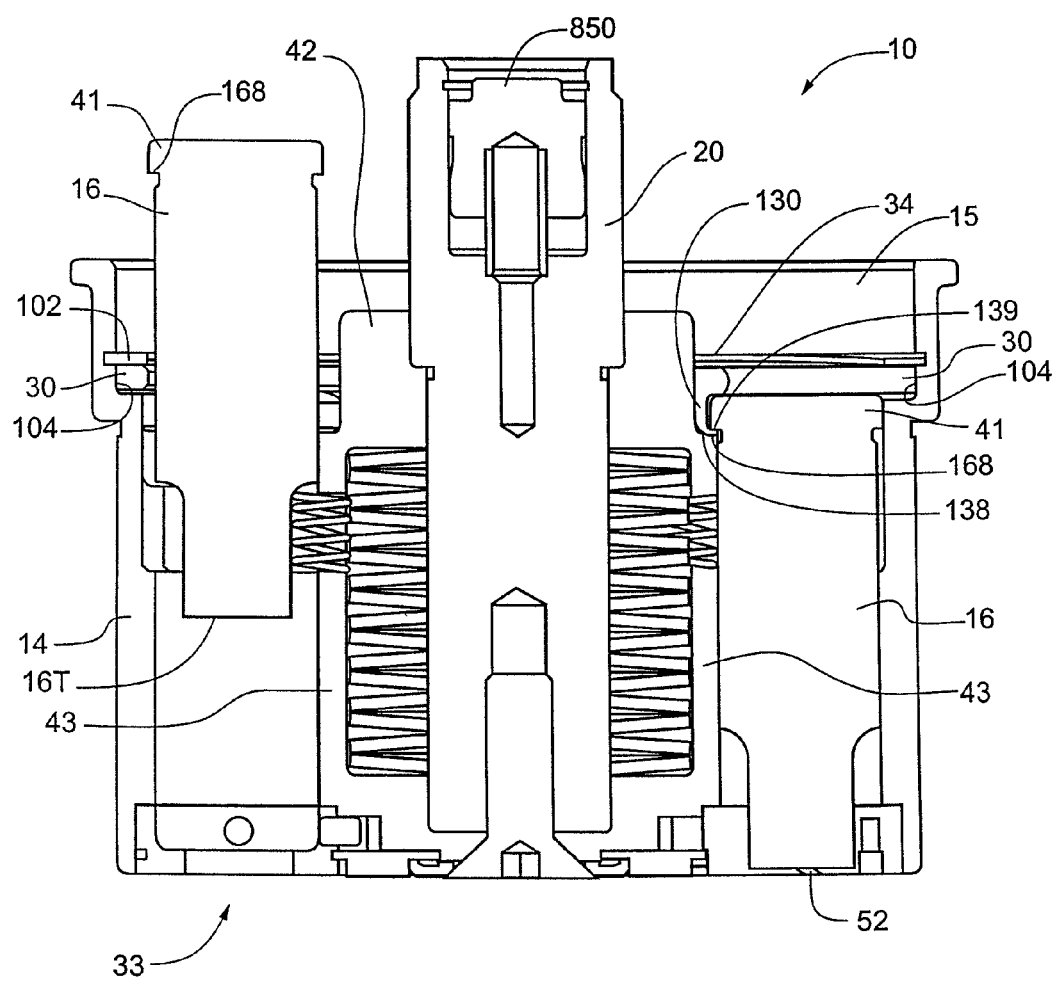
FIG. 11 shows a side cutaway view of a guide housing for a multi-tool, with one tool mounted therein and another tool in a partially removed position, and a skid plate in a first orientation, in accordance with certain embodiments of the invention.
Figure 12:
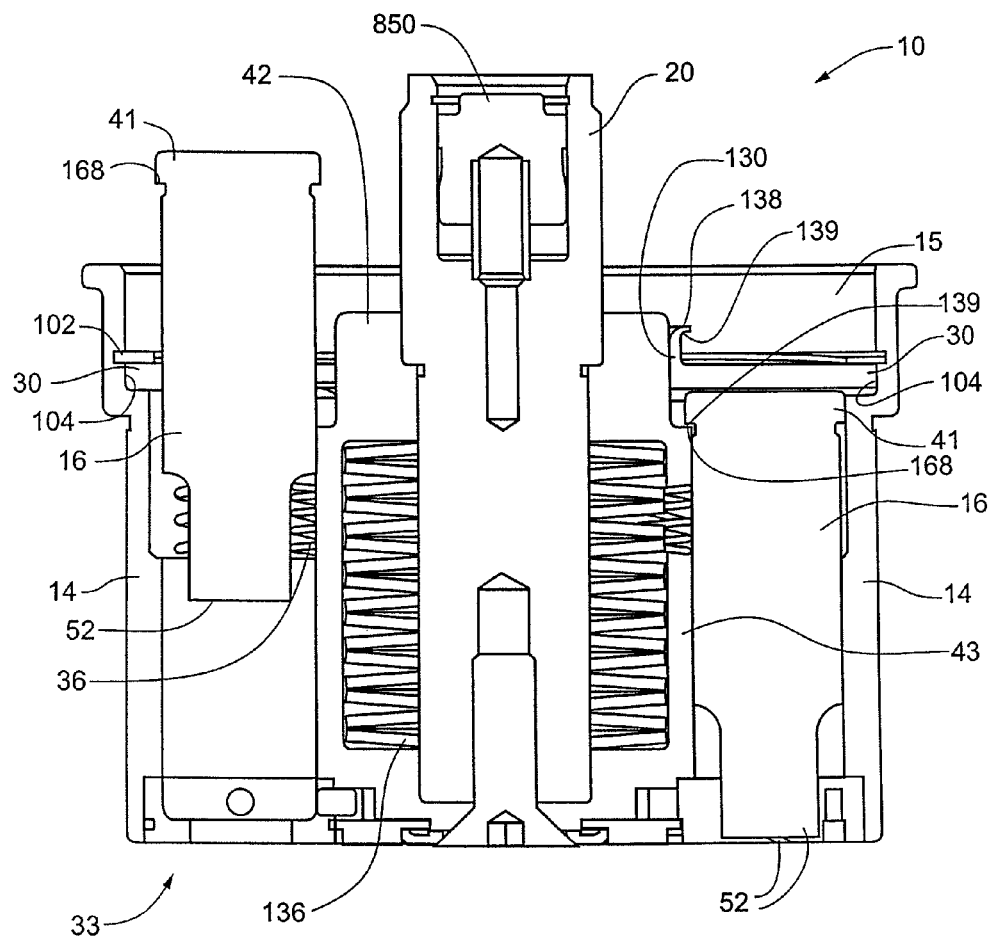
FIG. 12 shows a side cutaway view of the multi-tool of FIG. 11, with the skid plate in a second orientation, in accordance with certain embodiments of the invention.

In some of the present embodiments, the tool-retention skid plate can be operably mounted (e.g., rotatably) within the guide housing 14 in two different orientations. Preferably, a first of these orientations involves (e.g., is characterized by) the tool-retention structure 130 extending (optionally downwardly) toward a working end 33 (which may be a bottom end) of the guide housing 14. Two exemplary skid plates 30 are shown in this orientation in FIGS. 8, 10, and 11. When in this orientation, the tool-retention structure 130 is positioned to prevent a non-activated tool from coming into contact with a workpiece during pressing operations. In some embodiments of this nature, the tool-retention structure engages the head of a non-activated tool to secure that tool in a restrained position. Preferably, the second orientation of the skid plate 30 involves the tool-retention structure 130 extending (optionally upwardly) away from the working end 33 of the guide housing 14. Reference is made to FIGS. 9 and 12. When such a skid plate 30 is in its second orientation, the tool-retention structure 130 does not prevent non-activated tools from contacting the workpiece. In some embodiments of this nature, the tool-retention structure 130 does not engage (e.g., contact) any non-activated tool when the skid plate is in its second orientation. Embodiments of this nature give manufacturers the ability to use such a skid plate in two different orientations—one orientation that provides an anti-marking functionality, another orientation that does not.

The tool-retention structure 130 in the present embodiments can optionally include a plurality of structures adapted for preventing a plurality of non-activated tools (in respective tool-receipt openings of the multi-tool) from coming into contact with (e.g., moving downwardly onto) a workpiece during pressing operations. Reference is made to FIGS. 26-29 and 31. In embodiments of this nature, all such structures on the skid plate 30 can be of the same type (they can each comprise a shoulder, they can each comprise a rib, etc.). Alternatively, different types of structures can be provided on a single skid plate.

Figure 27:
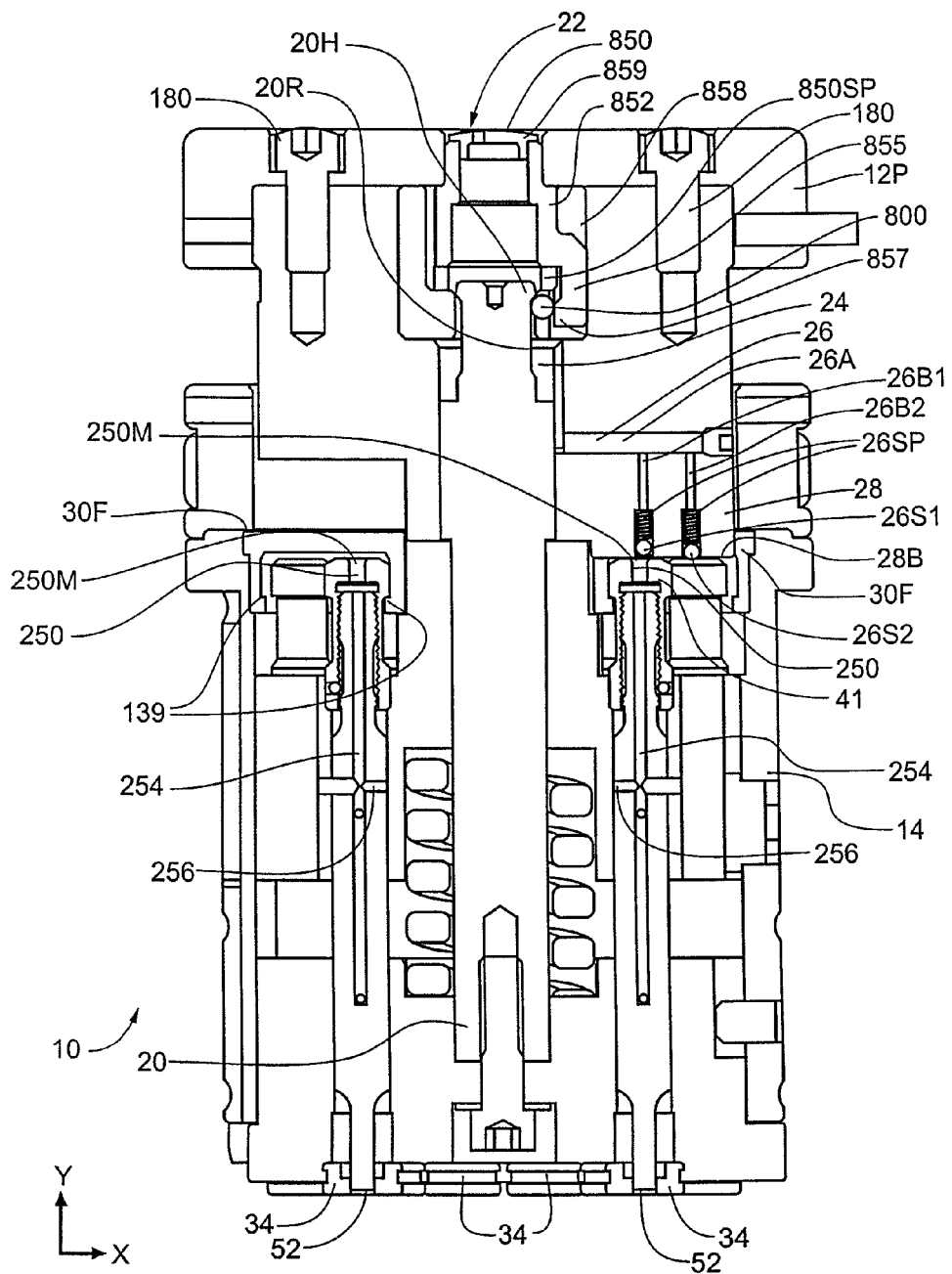
FIG. 27 is another side cutaway view of the multi-tool of FIG. 26, wherein both of the tools that are shown in detail are depicted with their tips inside a guide housing of the multi-tool.

FIGS. 26-29 and 31 exemplify embodiments wherein the tool-retention structure 130 is adapted to engage non-activated tools from multiple tracks of tools in the multi-tool. In FIGS. 26 and 27, for example, the driver assembly's striker 28 is aligned with an activated tool 16 of an inside track of tools in the multi-tool. Here, the skid plate 30 is holding all the non-activated tools 16—some from the inside track, others from the outside track—such that none of the non-activated tools 16 in the multi-tool are permitted to move (e.g., downwardly) into contact with the workpiece.

Figure 31:
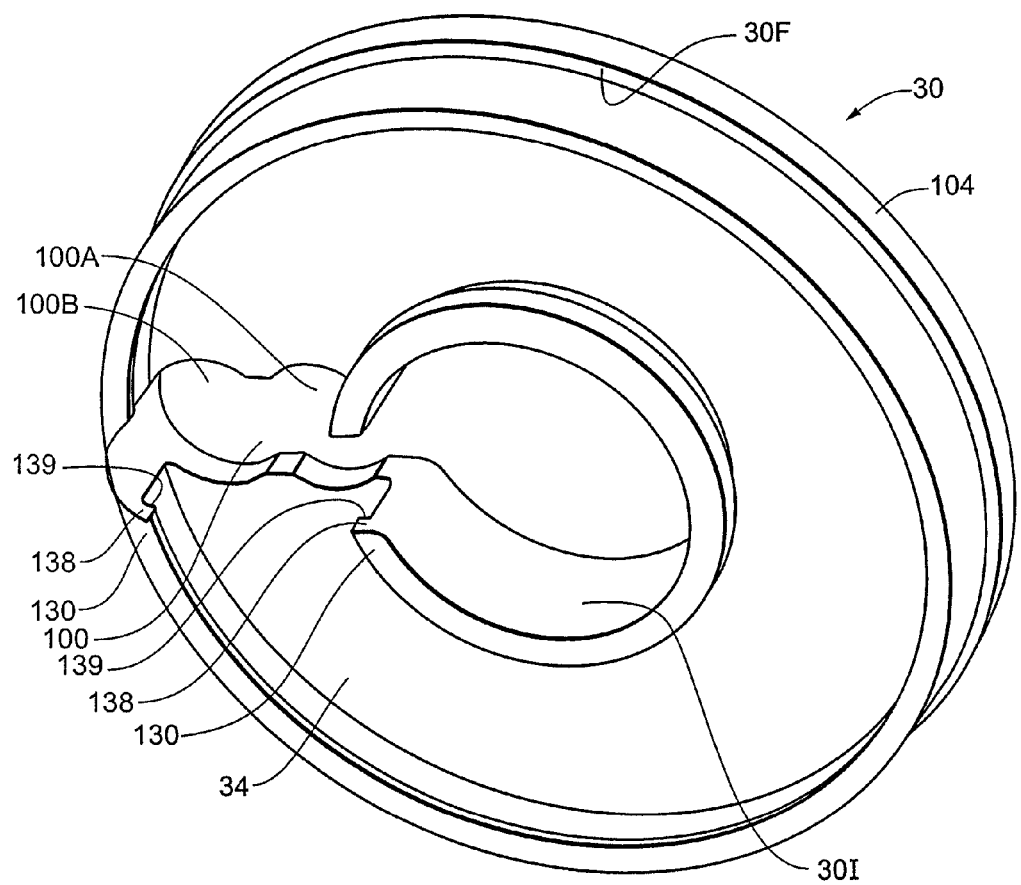
FIG. 31 is a perspective a view of a skid plate in accordance with certain embodiments of the invention.

Referring to FIG. 31, it can be seen that the tool-retention structure 130 comprises two projections of the skid plate 30. One of the projections is adjacent to the inside surface 30I of the skid plate 30, and the other projection is adjacent to the outside surface 104 of the skid plate. The inside projection is adapted to retain all the non-activated tools from the multi-tool's inside track of tools, and the outside projection is adapted to retain all the non-activated tools from the multi-tool's outside track of tools. Since this particular skid plate is adapted for use with a multi-track multi-tool, the illustrated tool-access opening 100 can be aligned selectively with any desired tool from the inside track or with any desired tool from the outside track. The opening 100 in FIG. 31 includes both a generally-circular inside portion 100A (adapted for alignment with any tool from the inside track) and a generally-circular outside portion 100B (adapted for alignment with any tool from the outside track).

Figure 28:
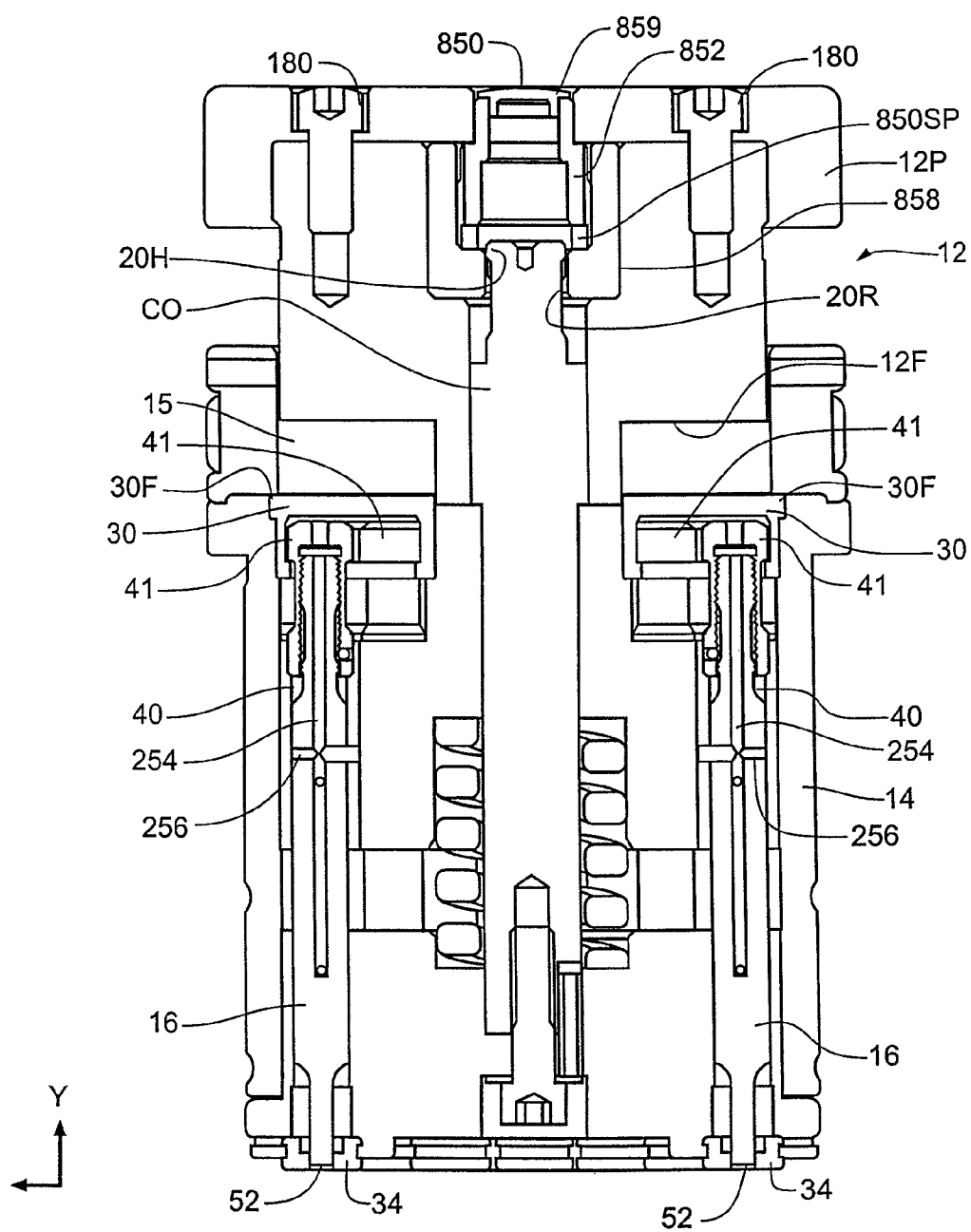
FIG. 28 is a side cutaway view of the multi-tool of FIG. 26, with two non-activated tools being detailed.

Thus, the tool-retention structure 130 (optionally a rigid surface 139 thereof) may directly contact a plurality (optionally all) of the non-activated tools 16 in the multi-tool 10. The tool-retention structure 130 (e.g., a surface 139, rib, and/or shoulder thereof) can optionally have a generally annular shape. Preferably, the tool-retention structure 130 is adapted to directly contact the head (the end opposite the workpiece-deforming surface) of each non-activated tool 16. The illustrated skid plate 30 has a generally disc-shaped configuration, although other configurations can be used. Preferably the skid plate 30 defines a central opening through which extends an axis of rotation for the skid plate. Optionally, when the (or each) non-activated tool 16 is engaged/retained by the skid plate's tool-retention structure 130, the tip 52 of the/each non-activated tool is maintained within the multi-tool (e.g., so as not to project outwardly beyond a stripper plate in which the tip is disposed). Reference is made to FIGS. 28 and 29. Finally, in some embodiments, the tool-retention structure 130 is adapted to simultaneously engage (e.g. directly contact) every individual tool 16 in the multi-tool 10 except for the activated tool(s).

In the illustrated embodiments, the multi-tool 10 can optionally have a generally-cylindrical configuration. However, this is not required for any multi-tool embodiment of the present disclosure. Sheet feed, strip feed, or press brake applications, to name just a few, may find particular benefit in embodiments where the multi-tool 10 is other than generally cylindrical. Shapes of this nature may also be beneficial for a variety of turret press applications, single-station press applications, etc.

In one embodiment, the multi-tool 10 has a generally cubic shape. In another embodiment, it has a generally triangular horizontal cross section. In still other embodiments, the multi-tool has an irregular configuration. Moreover, a variety of configurations involving various polygonal horizontal cross sections can be used.

Further, the tool-receipt openings 40 need not be generally circular in cross section. This is the case for any multi-tool embodiment of the present disclosure. The tool-receipt openings 40, for example, can have a cross section that is square, rectangular, triangular, oval-shaped, etc. In embodiments of this nature, the individual tools 16 preferably have corresponding non-round configurations, as this can provide a keying function for the tools 16.

Unguided, Self-Stripping Embodiments

Many conventional multi-tools have a stripping spring/guide assembly that can simultaneously move all the individual tools in the multi-tool upwardly during an upstroke of the punch press. In multi-tools of this nature, the individual tools commonly are held by a guide assembly that includes a punch carrier and a punch guide tip (or "lower guide"). The punch carrier surrounds upper portions of the individual tool-receipt openings (and tools) in the multi-tool, while the punch guide tip surrounds lower portions of the individual tool-receipt openings (and tools). Thus, each tool-receipt opening has an upper portion bounded by the punch carrier and a lower portion bounded by the punch guide tip. Typically, the punch carrier has an upwardly-facing shoulder near the top of each tool-receipt opening, and each such shoulder is adapted to engage a downwardly-facing surface defined by the head of an individual tool. Thus, when an activated tool is moved downwardly during a pressing operation, the head of the activated tool bears forcefully against an upwardly-facing shoulder of the punch carrier, causing the punch carrier to move downwardly toward the punch guide tip (in the process, overcoming the bias of stripping springs mounted between the punch carrier and the punch guide tip). After pressing force has been delivered to the activated tool (i.e., during a subsequent up-stroke), the stripping springs between the punch carrier and the punch guide tip urge the punch carrier upwardly away from the punch guide tip. This causes the upwardly-facing shoulder of the punch carrier to bear forcefully against the head of the activated tool, thus lifting the activated tool back to a default position (i.e., the position in which the activated tool resides when resting between pressing operations). Thus, the upward movement of the activated tool (which movement involves the activated tool being separated, or "stripped," from the workpiece) is caused by the resiliently-biased punch carrier. Commonly, the resiliently-biased punch carrier supports not only the activated tool, but also the non-activated tools.

The present embodiments provide a multi-tool that is adapted to provide unguided, self-stripping tool utilization. These embodiments are advantageous, for example, in terms of their manufacturability. Here, each tool-receipt opening 40 preferably does not have (i.e., preferably is devoid of) any upwardly-facing shoulder adapted to engage and upwardly lift a downwardly-facing surface of a tool. FIGS. 7A and 7B depict exemplary embodiments of this nature. These embodiments provide self-stripping tools 16 in respective tool-receipt openings 40 of the multi-tool. Preferably, each individual tool 16 (or at least one tool, or a plurality of the tools) in the multi-tool 10 has its own stripping spring 99. Exemplary tools of this nature are described below in more detail.

One embodiment provides an unguided, self-stripping multi-tool assembly where the multi-tool is provided in combination with (e.g., is loaded with) at least one adjustable length, self-stripping tool. Each such tool can optionally have a locking ring RR of the nature described below in addition to having its own stripping spring 99. In the present embodiments, all the tools in the multi-tool can optionally be tools of this nature.

In the embodiment of FIGS. 7A and 7B, the guide housing 14 is not equipped with a resiliently-biased punch carrier. Rather, the multi-tool has a punch guide tip (or "lower guide") 43 that bounds the uppermost portion of each tool-receipt opening 40. In these embodiments, the punch guide tip 43 can either be attached rigidly to the guide housing 14 (as shown in FIGS. 7A and 7B) or the punch guide tip can be integral to the guide housing. In FIGS. 7A and 7B, the punch guide tip 43 is a separate body mounted within a bottom portion of the guide housing 14.

Preferably, the punch guide tip 43 (whether it is separate from, or part of, the guide housing) has a top surface 43T and a bottom surface 43B. In the illustrated embodiments, the height of the punch guide tip 43 is smaller than the height of the guide housing 14. In the present embodiments, the height of the punch guide tip 43 preferably is less than 70 percent, less than 65 percent, or even less than 60 percent of the height of the guide housing 14. In FIGS. 7A and 7B, the height of the punch guide tip is less than 50% of the height of the guide housing.

In some of the present embodiments, the multi-tool includes a driver assembly 12 and a guide housing 14, and the driver assembly can be removably attached to the guide housing. When the driver assembly is removed from the illustrated guide housing 14, an internal cavity 15 bounded by the guide housing is exposed. In the embodiment of FIGS. 7A and 7B, the interior cavity 15 is bounded by the top surface 43T of the punch guide tip 43 and an interior wall 14I of the guide housing 14. Preferably, the interior cavity 15 spans at least 30 percent, at least 35 percent, or even at least 40 percent of the height of the guide housing 14. In FIGS. 7A and 7B, the cavity 15 spans a major portion (i.e., 50% or more) of the guide housing's height (as measured with the driver assembly 12 removed from the guide housing 14).

In the present embodiments, the multi-tool 10 preferably is provided in combination with a plurality of self-stripping tool assemblies (or "self-stripping tools", such as self-stripping punches). In some embodiments of this nature, the multi-tool 10 carries a plurality of self-stripping tool assemblies such that one self-stripping tool assembly is mounted in each tool-receipt opening 40. Here, each tool assembly 16 has an upper portion UP and a lower portion LP. The lower portion LP defines a tip 52 of the tool 16, and the upper portion UP defines a head 41 of the tool. In embodiments like that of FIG. 7A, each tool 16 (when mounted operatively in the multi-tool) has its lower portion LP (see FIG. 3A) disposed in a tool-receipt opening 40 while its upper portion UP (see FIG. 3A) is disposed (e.g., entirely) within the cavity 15. When such tools 16 are mounted in respective tool-receipt openings 40, the upper portions UP of the tools 16 project upwardly beyond the top surface 43T of the punch guide tip 43. Thus, at least part of the stripping spring on each tool is disposed within the cavity 15 (e.g., at all times, even during pressing operations) and/or above the top 43T of the punch guide tip 43. Preferably, a major length of (e.g., substantially all of, or all of) the stripping spring on each tool is disposed within the cavity 15.

Between the upper UP and lower LP portions of each tool 16, there can optionally be provided a first detent 199. This detent 199 on the tool 16 preferably is adapted to be secured to a second detent 299, which desirably is on the punch guide tip 43 or the guide housing 14. The first detent 199 can be secured to the second detent 299 in such a way that the tool is prevented from moving (e.g., bouncing) upwardly in its entirety during an up-stroke of the press on which the multi-tool is used. Preferably, the two detents 199, 299 remain in substantially fixed locations with respect to each other during pressing operations. In FIGS. 7A and 7B, the second detent 299 is defined by the punch guide tip 43, although the guide housing 14 can alternatively define the second detent.

In FIGS. 7A and 7B, the first and second detents respectively comprise an O-ring 46 and an O-ring groove 146. Here, the O-ring 46 is on the tool 16 and the O-ring groove 146 is on the punch guide tip 43. In other cases, the O-ring groove is defined by the guide housing. The O-ring 46 on the illustrated tool 16 is located between the stripping spring 99 and the tip 52 of the tool. In more detail, the O-ring 46 here is carried by a body 44 that defines both the channel in which the O-ring 46 is mounted and a seat for the stripping spring 99. These features, however, are strictly optional. For example, in other embodiments, a retainer ring or the like is used as one of the detents.

Figure 5:
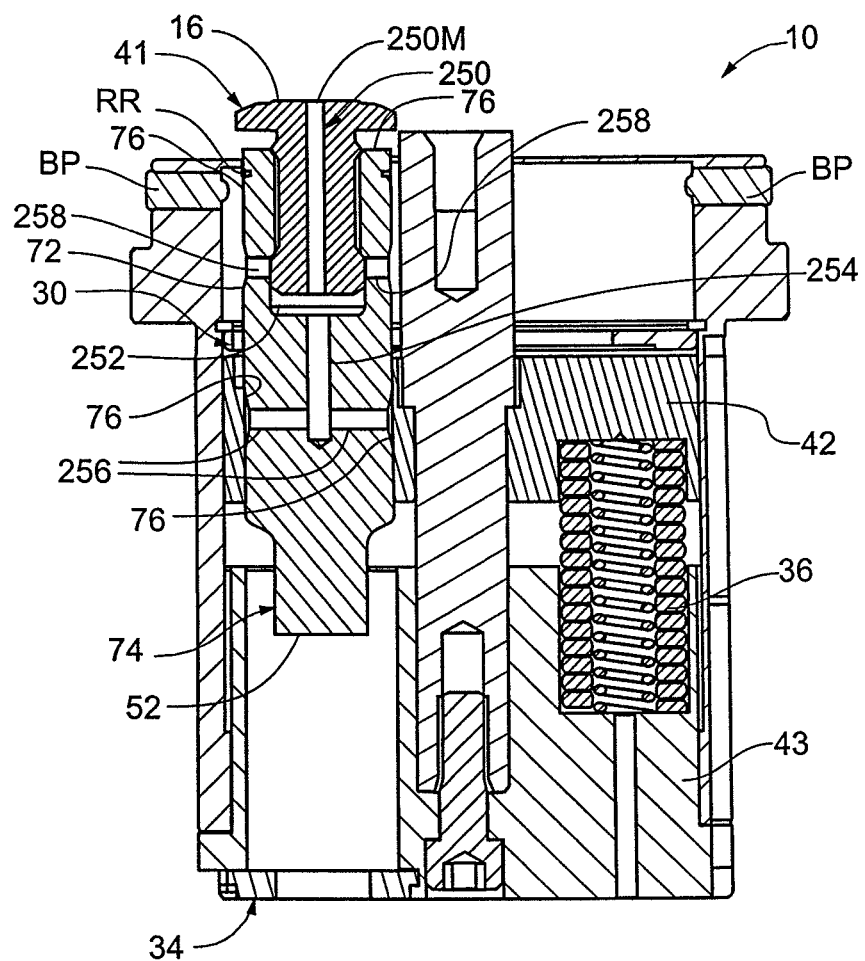
FIG. 5 shows a side cutaway view of a guide housing for a multi-tool, with a tool shown in a partially removed position, in accordance with certain embodiments of the invention.
Figure 30B:
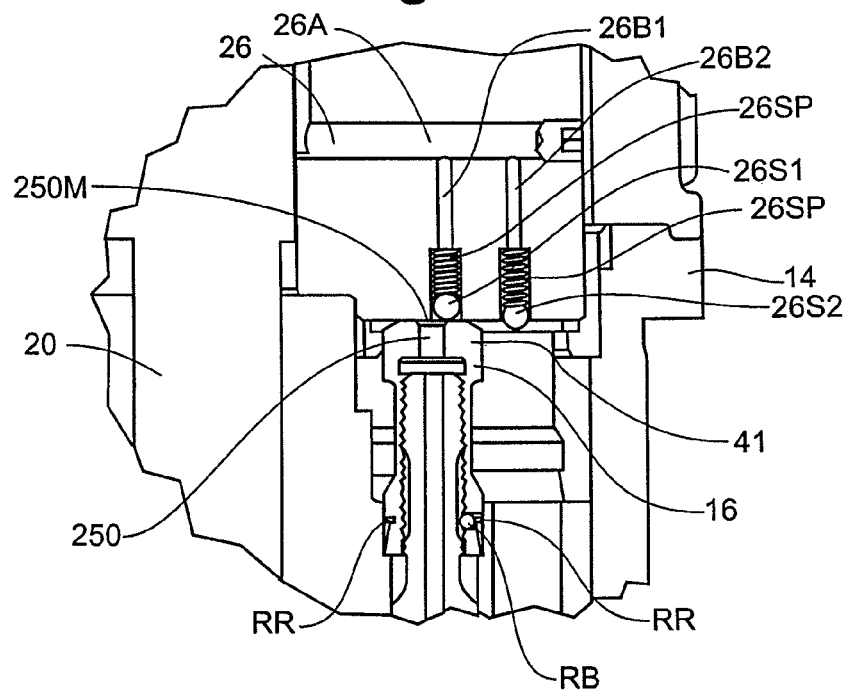
FIG. 30B is a broken-away detail view showing engagement of a striker (or "hammer") of a driver assembly and an activated tool in accordance with another embodiment of the invention.

Referring now to FIGS. 2B and 5, the illustrated tool 16 has a head and a body that can be adjusted (e.g., rotated relative to one another) to give the tool different overall lengths. A multi-tool in accordance with any embodiment of the present disclosure can optionally be provided with one or a plurality of adjustable length tools (in some cases, all the individual tools in a multi-tool are adjustable length tools). Useful adjustable length tools are detailed in U.S. Pat. No. 5,131, 303, entitled "Punch Assembly," the entire teachings of which are incorporated herein by reference. In FIGS. 2B and 5, the length adjustment mechanism includes a locking ring RR. This particular ring RR is adapted (e.g., when the tool 16 is fully assembled and in its operative position) to lock the tool's head and body against relative rotation (optionally, by virtue of a tip or other projection from the locking ring RR, or a locking ball RB that is resiliently biased by the locking ring RR). FIGS. 30A and 30B show examples of how an individual tool 16 adapted for use in a multi-tool 10 can be provided with a length-adjustment mechanism comprising a locking ring RR and a locking ball RB. A locking ring RR can optionally be provided with a larger exterior diameter than the body of the tool 16, and a corresponding groove or other female detent can be provided on an interior wall of the multi-tool to receive such a large-diameter ring. Thus, the ring can be a first detent, and the groove can be a second detent. In unguided, self-stripping embodiments, for example, a ring can optionally be adapted to be received by (e.g., can be adapted to snap into) a female detent defined by the punch guide tip 43, defined by the guide housing 14, defined by a body (e.g., a sleeve) nested within the guide housing, or defined by a body nested within the punch guide tip. Given the present teaching as a guide, it will be apparent that many other structures can be used to provide suitable interlocking detents.

In embodiments involving detents of the nature described, the detents preferably provide an anti-bounce system for the multi-tool 10. That is, the engagement of detents 199 on the tools 16 to corresponding detents 299 on the punch guide tip 43 (or on the guide housing) preferably prevents non-activated ones of the tools 16 from bouncing during pressing operations. Thus, during a pressing operation, the non-activated tools in the multi-tool preferably do not bounce substantially.

In the present unguided, self-stripping embodiments, another option for an anti-bounce system is to provide the multi-tool with a skid plate 30.

When provided, the anti-bounce system preferably prevents non-activated tools 16 from coming out of their respective tool-receipt openings 40 during pressing operations.

Any of the anti-bounce system embodiments described herein can be provided on either an unguided, self-stripping multi-tool (such as those shown in FIGS. 7A and 7B) or a guided multi-tool (such as those shown, for example, in FIGS. 2B and 5).

The guide housing 14 and punch guide tip 43 can be formed of steel, although many other materials can be used for one or both of these components. In some embodiments, at least part of at least one of these components 14, 43 is formed of a hardenable or hardened material, such as through-hardened steel or pre-hardened steel. This may extend the life and durability of the component(s) in question. For example, it can be advantageous to use hardened steel for all high-wear areas/components of the guide housing 14 and punch guide tip 43, optionally using pre-hardened steel for all other areas of these components 14, 43.

In the embodiments of FIGS. 7A and 7B, the multi-tool 10 can optionally have a generally-cylindrical configuration. However, this is not required for any multi-tool embodiment of the present disclosure. For instance, sheet feed, strip feed, or press brake applications may find particular benefit in embodiments where the multi-tool 10 is other than generally cylindrical. Shapes of this nature may also be beneficial for a variety of turret press applications, single-station press applications, etc.

In one embodiment, the multi-tool 10 has a generally cubic shape. In another embodiment, it has a generally triangular horizontal cross section. In still other embodiments, the multi-tool has an irregular configuration. Moreover, a variety of configurations involving various polygonal horizontal cross sections can be used. In one embodiment, the guide housing 14 has an exterior configuration with a horizontal cross section that is generally square, rectangular, or otherwise polygonal, while the driver assembly 12 (or at least a body portion 12 thereof) has a generally cylindrical exterior configuration. In this embodiment, the guide housing preferably has an interior wall (bounding the interior cavity 15) with a generally cylindrical interior configuration.

Further, the tool-receipt openings 40 need not be generally circular in cross section. This is the case for any multi-tool embodiment of the present disclosure. The tool-receipt openings 40, for example, can have a cross section that is square, rectangular, triangular, oval-shaped, etc. In embodiments of this nature, the individual tools 16 preferably have corresponding non-round configurations, as this can provide a keying function for the tools 16.

Form-Up Multi-Tool Technology

Certain embodiments provide a multi-tool 10 having at least one forming tool FT. In the present embodiments, the multi-tool can optionally have a combination of punching and forming tools. Alternatively, the multi-tool can have only forming tools. Further, the multi-tool in the present embodiments can include one or more form-up threading tools. Still further, the present multi-tool can optionally include one or more forming tools and one or more dies. Other combinations can be used as well.

Figure 39A:
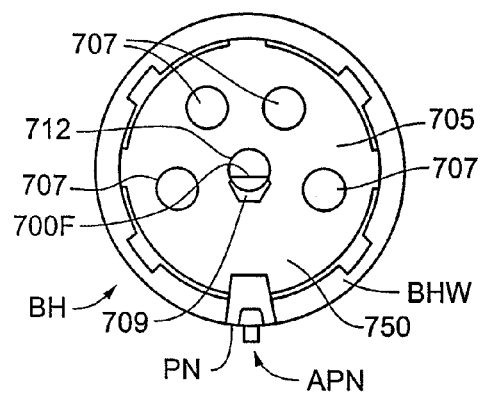
FIG. 39A is a top detail view of a base component of the form-up multi-tool of FIG. 13.
Figure 39B:
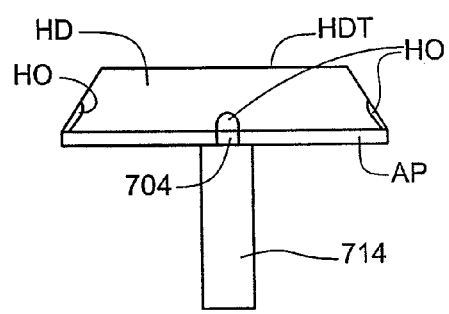
FIG. 39B is a side detail view of a head of the form-up multi-tool of FIG. 13.
Figure 39C:
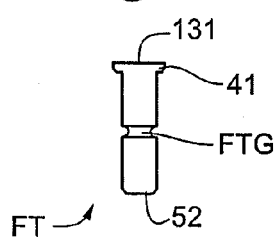
FIG. 39C is a side view of an individual forming tool that can be used in the form-up multi-tool of FIG. 13.

In the present embodiments, the form-up multi-tool 10 is mounted on a lower table below a workpiece location (i.e., a location where a workpiece is disposed during a pressing operation). One or more of the individual tools carried by the multi-tool 10 are adapted to create forms in a workpiece during pressing operations. Such forming tools FT are not used to simply punch holes in the workpiece. Rather, they are used to create various forms, such as dimples, louvers, countersinks, pierce-and-form, lance-and-form, electrical knockouts, etc. In some cases, all the individual tools on the present multi-tool are adapted to do forming (i.e., all are forming tools). FIG. 39C depicts one exemplary forming tool FT that can be used on the present form-up multi-tool. Many different tip 52 configurations can be used.

Figure 13:
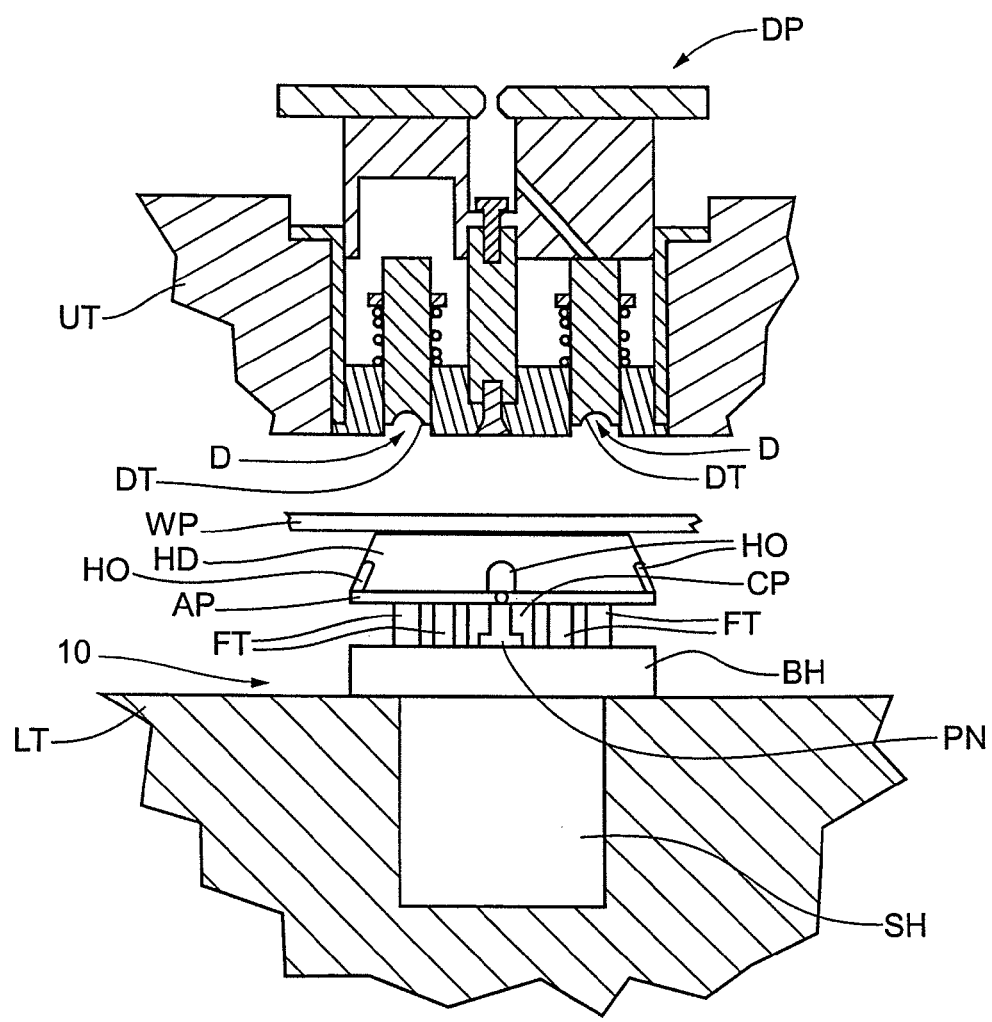
FIG. 13 shows a side cutaway view of a punch press having a lower table on which there is mounted a form-up multi-tool in accordance with certain embodiments of the invention.
Figure 14:
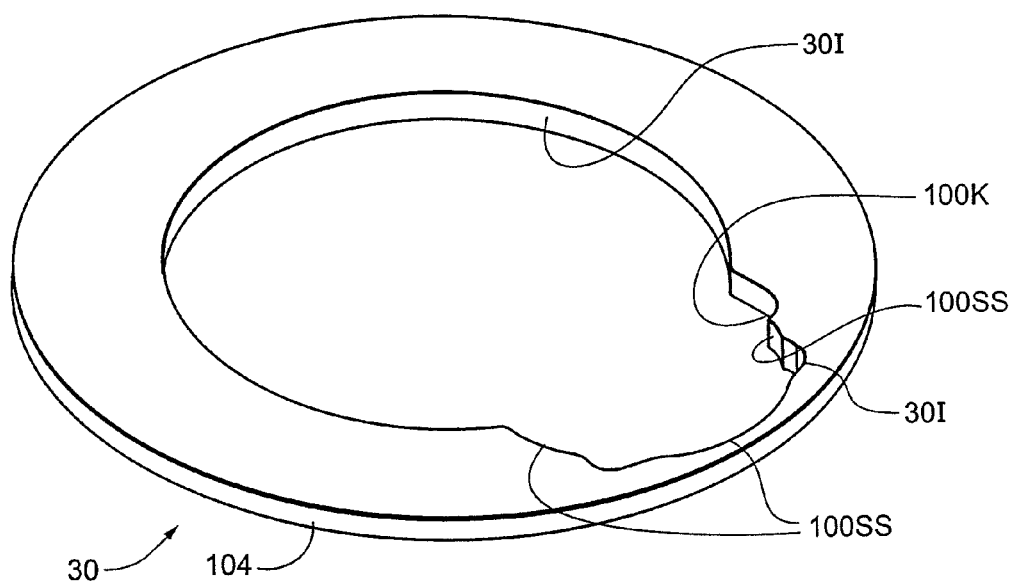
FIG. 14 shows a perspective view of a skid plate for a multi-tool in accordance with certain embodiments of the invention.
Figure 15:
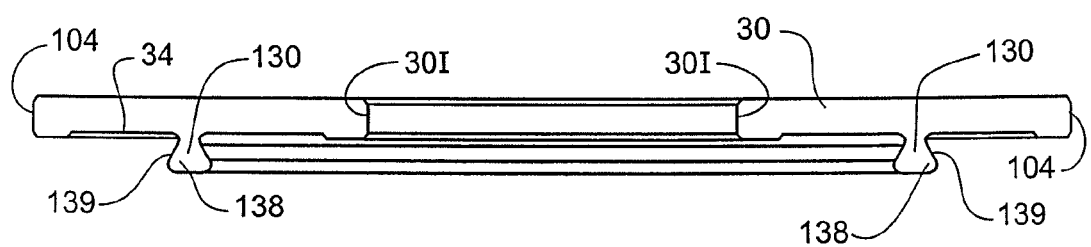
FIG. 15 shows a cross-sectional side view of a skid plate for a multi-tool in accordance with certain embodiments of the invention.
Figure 39D:
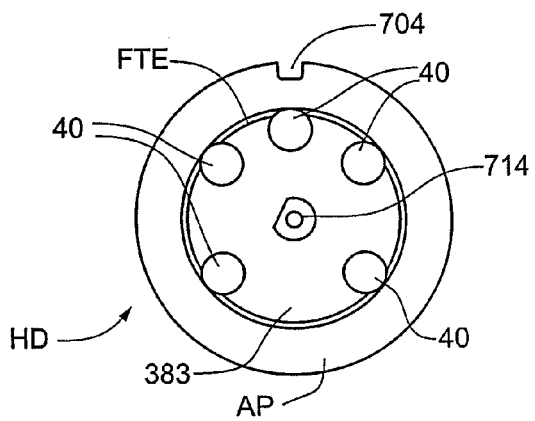
FIG. 39D is a bottom detail view of the head of the form-up multi-tool of FIG. 13.

FIG. 13 exemplifies a group of embodiments wherein a form-up multi-tool 10 is mounted on the lower table LT of a punch press. Here, the multi-tool 10 has a plurality of forming tools FT disposed in respective tool-receipt openings 40 defined by a head HD of the multi-tool. Reference is also made to FIG. 39D. The multi-tool 10 can be adjusted so that a desired one of the forming tools FT is activated. When the desired tool is activated, it is rigidly secured in an upright position. In contrast, the non-activated tools have a limited range of freedom to move vertically relative to the activated tool. When a workpiece WP above the multi-tool 10 is pressed downwardly (by a die-portion multi-tool DP on the upper table UT of the punch press) onto the head HD of the multi-tool, the head is forced by the workpiece to move downwardly (e.g., relative to a stationary base portion BH of the form-up multi-tool). In FIG. 13 the die-portion multi-tool DP has a plurality of dies D with downwardly-facing recess faces DT. In some of the present embodiments, the head HD and the non-activated forming tools are adapted to simultaneously move downwardly when forced downwardly by the workpiece WP during a pressing operation. As the head HD and non-activated forming tools move downwardly, the activated forming tool preferably is held rigidly in a fixed position, such that the workpiece WP is deformed by being pressed forcefully against the tip of the activated tool.

In some of the present embodiments, the form-up multi-tool has a rotatable adjustment mechanism PN that can be oriented so as to selectively place an activated one of the forming tools FT in an activated configuration. Preferably, this activated configuration involves the activated tool being rigidly secured in an upright position, e.g., such that the head HD and non-activated ones of the forming tools FT have a limited range of freedom to move vertically relative to the activated forming tool.

The rotatable adjustment mechanism PN can be provided in various forms. In one group of embodiments, the adjustment mechanism PN comprises a rotatable plate 705 defining a series of openings 707 adapted for being aligned respectively with non-activated ones of the forming tools FT. In these embodiments, the rotatable plate 705 preferably has a rigid support surface 750 adapted for being engaged by a bottom end 131 of the activated tool.

Preferably, when the head HD and non-activated tools FT move vertically within their limited range, this vertical movement is relative to the rotatable plate 705 of the adjustment mechanism PN. This vertical movement preferably involves the non-activated forming tools passing downwardly through respective ones of the openings 707 defined by the rotatable plate 705. During this vertical movement, the activated tool is prevented from moving downwardly by the rigid support surface 750 of the rotatable plate 705. In the illustrated embodiment, the rotatable plate 705 does not move vertically during forming operations. However, this is not strictly required in all embodiments.

The adjustment mechanism PN preferably has a first configuration in which its rotatable plate 705 can be rotated relative to the head HD and forming tools FT of the multi-tool. The first configuration of one exemplary form-up multi-tool 10 is shown in FIG. 13. Here, the illustrated adjustment mechanism PN can be rotated relative to the head HD and the individual forming tools FT. A slide ring AP of the adjustment mechanism PN also rotates relative to the head HD and the individual forming tools FT. In more detail, the rotatable plate 705 is joined rigidly (and may be integral) to an actuator portion APN of the adjustment mechanism PN. Thus, to move a desired one of the tools on the form-up multi-tool to an activated configuration, the actuator portion APN of the adjustment mechanism PN is rotated until it is aligned with the particular tool to be activated. In the process, the plate 705 rotates to the orientation in which its rigid support position 750 is directly under the activated tool. Thus, when the workpiece is pressed downwardly onto the form-up multi-tool, the activated tool is held rigidly in a upright position as the head HD and non-activated tools move downwardly into respective openings 707 in the base portion BH of the multi-tool. In the embodiment of FIGS. 13 and 39A-39D, the head HD has openings HO configured to provide clearance for the actuator portion APN when the head and non-activated tools move downwardly. These details, however, are merely exemplary.

The rotatable plate 705 of the adjustment mechanism PN preferably defines at least one opening 707 less than the total number of forming tools FT carried by the multi-tool. Thus, there is a first number of forming tools on the multi-tool, there is a second number of openings on the rotatable plate of the adjustment mechanism, and the second number preferably is at least one less than the first number.

In FIG. 13, the optional shank SH can be attached rigidly, threadingly, etc. to the base portion BH of the form-up multi-tool. The illustrated multi-tool is adapted for use with a plurality of individual tools each having a mounting groove FTG configured to be securely engaged by a locking edge FTE of the rotatable slider ring AP and a stationary plate 383 of the head HD. The illustrated mounting groove FTG extends entirely about a perimeter of the tool, although this is not strictly required. Referring to FIG. 39A, the rotatable plate 705 is adapted to rotate relative to the exterior wall BHW of the base portion BP. The illustrated post 714 extends from (and can optionally be integral to) the stationary plate 383 of the head HD. The post 714 is received in the center recess 712 of the multi-tool's base portion BH. Here, the post 714 (or at least a portion thereof) has a flat side that (when the post 714 is received in the center recess 712) engages the flat wall section 700F bounding the center recess 712. This engagement of the flat side on the post 714 and the flat wall section 700F bounding the center recess 712 prevents rotation of the head's stationary plate 383 (and of the individual tools and the top wall HDT of the head) relative to the base portion's exterior wall BHW. Here again, these details are found in the illustrated embodiment, but they are not required.

Multi-Tool Surface Enhancement Technology

Certain embodiments provide a multi-tool 10 having one or more surface enhancements, such as coatings, to improve the performance and/or durability of the multi-tool. In the present embodiments, the surface enhancement can be incorporated into many different types of multi-tools. Preferably, the multi-tool 10 in these embodiments is adapted to carry a plurality of tools (e.g., punches) 16. For example, the multi-tool 10 preferably has a plurality of tool-receipt openings 40 adapted to receive respective tools 16. In some cases, the tools 16 will be punches, and the tool-receipt openings 40 will be punch-receipt openings.

In one group of embodiments, the invention provides a multi-tool wherein at least one component, or at least one area of a component, is provided with a surface hardening enhancement (such as a surface hardening coating) and/or a surface lubricity enhancement (such as a dry lubricant coating). Here, the coating or other enhancement is adapted to increase the surface hardness and/or lubricity of the coated component, to thereby protect it against wear, corrosion, friction, sticking, and/or galling.

In one embodiment, the enhancement (which can optionally be, or include, a coating) comprises a nitride and/or a carbide. Particularly useful nitriding and nitrocarburizing enhancements are described in U.S. Pat. No. 6,327,884, the entire teachings of which are incorporated herein by reference. One commercially available nitride enhancement is the Nitrex® coating, which is a high endurance surface coating available from Nitrex, Inc. (Aurora, Ill., USA). The Nitrex® coating can be used to impart lubricity characteristics in a metal surface to significantly lower the friction coefficients of the surface.

In some embodiments, the multi-tool is provided with a surface enhancement comprising nickel (e.g., nickel alloy) and/or a low friction polymer. Useful coatings of this nature are available, for example, from General Magnaplate Corporation (Linden, N.J., USA) and Poeton Industries, Ltd. (Gloucester, England). As one example, the desired multi-tool component (i.e., all or a portion thereof) can be coated with a NEDOX® coating. NEDOX® coatings can be provided to increase the life of the component and/or to provide a nonbonding surface that reduces buildup of materials. NEDOX® coatings can also be provided to create a smooth and slippery surface, which can help reduce friction.

Thus, various coatings and/or surface enhancements can be provided on one or more components/areas of a multi-tool. One exemplary embodiment involves a coating or other surface enhancement on at least part of the driver 12. For example, at least one surface (e.g., the bottom surface 28B) of the driver's striker 28 can optionally have a surface enhancement. Additionally or alternatively, the bottom surface 27B of the driver's shoulder 27 can optionally have a surface enhancement. Further, in some embodiments, the top surface of the driver's top plate 12P has a surface enhancement.

The multi-tool 10 can optionally include a stripper plate (or plates) 34 having at least one surface with an enhancement. Additionally or alternatively, the multi-tool 10 can have a punch guide tip 43 with a surface enhancement on at least one of its surfaces (optionally on a surface bounding a tool-receipt opening 40). In one embodiment, the punch guide tip 43 has a plurality of surfaces bounding respective tool-receipt openings 40, and each of these surfaces has a surface enhancement. In embodiments where the multi-tool has a punch carrier 42, the same enhancement arrangement can optionally be provided on the punch carrier. Further, if desired, the outer surface of the guide housing 14 can be provided with a surface enhancement.

One embodiment provides a multi-tool having at least one push-button 850 with a surface enhancement. Reference is made to FIGS. 8 and 9. Here, the multi-tool has a push-button assembly that includes a push-button 850 and a ball 800. The ball here can optionally be replaced with other suitable wedge or catch members. The push-button assembly is adapted for removably securing a driver assembly 12 to the illustrated center post 20. In this embodiment, at least one surface, such as a side surface(s) 850S, (or, optionally, the whole surface area) of the push-button 850 can be provided with a surface enhancement of any type described above. The illustrated push-button 850 has a side surface 850S that defines a recess 850R. Here, the side surface 850S can advantageously be provided with a surface enhancement on the (or each) side surface 850S area that defines the recess 850R.

Multi-Tool Sleeving Technology

Certain embodiments provide a multi-tool 10 having one or more sleeves to improve the performance, durability, weight characteristics, and/or manufacturability of the multi-tool. In the present embodiments, the sleeve(s) can be incorporated into many different types of multi-tools. Preferably, the multi-tool 10 in these embodiments is adapted to carry a plurality of tools 16. For example, the multi-tool 10 preferably has a plurality of tool-receipt openings 40 adapted to receive respective tools 16. In some cases, the tools 16 will be punches, and the tool-receipt openings 40 will be punch-receipt openings.

Figure 32:
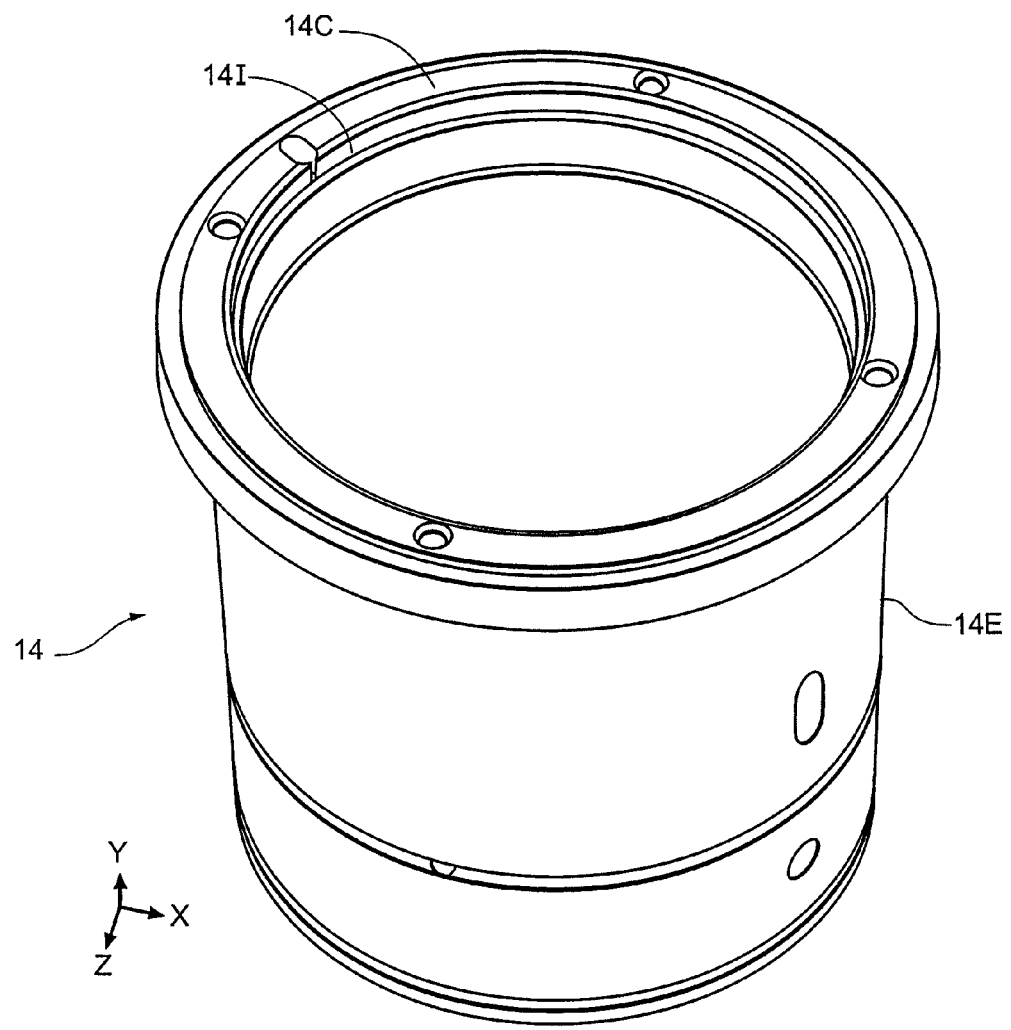
FIG. 32 is a perspective view of a guide housing sleeving assembly in accordance with certain embodiments of the invention.
Figure 33:
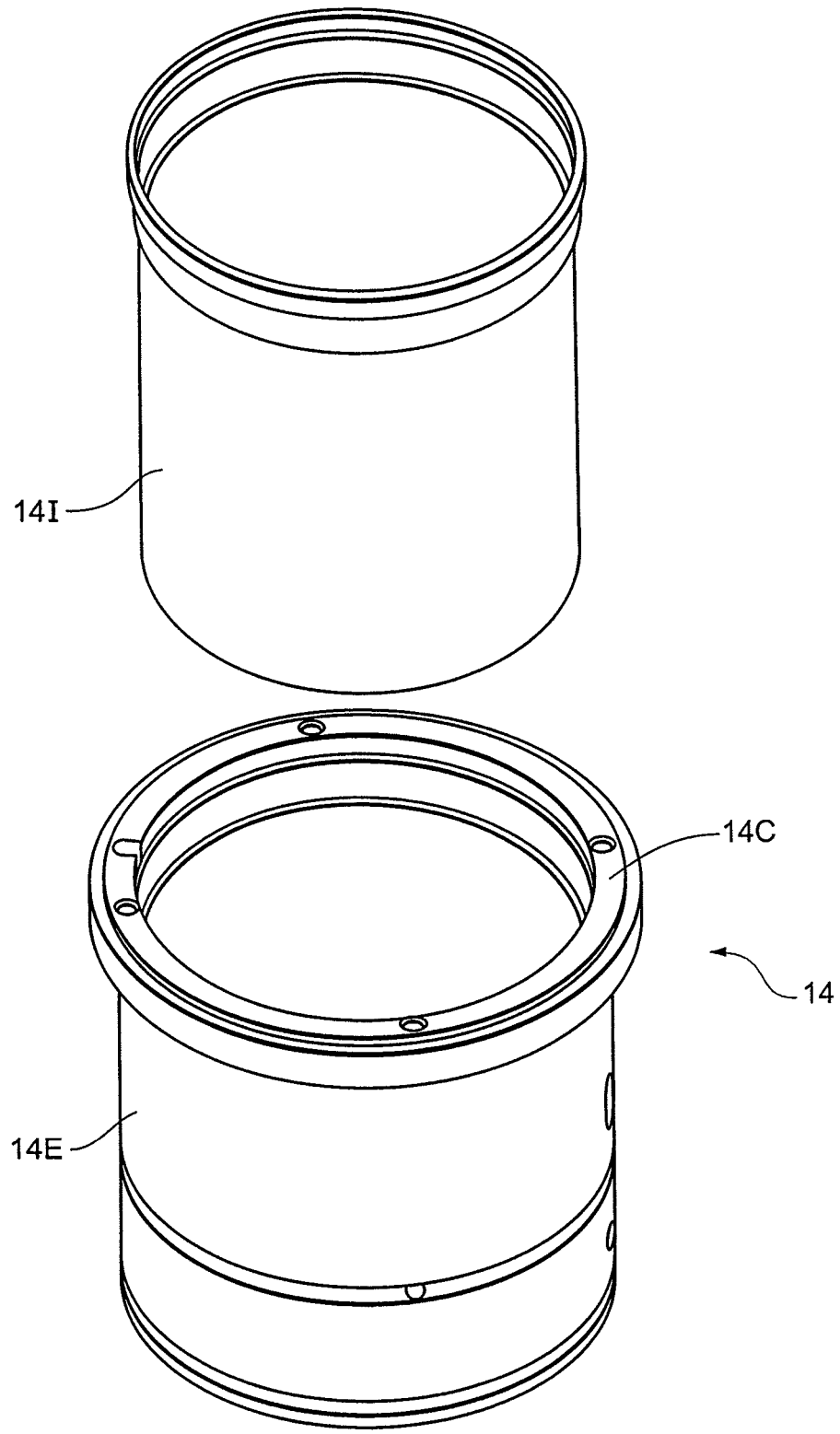
FIG. 33 is an exploded perspective view of a guide housing sleeving assembly in accordance with certain embodiments of the invention.
Figure 34:
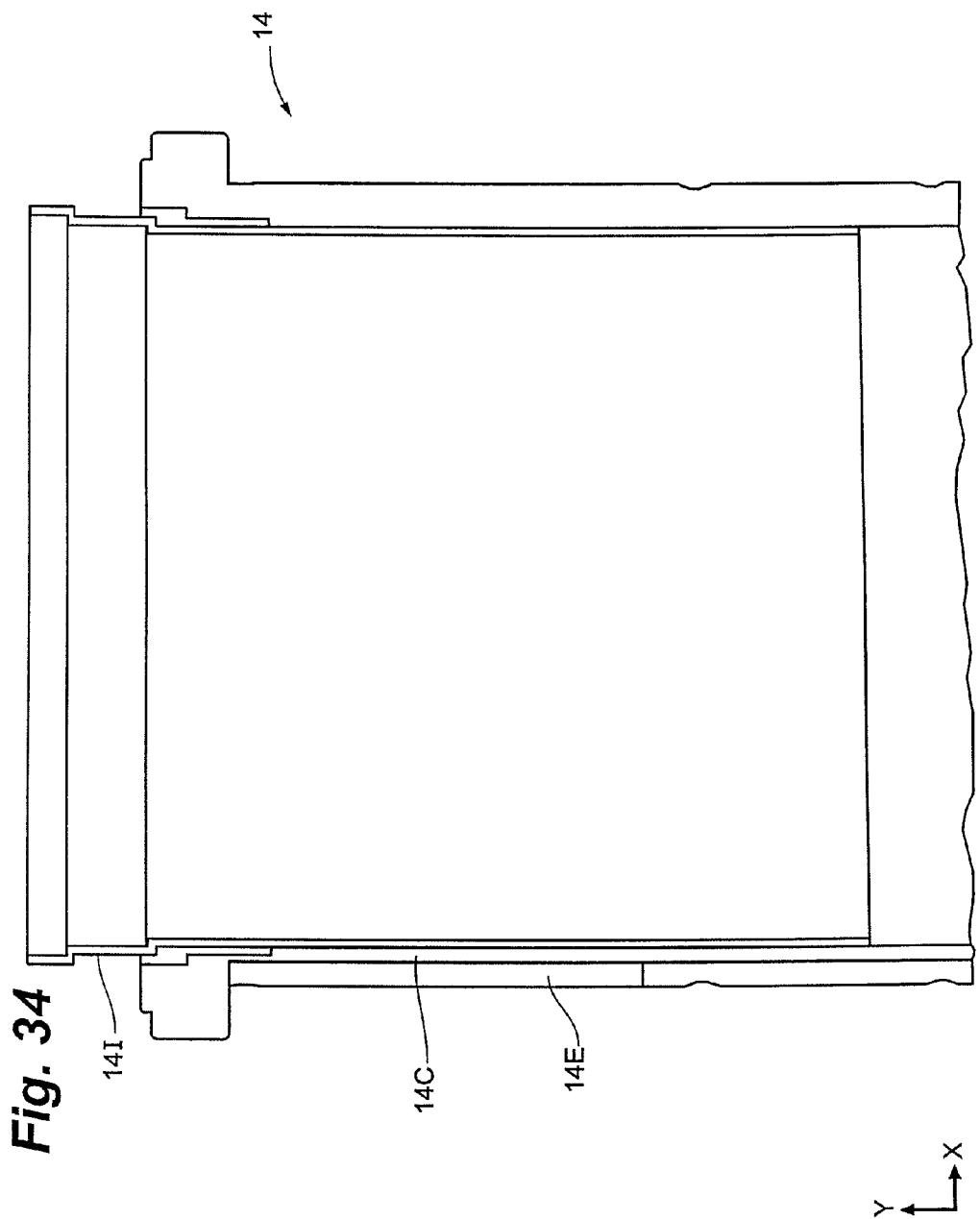
FIG. 34 is a partially exploded, partially broken-away side cutaway view of a guide housing sleeving assembly in accordance with certain embodiments of the invention.

In some of the present embodiments, the multi-tool includes an external sleeve. The guide housing 14, for example, can comprise an external sleeve 14E, as shown in FIGS. 32-34. The external sleeve can optionally comprise (e.g., can optionally consist essentially of) ceramic, porcelyn, carbon fiber, or another non-metallic material having a high strength-to-weight ratio. In some embodiments of this nature, the multi-tool includes an external sleeve comprising such a material, the sleeve forms an outer wall of the guide housing, and an interior metal component (such as a punch guide tip, a punch carrier, an interior metal sleeve, and/or another internal metal component) is nested inside the external sleeve. When provided, the external sleeve can optionally be provided with a coating and/or any other surface enhancement described above.

Some of the present embodiments provide one or more internal sleeves. The internal sleeve(s) can optionally comprise a hardened or hardenable steel material, such as a through-hardened steel or a pre-hardened steel. In one embodiment, the multi-tool includes at least one internal sleeve comprising a laser-hardened material. Additionally or alternatively, the internal sleeve(s) can have a coating and/or other surface enhancement of any type described above. In some cases, an internal sleeve is provided in combination with an exterior sleeve (or other exterior wall or component of the guide housing), a punch guide tip, and/or a punch carrier comprising (optionally consisting essentially of) aluminum or another material having a lesser hardness than the material of the internal sleeve. An internal sleeve, for example, can be press fit into each tool-receipt opening such that a sleeve bounds each tool-receipt opening.

One group of embodiments provides a guide housing 14 comprising a plurality of sleeves. Here, the guide housing 14 can comprise two, three, or more sleeves. In some of these embodiments, at least one of the sleeves comprises a material selected from the group consisting of a ceramic, a porcelyn, a carbon fiber, and an oil-impregnated metal (such as bronze). In one embodiment of the present group, at least two sleeves are shrink-fitted together to form the guide housing 14. Additionally or alternatively, a bonding agent can be provided to bond together at least two sleeves of the guide housing 14. In the present embodiments, the guide housing 14 preferably comprises one or more sleeves that can be removed from the rest of the guide housing and replaced non-destructively (i.e., without destroying the rest of the guide housing).

FIGS. 32-34 depict exemplary sleeving embodiments wherein the guide housing 14 comprises an internal sleeve 14I, a core sleeve 14C, and an external sleeve 14E. In some embodiments, at least one of these sleeves comprises (e.g., consists essentially of) a non-metallic material, while at least one of the others is metal. In some cases, at least one sleeve comprises an aircraft metal selected from the group consisting of beryllium, titanium, magnesium, and aluminum (or an alloy including one or more of these metals). In some of these cases, at least one of the other sleeves is formed of steel. In one embodiment, at least one sleeve comprises a material selected from the group consisting of a ceramic, a porcelyn, a carbon fiber, and an oil-impregnated metal (such as bronze). Additionally or alternatively, one or more of the other sleeves may be formed of steel or an aircraft metal. If desired, one of the sleeves can be omitted such that the guide housing 14 has only two sleeves. Alternatively, three or more sleeves can be used.

Multi-Tool Push-Button Technology

Certain embodiments provide a multi-tool 10 having a push-button assembly 850 adapted for releasably holding together a driver assembly 12 and a guide housing 14 of the multi-tool. The push-button assembly 850 can, for example, be adapted to secure (or "lock") the driver assembly 12 to a center post 20 of the multi-tool. In some cases, the push-button assembly is a tool-free actuator adapted for being actuated by a tool-free operation (e.g., by simply pushing a button) so as to unlock the driver assembly 12 from the center post 20 of the multi-tool (e.g., such that the driver assembly can subsequently be removed from the guide housing). Additionally or alternatively, the push-button assembly can optionally be so located on the multi-tool that a button of the assembly is exposed, and is capable of being pressed by an operator, without requiring any disassembly of the multi-tool and/or without using any tool.

Thus, certain embodiments provide a multi-tool which when fully assembled has a push-button assembly 850 with a button that can be pressed manually (e.g., using one's finger) without using any tool. Preferably, the button is on the exterior of the multi-tool. The button, for example, can be located in an opening surrounded by (e.g., defined by) a top plate 12 of the multi-tool. Exemplary embodiments of this nature are shown in FIGS. 26-29. Here, the button assembly 850 is surrounded by the driver assembly 12 when the multi-tool is fully assembled.

The push-button assembly can be incorporated into many different types of multi-tools. Preferably, the multi-tool 10 in these embodiments is adapted to carry a plurality of tools (optionally punches) 16. For example, the multi-tool 10 preferably has a plurality of tool-receipt openings 40 adapted to receive respective tools 16. In some cases, the tools 16 will be punches, and the tool-receipt openings 40 will be punch-receipt openings.

The present push button embodiments are exemplified in FIGS. 8, 9, 11, 12, 21-23, 26-29, and 35-38. Here, the push-button assembly 850 has at least one ball 800. The ball(s) can optionally be replaced with other suitable wedge or catch members. In the illustrated embodiments, the push-button assembly 850 is adapted for securing a driver assembly (or "driver") 12 to a center post 20 of the multi-tool. In some embodiments, the push button assembly 850 (optionally a push button thereof) has a side surface 850S that defines a recess 850R.

Preferably, the push-button assembly 850 (and/or a push button thereof) has first and second positions. When the driver 12 is operably positioned on the center post 20 and the push-button assembly 850 is in its first position, the driver 12 is secured to the center post 20. When the push-button assembly 850 is in its second position, the driver 12 is free to be removed from the center post 20. Preferably, the button assembly is adapted to secure the driver assembly 12 to the center post 20 in such a way that the driver (or at least a striker 28 thereof) is free to rotate about the center post and/or relative to the guide housing 14.

In FIGS. 8, 9, 11, 12, and 21-23, the driver 12 has an interior wall 121 that defines a recess 12R, and when this driver 12 is secured to the center post 20, the driver's recess 12R receives an outer extremity of the illustrated ball 800 such that the ball is wedged between an exterior side surface 850S of the push button 850 and the interior wall 121 of the driver 12. In these embodiments, the push button is biased toward its first position by a spring 852 (which can optionally be replaced by another bias member, preferably a resilient bias member). Thus, the driver 12 is secured to (i.e., prevented from coming off) the center post 20 when the push button 850 is in its first position. When it is desired to remove the driver 12 from the center post 20, the push button 850 can be depressed (e.g., downwardly toward to a bottom end of the multi-tool) so as to overcome the bias of the spring 852 or other bias member. This causes the recess 850R on the side 850S of the push button 850 to move into alignment with the ball 800 (at which point the push button is in its second position), such that the ball is then free to move inwardly (e.g., into, or further into, the recess 850R). This freedom of the ball to move inwardly allows the ball to be moved out of locking engagement with the driver 12, such that the driver can then be removed from the center post 20.

Figure 35:
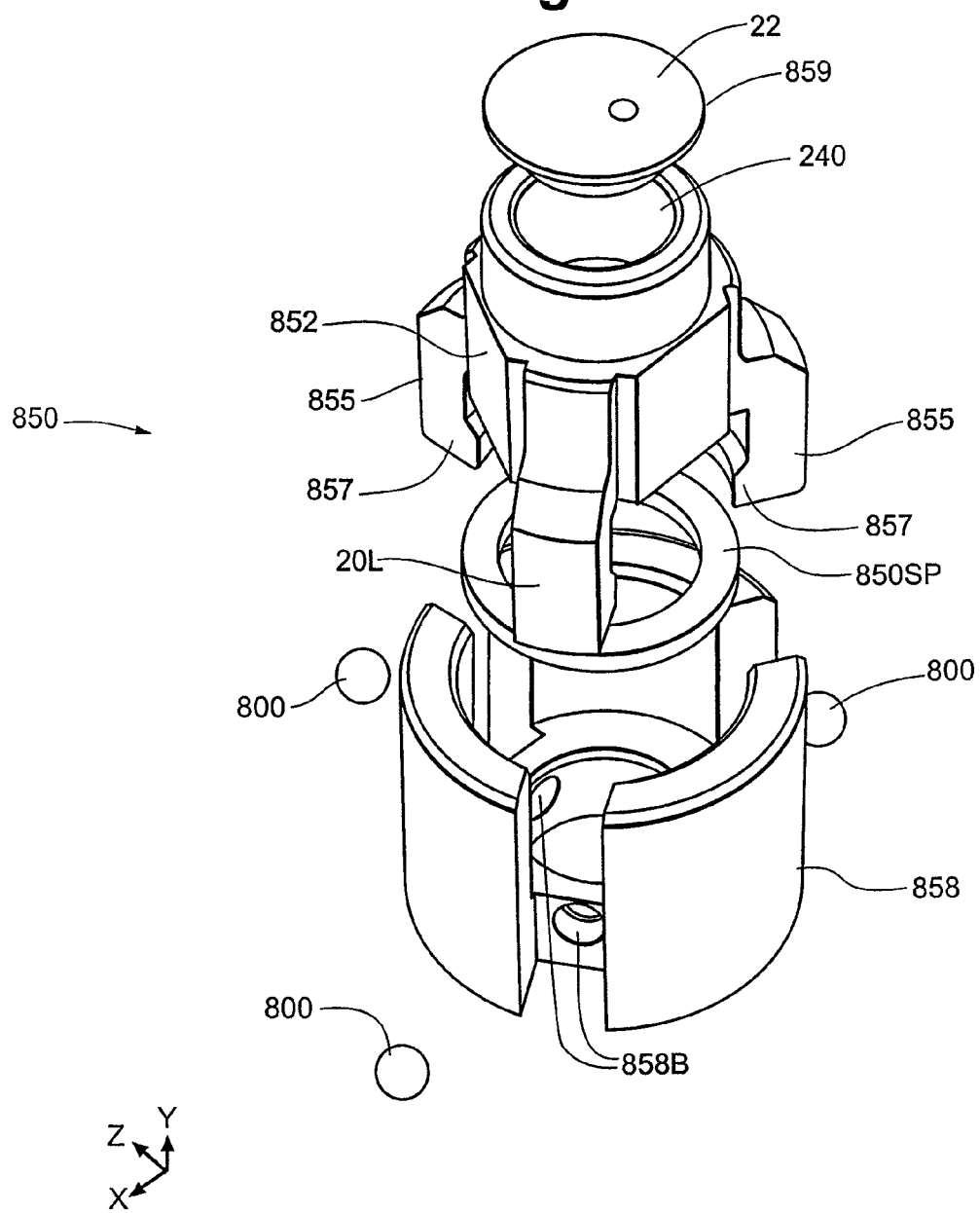
FIG. 35 is an exploded perspective view of a push-button assembly in accordance with certain embodiments of the invention.

FIGS. 26-29 and 35-38 depict embodiments involving another push-button assembly. Here, the push button assembly carries a plurality of balls 800. The balls 800 can be replaced with any other wedge members, such as wedges, bullet-shaped bodies, rollers, etc. In FIG. 35, three balls 800 are shown, but the number of balls 800 can be varied as desired. The center post 20 of this multi-tool does not carry the balls 800. Rather, the balls 800 are carried by the button assembly 850. In these embodiments, the center post 20 has a recessed portion 20R bounding a recess (or "channel") in the exterior side of the center post. The illustrated channel extends all the way around the perimeter of the center post 20, although this is not strictly required. A head 20H of the center post (or another section having a larger dimension, e.g., diameter, than the recessed portion 20R) bounds one end of the channel in the side of the post 20. Reference is made to FIG. 37.

In FIGS. 26-29 and 35-38, when the driver assembly 12 is mounted on the center post 20 and the push-button assembly 850 is in its first position (i.e., its locked position), the driver assembly is locked to the center post, preferably such that the driver assembly (or at least a striker 28 thereof) is free to rotate about the center post and/or relative to the guide housing 14. This rotational attachment results from the balls 800 being wedged between the head 20H of the center post 20 and walls (e.g., rigid surfaces) of the push-button assembly 850. This is perhaps best seen in FIGS. 26 and 27.

In more detail, each ball 800 in FIGS. 26 and 27 is wedged between a leg 855 of the button assembly 850 and the head 20H of the center post 20. Each leg 855 defines a recess that can be moved into and out of engagement with one of the balls 800. When the recess in a leg 855 is aligned with a ball 800, that ball is free to move away from (and out of locking engagement with) the center post 20. The button assembly moves from its first position (its locked position) to its second position (its unlocked position) in response to an operator pressing a button cap 859 or another exposed portion of the button assembly 850. This causes a subassembly or a component of the button assembly 850 to move toward the working end of the multi-tool.

Figure 36:
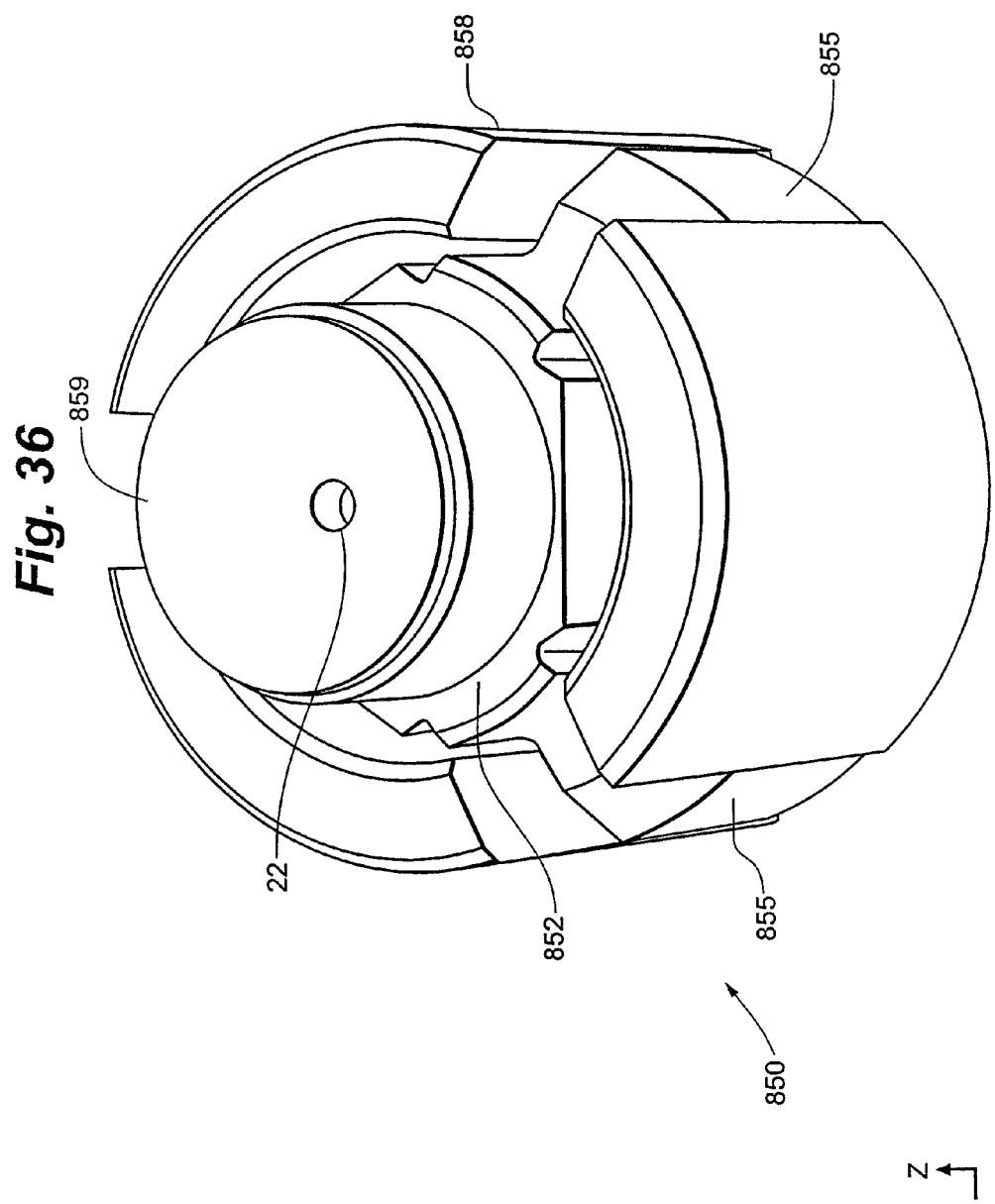
FIG. 36 is a perspective view of the push-button assembly of FIG. 35 shown in an assembled state.

In FIGS. 35 and 36, the illustrated button assembly 850 comprises a base member 858, a slider member 852, a plurality of balls 800, a spring member 850SP, and a cap 859. Here, the base member 858 and the slider member 852 can be mated together such that the slider member can be moved relative to the base portion. In particular, the slider portion 852 has a plurality of legs 855 which, when the slider 852 and base 858 portions are mated, are slidably received in corresponding slots defined by the base portion 858. Thus, when the button assembly moves between its first and second positions, the slider member 852 moves relative to the base member 858. The spring 850SP biases the slider member 852 away from the base member 858, such that the balls 800 are maintained in their locked position unless an operator presses the button so as to overcome the bias of the spring 850SP, thereby moving the recesses defined by the legs 855 of the slider member 852 into alignment with the balls 800. The illustrated spring is a compressible wave spring, although other spring types can be used. In the present embodiment, the opening 22 is defined by the cap 859 and serves as an air vent for the lubrication reservoir 240 bounded by the button assembly 850. If desired, the cap 22 can be omitted.

Referring to FIG. 35, there is an opening (not shown) in the bottom of the slider member 852, such that lubricant can flow through the button assembly 850 and into a lubrication reservoir 24 bounded by the driver assembly 12. This is representative of embodiments wherein a multi-tool has a button assembly that can be actuated (e.g., by an operator manually pushing a button on the multi-tool) so as to unlock a driver assembly from a center post 20 of the multi-tool, and wherein the button assembly has (e.g., defines) an internal lubrication passage through which lubricant delivered to the multi-tool can pass (optionally when flowing to a lubrication reservoir 24 bounded by the driver assembly and/or when flowing to a direct lubrication passage 26 of any type described above).

In the exemplary button assembly 850 of FIG. 35, the balls 800 are disposed in respective openings 858B defined by the base member 858. Here, the openings 858B can be formed by boring (e.g., drilling) inwardly from the outside of the base member 858, leaving an internal lip at the end of each bore to prevent the balls from escaping.

Multi-Tool Rotation Groove Technology

Certain embodiments provide a multi-tool having a driver assembly and/or a guide housing with rotation grooves. The driver assembly 12, for example, can optionally have a body portion 12B that is adapted to be nested rotatably inside an interior wall of a guide housing 14 of the multi-tool. This can optionally be the case for any embodiment of this disclosure. In these embodiments, the multi-tool preferably can be indexed by causing relative rotation of the driver assembly 12 and the guide housing 14. For example, the guide housing 14 may be held stationary while the driver assembly 12 is rotated within the guide housing. Alternatively, the driver assembly 12 can be held stationary while the guide housing 14 is rotated about the driver assembly. As another alternative, the driver assembly 12 and the guide housing 14 can both be rotated. Thus, the multi-tool 10 (in the present embodiments, or any embodiments described in other sections of the present disclosure) can be of the fixed, indexable, or auto-indexable varieties.

In the present embodiments, the rotation grooves can be incorporated into many different types of multi-tools. Preferably, the multi-tool 10 in these embodiments is adapted to carry a plurality of tools (optionally punches) 16. For example, the multi-tool 10 preferably has a plurality of tool-receipt openings 40 adapted to receive respective tools 16. In some cases, the tools 16 will be punches, and the tool-receipt openings 40 will be punch-receipt openings.

Exemplary rotation grooves are shown in FIGS. 1, 2A, 2D, 24, and 25. Here, the driver 12 is provided with rotation grooves 12G, 12HG. Alternatively or additionally, the guide housing can be provided with rotation grooves. The illustrated embodiments provide rotation grooves 12G, 12HG on the driver 12 and ball plungers BP on the guide housing 14. However, this arrangement can be reversed, if so desired. Moreover, the ball plungers can be replaced with balls, pins, ridges, dimples, shoulders, and/or other projections. The rotation grooves 12G, 12HG and cooperating ball plungers BP can facilitate proper rotation and/or can keep the multi-tool from over-rotating due to acceleration and deceleration forces when rotating and stopping.

Optionally, the driver body 12B has an exterior surface in which are formed a plurality of vertical rotation grooves 12G spaced apart about the perimeter of the driver body. Additionally or alternatively, the exterior surface of the driver body can optionally have one or more horizontal rotation grooves 12HG. When the driver assembly 12B is nested rotatably within the guide housing 14, the illustrated ball plungers BP desirably are adapted to ride along the horizontal rotation groove 12HG. Further, the vertical rotation grooves 12G can prevent over-rotating during rotating and stopping, as the ball plungers can be easily stopped upon reaching respective vertical rotation grooves 12G.

Combination Embodiments

A first group of embodiments described above involves a multi-tool having a tool-access skid plate. The tool-access skid plate feature can be referred to as Feature I. A second group of embodiments described above involves a multi-tool having a direct lubrication system. The direct lubrication system feature can be referred to as Feature II. A third group of embodiments described above involves a multi-tool having a tool-retention skid plate. The tool-retention skid plate feature can be referred to as Feature III. A fourth group of embodiments described above involves a multi-tool adapted to provide unguided self-stripping tool utilization. This feature can be referred to as Feature IV. A fifth group of embodiments described above involves a form-up multi-tool. This feature can be referred to as Feature V. A sixth group of embodiments described above involves a multi-tool having a surface enhancement. The surface enhancement feature can be referred to as Feature VI. A seventh group of embodiments described above involves a multi-tool having a sleeve feature. The sleeve feature can be referred to as Feature VII. An eighth group of embodiments described above involves a multi-tool having a push-button feature. The push-button feature can be referred to as Feature VIII. A ninth group of embodiments described above involves a multi-tool having a rotation-groove feature. The rotation-groove feature can be referred to as Feature IX.

The invention provides a number of combination embodiments wherein two or more (e.g., any two or more) of these features are provided in combination. For example, a multi-tool can advantageously be provided with Features I and II. The embodiment shown in FIG. 2B is one example. Further, a multi-tool can be provided with Features I and III. The embodiment shown in FIG. 11 is one example. A multi-tool can also be provided with Features I and VI. Further, a multi-tool can be provided with Features I and VII. Still further, a multi-tool can be provided with Features I and VIII. An exemplary embodiment of this nature is shown in FIG. 12. A multi-tool can also be provided with Features I and IX. Reference is made, for example, to FIGS. 2A and 2B.

Figure 19:
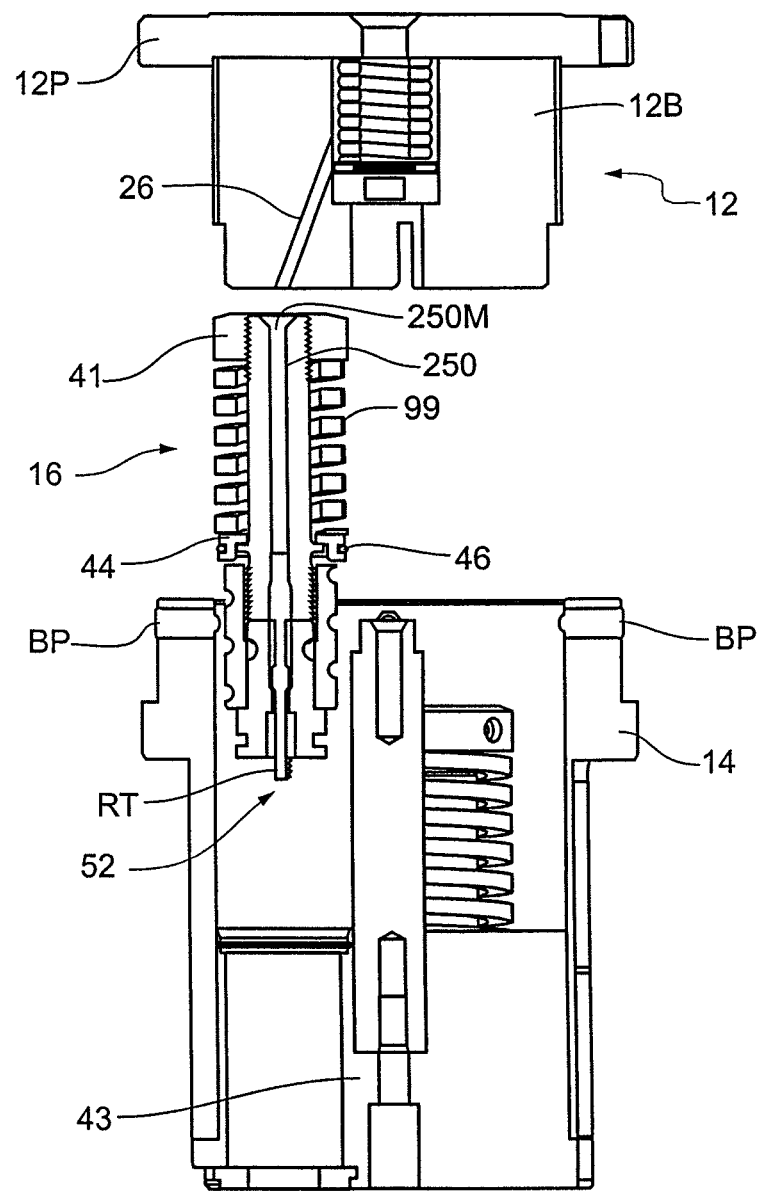
FIG. 19 shows a partially-exploded side cutaway view of a multi-tool provided with a threading tool in accordance with certain embodiments of the invention.
Figure 20:
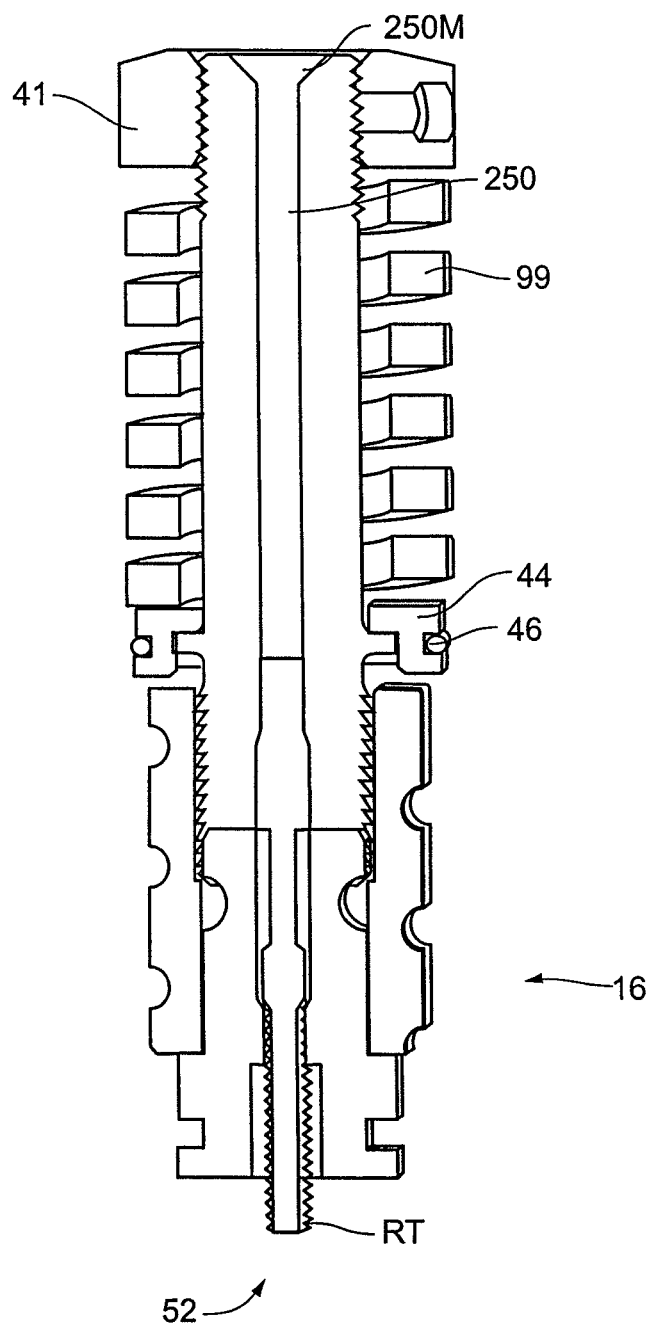
FIG. 20 shows a cross-sectional view of a threading tool that can be provided in certain embodiments of the invention.
Figure 21:
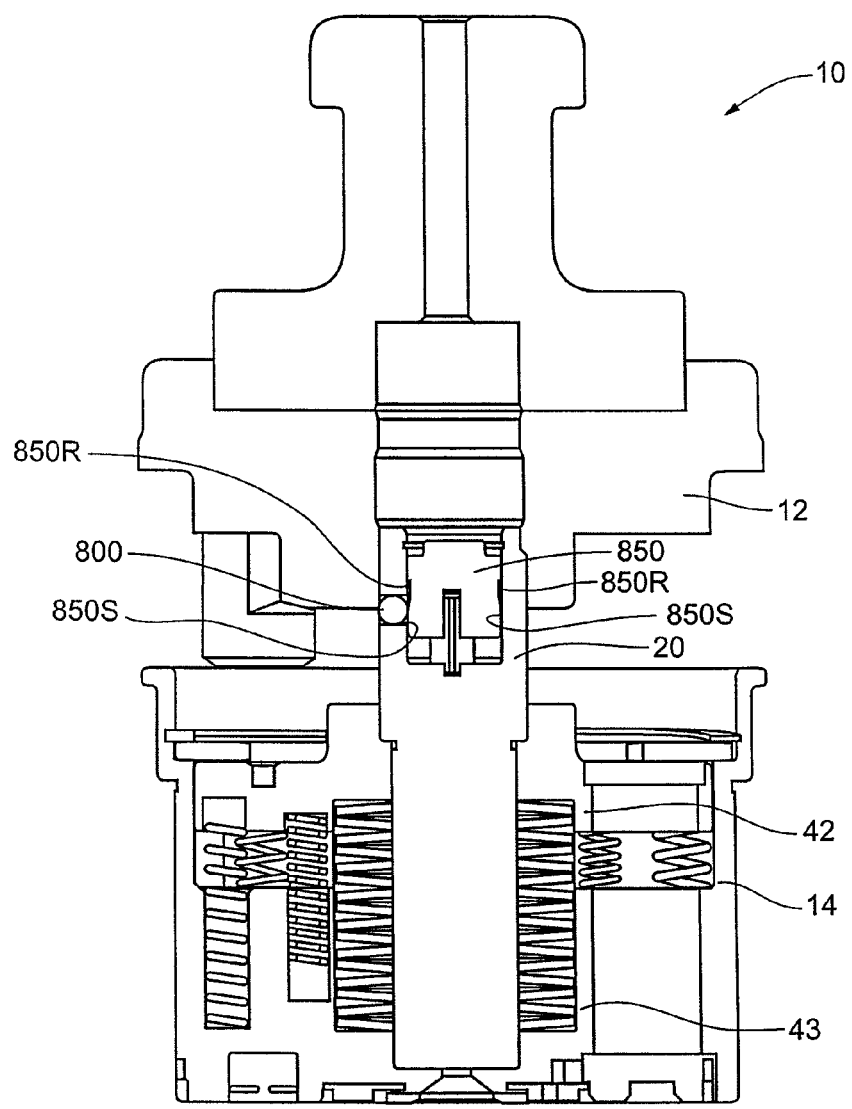
FIG. 21 shows a side cutaway view of a multi-tool in accordance with certain embodiments of the invention.
Figure 22:
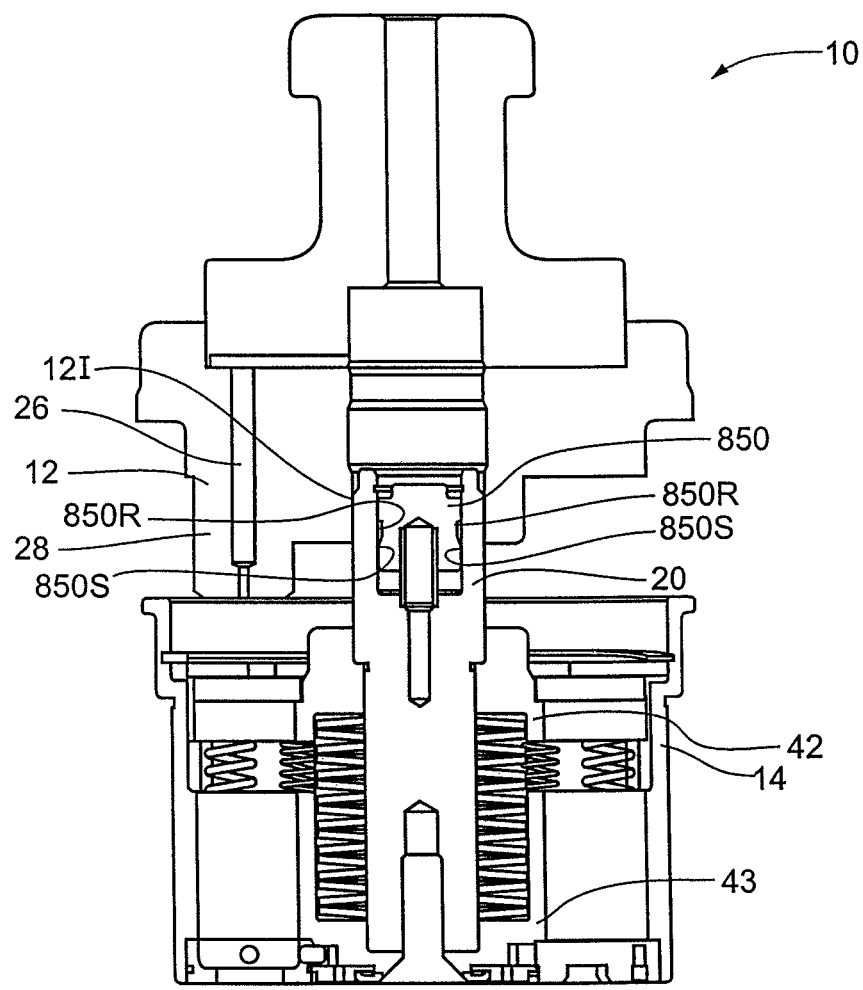
FIG. 22 shows a side cutaway view of a multi-tool in accordance with certain embodiments of the invention.
Figure 23:
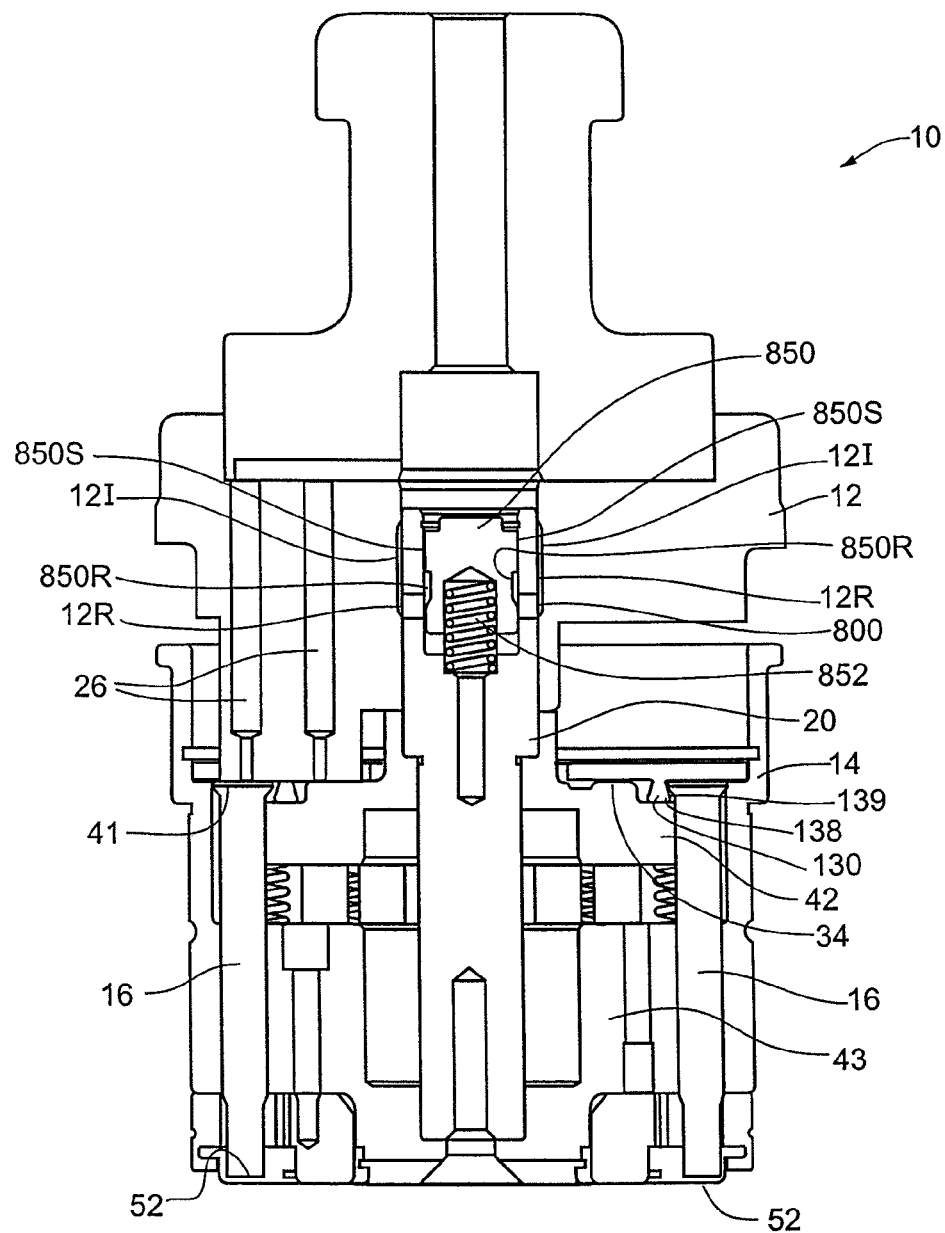
FIG. 23 shows a side schematic cutaway view of a multi-tool in accordance with certain embodiments of the invention.

Further, a multi-tool can be provided with Features II and III. An exemplary embodiment of this nature is shown in FIG. 23. Still further, a multi-tool can be provided with Features II and IV. An exemplary embodiment of this nature is shown in FIG. 19. The embodiment shown in FIG. 7A is another example. A multi-tool can also be provided with Features II and VI. Further, a multi-tool can be provided with Features II and VII. Still further, a multi-tool can be provided with Features II and VIII. Reference is made to FIGS. 22 and 23. A multi-tool can also be provided with Features II and IX. Embodiments like those of FIGS. 2A and 2B are exemplary.

In some combination embodiments, a multi-tool is provided with Features III and VI. Further, certain combination embodiments provide a multi-tool having Features III and VII. Still further, some combination embodiments provide a multi-tool having Features III and VIII. Embodiments like that of FIG. 23 are exemplary. A multi-tool can also be provided with Features III and IX.

The invention provides certain embodiments involving a multi-tool with Features IV and VI. In some combination embodiments, a multi-tool is provided with Features IV and VII. Further, certain combination embodiments provide a multi-tool having Features IV and VIII. Still further, some combination embodiments provide a multi-tool having Features IV and IX. Reference is made to FIGS. 7A, 7B, and 19.

Additionally, the invention provides some combination embodiments involving a multi-tool having Features V and VI.

In certain embodiments, the invention provides a multi-tool having Features VI and VII. Further, certain combination embodiments provide a multi-tool having Features VI and VIII. Still further, some combination embodiments provide a multi-tool having Features VI and IX.

The invention also provides some embodiments involving a multi-tool having Features VII and VIII. Further, certain embodiments provide a multi-tool having Features VII and IX.

Further, a multi-tool can be provided with Features VIII and IX in combination. Reference is made to FIGS. 25-29.

One set of combination embodiments provides a multi-tool having Features I, II, and III in combination. Reference is made to FIG. 23. Another set of combination embodiments provides a multi-tool having Features II, IV, and IX. Reference is made to FIGS. 7A, 7B, and 19. A further set of combination embodiments provides a multi-tool having Features I, II, III, and VIII. Embodiments like that of FIG. 23 are exemplary. Many other variants will be apparent to skilled artisans given the present teaching as a guide.

Selected Embodiments

With reference to FIG. 1, there is shown a partially exploded view of a multi-tool in accordance with certain embodiments of the invention. The multi-tool 10 can be used, for example, in a punch press or another machine tool. The multi-tool 10 has an upper portion 12, referred to herein as a driver assembly, and a lower portion 14, referred to herein as a guide housing. The guide housing 14 is adapted to receive a plurality of tools 16 (optionally punches). The tools can be punching tools, forming tools, dies, etc. Prior to use, the driver assembly 12 is assembled together with the guide housing 14. In FIG. 1, the driver assembly 12 has a body portion 12B that can be disposed (e.g., secured) within an interior cavity 15 of the guide housing 14. Once the tool 16 shown in FIG. 1 is mounted in its desired position inside the guide housing 14 (and once any other desired tools are mounted in the multi-tool), the body portion 12B of the driver assembly 12 can be inserted into the cavity 15 bounded by the upper portion 14U of the guide housing 14. The driver assembly 12 can then be fixedly secured to the guide housing 14. For example, a fastener 18 (FIG. 2B) with one end secured to the driver assembly 12 can extend through a central opening CO in the body portion 12B of the driver assembly 12 and into a retaining post 20 that is anchored relative to (e.g., mounted to) the guide housing. While many different fasteners 18 can be used, one useful design employs a hex head fastener (e.g., a hex head bolt) that couples to the retaining post 20. The fastener 18 here can be accessed through an opening 22 defined by a top plate 12P of the driver assembly 12. FIGS. 2A and 2B show this driver assembly 12 coupled to the guide housing 14.

With reference to FIG. 2B, there is shown a cutaway side profile view of the multi-tool embodiment of FIG. 2A. Here, the illustrated driver assembly 12 includes a top plate 12P and a body portion 12B. The top plate 12P defines an opening 22 through which an Allen wrench or the like can be extended to tighten or loosen the fastener 18. Lubrication can also be delivered into the multi-tool via this opening 22. The illustrated driver assembly 12 defines a lube reservoir 24, a direct lubrication passage 26, and a lubrication outlet 29, as described above.

The driver 12 can be formed of steel, although other materials can also be used. In some embodiments, at least part of the driver is formed of a hardenable or hardened material, such as through-hardened steel or pre-hardened steel. This may extend the life and durability of the driver. For example, it can be advantageous to use hardened steel for all high-wear areas/components of the driver, optionally using pre-hardened steel for all other areas of the driver.

In FIG. 2B, the body portion 12B and the top plate 12P of the driver assembly 12 are separate pieces. These two components 12B, 12P can be secured together by a plurality of fasteners 180 (e.g., hex head bolts), as is perhaps best appreciated with reference to FIG. 1. As an alternative, the body portion 12B and top plate 12P can be one integral body. Thus, the driver assembly 12 can optionally be a single unit, with the fastener 18 and sealing member 520 being its only separate pieces.

The guide housing 14 can have a working end 33 (optionally a bottom end) adapted to hold one or a plurality of stripper plates 34. The guide housing 14 can include a punch carrier 42 and a punch guide tip 43. In FIG. 2B, the punch carrier and the punch guide tip are separate bodies mounted within the guide housing, such that the punch carrier and the punch guide tip together define a plurality of tool-receipt openings (e.g., punch-receipt openings) 40. In FIG. 2B, stripping springs 36 are disposed between the punch carrier 42 and the punch guide tip 43. The guide housing 14 and the punch guide tip 43 can be one integral piece, or they can be two separate pieces. In FIG. 2B, they are shown as being separate pieces, although this is not required. When operatively positioned, the punch carrier 42 rests on top of the stripping springs 36. In the embodiment of FIG. 2B, each stripper spring 36 is disposed in confronting recesses 47, 147 defined respectively by the punch guide tip 43 and the punch carrier 42. Preferably, there is a space 49 between the punch carrier 42 and the punch guide tip 43 (at least when the punch carrier 42 rests in its default position between pressing operations). This allows the punch carrier 42 to traverse downwardly when the driver assembly 12 is impacted by a ram of a punch press. Once this impact is over, the stripping springs 36 act to force the punch carrier 42 back to its default position (shown in FIG. 2B). In the embodiment of FIG. 2B, the punch guide tip 43 is held in place by a fastener (e.g., a hex bolt) 60 that is anchored to the retaining post 20 of the multi-tool. The punch guide tip 43 can also be secured directly to the guide housing by a plurality of fasteners (e.g., hex bolts) connecting a flange 435 of the punch guide tip 43 to the bottom edge 14E of the guide housing. The retaining post 20 can help secure the punch carrier 42 and punch guide tip 43 in their respective positions. For example, the illustrated retaining post 20 has a shoulder 20S that limits upward movement of the punch carrier 42. Here, a downwardly-facing shoulder 20S of the retaining post 20 is engaged by an upwardly-facing shoulder 42S of the punch carrier 42 when the punch carrier is held in its default (i.e., uppermost) position by the resilient bias of the stripping springs 36.

The guide housing 14, punch carrier 42, and punch guide tip 43 can be formed of steel, although other materials can be used for one or more of these components. In some embodiments, at least part of at least one of these components 14, 42, 43 is formed of a hardenable or hardened material, such as through-hardened steel or pre-hardened steel. This may extend the life and durability of the component(s) in question. For example, it can be advantageous to use hardened steel for all high-wear areas/components of the guide housing 14, punch carrier 42, and punch guide tip 43, optionally using pre-hardened steel for all other areas of these components 14, 42, 43.

The multi-tool 10 can be adapted for use with many different types of tools 16. Preferably, the multi-tool is adapted to hold a plurality of tools. The tools may be punching tools (i.e., punches), forming tools, dies, etc. Some exemplary punch types will now be described.

Generally, the punch will have a head 41 and a tip 52. The head 41 can optionally be removably connected to a punch body 50 that has (e.g., defines) the tip 52. An exemplary tool design of this nature is shown in FIG. 2B. Alternatively, a single body can define both the head 41 and the tip 52. An exemplary tool design of this nature is shown in FIG. 12. Referring again to FIG. 2B, the head 41 of the illustrated tool 16 can be connected to the punch body 50 by screwing a threaded portion of the head 41 into a correspondingly threaded portion of the punch body 50. Here, the head 41 has an exteriorly threaded male portion received in an interiorly threaded female portion of the punch body 50. This arrangement, however, can be reversed. In certain embodiments, the punch 16 has exterior lubrication channels 76. These channels 76, when provided, preferably are adapted to distribute a lubricant about an exterior of the tool and about an interior of the tool-receipt opening in which such tool is received.

The punch can be formed of steel, although many other materials can also be used. In some cases, at least part of the punch (e.g., the part forming the tip) is formed of a hardenable or hardened material, such as through-hardened steel or pre-hardened steel. This may extend the life and durability of the punch.

Figure 3:
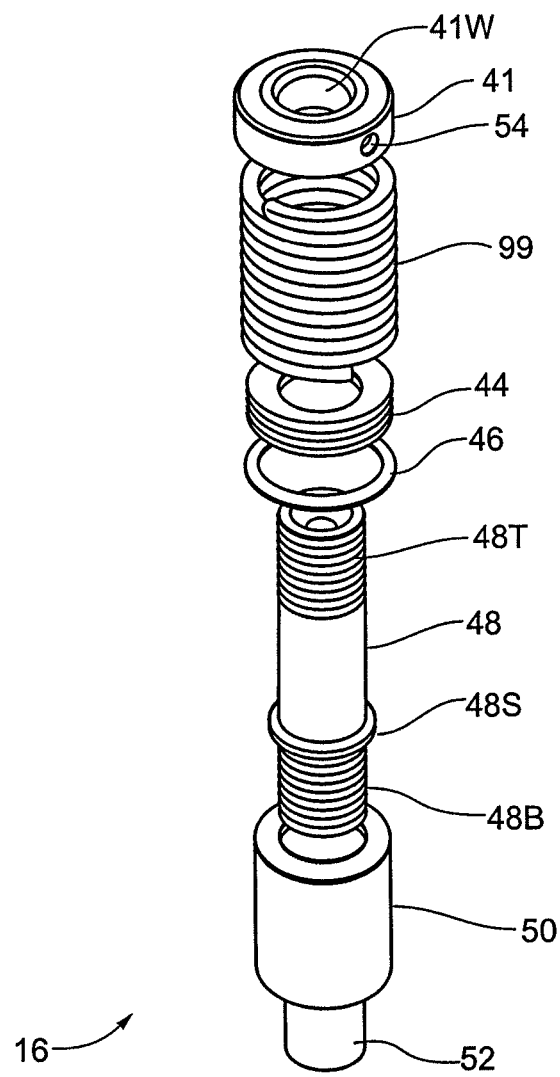
FIG. 3 shows an exploded perspective view of a punch that can be provided in certain embodiments of the invention.
Figure 3A:
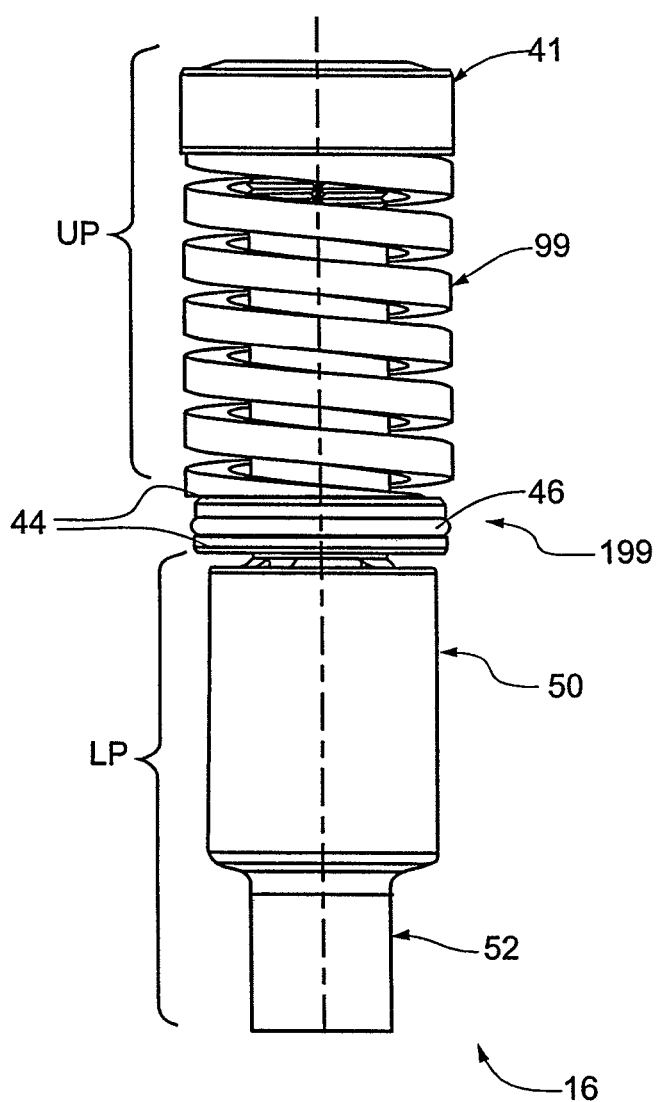
FIG. 3A shows a front profile view of the punch shown in FIG. 3.

FIGS. 3 and 3A depict an exemplary self-stripping punch that can be used in certain embodiments of the invention. The illustrated punch 16 has a head 41, stripping spring 99, seat body 44, an O-ring 46, a punch driver 48, punch body 50, and tip 52. Here, the head 41 is secured to the punch driver 48 by screwing an exteriorly threaded top end region 48T of the punch driver 48 into the interiorly threaded wall 41W of the head 41, and then screwing a hex head bolt or the like (not shown) through a transverse opening 54 in the head 41. A stripping spring 99 is disposed about the punch driver 48 and seated between the head 41 and a seat body 44 carried against a shoulder 48S of the punch driver 48. Here, the seat body 44 defines an O-ring groove for an O-ring 46. The punch body 50 has an interiorly-threaded top section in which an exteriorly-threaded bottom end region 48B of the punch driver 48 can be threadingly secured. The punch body 50 defines the tip 52.

The head 41, punch driver 48, and punch body 50 can be formed of steel, although other materials can also be used. In some cases, at least part of at least one of these punch components 41, 48, 50 is formed of a hardenable or hardened material, such as through-hardened steel or pre-hardened steel. This may extend the life and durability of the component(s) in question. The stripping spring 99 and O-ring 46 are conventional and can be obtained from a variety of well known commercial suppliers.

The multi-tool can optionally have a generally-cylindrical configuration. However, this is not required for any multi-tool embodiment of the present disclosure. For instance, sheet feed, strip feed, or press brake applications may find particular benefit in embodiments where the multi-tool is other than generally cylindrical. Shapes of this nature may also be beneficial for a variety of turret press applications, single-station press applications, etc.

In one embodiment, the multi-tool has a generally cubic shape. In another embodiment, it has a generally triangular horizontal cross section. In still other embodiments, the multi-tool has an irregular configuration. Moreover, a variety of configurations involving various polygonal horizontal cross sections can be used. In one embodiment, the guide housing 14 has an exterior configuration with a horizontal cross section that is generally square, rectangular, or otherwise polygonal, while the driver assembly 12 (or at least a body portion 12 thereof) has a generally cylindrical exterior configuration. In this embodiment, the guide housing preferably has an interior wall (e.g., bounding an optional interior cavity 15) with a generally cylindrical interior configuration.

Further, the tool-receipt openings 40 need not be generally circular in cross section. This is the case for any multi-tool embodiment of the present disclosure. The tool-receipt openings 40, for example, can have a cross section that is square, rectangular, triangular, oval-shaped, etc. In embodiments of this nature, the individual tools 16 preferably have corresponding non-round configurations, as this can provide a keying function for the tools 16.

Thus, embodiments of the MULTI-TOOL TECHNOLOGY are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. A punch press in combination with a form-up multi-tool, the punch press having upper and lower tables, the form-up multi-tool being mounted on the lower table, the punch press having a workpiece position located between the upper and lower tables wherein the form-up multi-tool is situated beneath the workpiece position, wherein the form-up multi-tool carries a plurality of individual forming tools and has a head, the plurality of forming tools and the head being further situated beneath the workpiece position, the head bounding a plurality of openings in which respective ones of the forming tools are disposed, the form-up multi-tool having an adjustment mechanism adjustable to selectively place an activated one of the forming tools in an activated configuration beneath the workpiece position, said activated configuration being characterized by said activated forming tool being rigidly secured in an upright position, wherein the head and non-activated ones of the forming tools have a limited range of freedom to move vertically downwardly relative to said activated forming tool when the upper table is lowered relative to the lower table so as to engage a workpiece between the tables, said adjustment mechanism comprising a rotatable plate defining a series of openings adapted for being aligned respectively with said non-activated forming tools, the rotatable plate having a rigid surface adapted for being engaged by a bottom end of said activated forming tool.

2. The combination of claim 1 wherein the head and said non-activated forming tools are adapted to move vertically downwardly within a limited range relative to the rotatable plate of the adjustment mechanism, wherein this relative vertical movement involves the non-activated tools passing downwardly through respective ones of the openings defined by the rotatable plate, and wherein during this relative vertical movement said activated forming tool is prevented from moving downwardly by said rigid surface of the rotatable plate.

3. The combination of claim 1 wherein there is a first number of said forming tools, there is a second number of said openings defined by the rotatable plate of the adjustment mechanism, and said second number is at least one less than said first number.

4. The combination of claim 1 wherein the rotatable plate of the adjustment mechanism is rotatable relative to the head and forming tools of the form-up multi-tool.

5. The combination of claim 1 wherein the activated forming tool in the upright position is in a fixed position relative to the non-activated forming tools of the form-up multi-tool.

6. The combination of claim 1 wherein the activated forming tool in the upright position is in a fixed position relative to a workpiece such that the workpiece is moved into contact with the activated forming tool during a pressing operation of the punch press.

7. The combination of claim 6 wherein the punch press is configured to deform the workpiece by the workpiece being forcefully pressed against a tip of the activated tool.

8. The combination of claim 6 wherein the non-activated forming tools are configured to move to avoid contact with the workpiece during a pressing operation of the punch press.

9. The combination of claim 8 wherein the non-activated forming tools are configured to move downwardly relative to the activated forming tool during a pressing operation of the punch press.

10. The combination of claim 1 wherein the head and non-activated ones of the forming tools move vertically downwardly relative to said activated forming tool when the lower table is raised relative to the upper table so as to engage a workpiece between the tables.

\* \* \* \* \*